United States Patent
Xu et al.

(10) Patent No.: US 12,041,501 B2
(45) Date of Patent: Jul. 16, 2024

(54) COMMUNICATION METHOD AND RELATED COMMUNICATION DEVICE

(71) Applicant: HUAWEI TECHNOLOGIES CO., LTD., Guangdong (CN)

(72) Inventors: Shengfeng Xu, Beijing (CN); Jiangwei Ying, Beijing (CN); Meng Li, Beijing (CN); Yanmei Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 379 days.

(21) Appl. No.: 17/520,411

(22) Filed: Nov. 5, 2021

(65) Prior Publication Data
US 2022/0060954 A1  Feb. 24, 2022

Related U.S. Application Data
(63) Continuation of application No. PCT/CN2020/076176, filed on Feb. 21, 2020.

(30) Foreign Application Priority Data

May 6, 2019  (CN) .......................... 201910371825.7

(51) Int. Cl.
*H04W 36/00* (2009.01)
*H04W 12/06* (2021.01)
(Continued)

(52) U.S. Cl.
CPC ........... *H04W 36/08* (2013.01); *H04W 12/06* (2013.01); *H04W 36/00837* (2018.08);
(Continued)

(58) Field of Classification Search
CPC ... H04W 12/06; H04W 4/40; H04W 36/0077; H04W 36/00835; H04W 36/00837;
(Continued)

(56) References Cited

U.S. PATENT DOCUMENTS 10,952,046 B2 * 3/2021 Lee .................... H04W 60/005
11,076,318 B2 * 7/2021 Shan ................... H04L 65/1104
(Continued)

FOREIGN PATENT DOCUMENTS

CN  106998575 A  8/2017
CN  107734480 A  2/2018
(Continued)

OTHER PUBLICATIONS

3GPP TS 23.287 V0.3.0 (Apr. 2019), "3rd Generation Partnership Project; Technical Specification Group Services and System Aspects Architecture enhancements for 5G System (5GS) to support, Vehicle-to-Everything (V2X) services (Release 16)," Apr. 2019, 39 pages.
(Continued)

*Primary Examiner* — Frank Duong
(74) *Attorney, Agent, or Firm* — Fish & Richardson P.C.

(57) ABSTRACT

Example communication methods apparatus are described. One example method includes receiving air interface link signal information of neighboring network devices by a source network device from a terminal device. The source network device determines a target network device based on sidelink information of the terminal device and the air interface link signal information of the neighboring network devices. Then, the source network device may send a handover request to the target network device, so that the terminal device can be handed over from the source network device to the target network device. Therefore, the target network device determined by the source network device can better meet an air interface link communication requirement and a sidelink communication requirement of the terminal device.

17 Claims, 21 Drawing Sheets

(51) Int. Cl.
*H04W 36/08* (2009.01)
*H04W 72/1263* (2023.01)
*H04W 92/10* (2009.01)
*H04W 92/18* (2009.01)

(52) U.S. Cl.
CPC ........ *H04W 72/1263* (2013.01); *H04W 92/10* (2013.01); *H04W 92/18* (2013.01)

(58) Field of Classification Search
CPC ......... H04W 36/0088; H04W 36/0094; H04W 36/08; H04W 36/30; H04W 72/1263; H04W 92/10; H04W 92/18
See application file for complete search history.

(56) References Cited

U.S. PATENT DOCUMENTS

| | | | | |
|---|---|---|---|---|
| 11,337,126 | B2* | 5/2022 | Tseng | H04W 76/27 |
| 11,818,672 | B2* | 11/2023 | Khoryaev | H04W 56/00 |
| 2019/0037448 | A1* | 1/2019 | Shan | H04W 60/04 |
| 2022/0095260 | A1* | 3/2022 | Shan | H04W 60/04 |
| 2022/0159527 | A1* | 5/2022 | Lee | H04W 8/24 |
| 2022/0174774 | A1* | 6/2022 | Tseng | H04W 76/23 |

FOREIGN PATENT DOCUMENTS

| | | |
|---|---|---|
| CN | 108605253 A | 9/2018 |
| CN | 109691174 A | 4/2019 |
| EP | 2717627 A2 | 4/2014 |
| WO | 2018128349 A1 | 7/2018 |

OTHER PUBLICATIONS

3GPP TR 23.786 V16.0.0 (Mar. 2019), "3rd Generation Partnership Project; Technical Specification Group Services and System Aspects; Study on architecture enhancements for the Evolved Packet System (EPS) and the 5G System (5GS) to support advanced V2X services(Release 16)," Mar. 2019, 118 pages.
3GPP TR 38.885 V16.0.0 (Mar. 2019), "3rd Generation Partnership Project; Technical Specification Group Radio Access Network; NR; Study on NR Vehicle-to-Everything (V2X)(Release 16)," Mar. 2019, 122 pages.
3GPP TR 38.913 V15.0.0 (Jun. 2018), "3rd Generation Partnership Project; Technical Specification Group Radio Access Network; Study on Scenarios and Requirements for Next Generation Access Technologies;(Release 15)," Jun. 2018, 39 pages.
Huawei, HiSilicon, LG Electronics, Intel, ZTE, CATT, "Procedure modification in 5GC for V2X," SA WG2 Meeting #131, 82-1902610, Santa Cruz de Tenerife, Spain, Feb. 25-Mar. 1, 2019, 4 pages.
Office Action issued in Chinese Application No. 201910371825.7 on May 6, 2021, 25 pages (with English translation).
PCT International Search Report and Written Opinion issued in International Application No. PCT/CN2020/076176 on Apr. 26, 2020, 15 pages (with English translation).
Extended European Search Report issued in European Application No. 20802941.3 on Apr. 26, 2022, 9 pages.

* cited by examiner

COMMUNICATION METHOD AND RELATED COMMUNICATION DEVICE

CROSS-REFERENCE TO RELATED APPLICATIONS

This application is a continuation of International Application No. PCT/CN2020/076176, filed on Feb. 21, 2020, which claims priority to Chinese Patent Application No. 201910371825.7, filed on May 6, 2019. The disclosures of the aforementioned applications are hereby incorporated by reference in their entireties.

TECHNICAL FIELD

Embodiments of this application relate to the communication field, and in particular, to a communication method and a related communication device.

BACKGROUND

Internet of vehicles is a key technology of an intelligent transportation system and is considered as one of fields with the most industrial potential and the most clear market demand in an internet of things system. 5G-based internet of vehicle wireless communication has two working modes: One is sidelink communication, that is, a direct link communication mode between terminal devices, and the other is air interface link communication, namely, an uplink/downlink communication mode between a terminal device and a network device.

In a conventional technology, a terminal device measures air interface link signal information of neighboring network devices based on an indication of a source network device connected to the terminal device, and sends a measurement report to the source network device. The measurement report includes the air interface link signal information of the neighboring network devices. Then, the source network device determines, from the neighboring network devices based on the air interface link signal information of the neighboring network devices in the measurement report, a target network device to which the terminal device is to be handed over.

In this solution, information carried in the measurement report reported by the terminal device to the source network device is the air interface link signal information, and the source network device determines, based on the air interface link signal information, the target network device to which the terminal device is to be handed over. In this case, the target network device determined by the source network device based on the air interface link signal information may not be suitable. Consequently, some faults may occur when an air interface link communication requirement of the terminal device is to be met, and a communication effect of the terminal device may be reduced.

SUMMARY

Embodiments of this application provide a communication method and a related communication device, so that a target network device determined by a source network device can better meet an air interface link communication requirement and a sidelink communication requirement of a terminal device.

According to a first aspect, an embodiment of this application provides a communication method, including: A source network device may receive air interface link signal information of neighboring network devices from a terminal device, and then the source network device determines, based on sidelink information of the terminal device and the air interface link signal information of the neighboring network devices, a target network device to which the terminal device is to be handed over. Then, the source network device may send a handover request to the target network device, where the handover request is used to request to hand over the terminal device from the source network device to the target network device.

In this embodiment of this application, when determining the target network device, the source network device considers not only the air interface link signal information of the neighboring network devices, but also the sidelink information of the terminal device. Therefore, the target network device determined by the source network device can better meet an air interface link communication requirement and a sidelink communication requirement of the terminal device. Therefore, if the terminal device is handed over to the target network device, a communication effect of the terminal device may not be reduced.

According to the first aspect, in a first implementation of the first aspect of the embodiments of this application, the sidelink information of the terminal device includes at least one of first sidelink information of the terminal device or second sidelink information of the terminal device. The first sidelink information includes at least one of sidelink communication capability information of the terminal device, sidelink authorization information of the terminal device, or cross-radio access technology sidelink scheduling authorization information of the terminal device, or the first sidelink information includes at least one of available sidelink communication type information of the terminal device or cross-radio access technology sidelink scheduling authorization information of the terminal device. The second sidelink information includes sidelink priority information of the terminal device.

In this implementation, the sidelink information of the terminal device is further classified. The sidelink information of the terminal device may be classified into the first sidelink information and the second sidelink information in different application scenarios. Further, the first sidelink information may be classified into two types. Type 1: The first sidelink information may include at least one of the sidelink communication capability information of the terminal device, the sidelink authorization information of the terminal device, or the cross-radio access technology sidelink scheduling authorization information of the terminal device. Type 2: The first sidelink information may include at least one of the available sidelink communication type information of the terminal device or the cross-radio access technology sidelink scheduling authorization information of the terminal device. In addition, the second sidelink information includes the sidelink priority information of the terminal device. The first sidelink information or the second sidelink information used in different application scenarios may be different. Therefore, in this implementation, the sidelink information of the terminal device is subdivided, so that the solution is clearer and the feasibility of the solution is enhanced.

According to the first aspect, in a second implementation of the first aspect of the embodiments of this application, the sidelink information of the terminal device includes the cross-radio access technology sidelink scheduling authorization information of the terminal device. That the source network device determines a target network device based on sidelink information of the terminal device and the air interface link signal information of the neighboring network devices includes: When the cross-radio access technology sidelink scheduling authorization information of the terminal device indicates that the terminal device supports cross-radio access technology sidelink scheduling, the source network device determines a network device that is in the neighboring network devices and that meets a first air interface link communication condition of the terminal device as the target network device based on the air interface link signal information of the neighboring network devices. The air interface link signal information of the neighboring network devices includes air interface link signal values of the neighboring network devices, and the first air interface link communication condition includes that an air interface link signal value is greater than a first air interface link signal threshold.

In this implementation, it is clear that the sidelink information of the terminal device includes the cross-radio access technology sidelink scheduling authorization information of the terminal device, and when the cross-radio access technology sidelink scheduling authorization information of the terminal device indicates that the terminal device supports the cross-radio access technology sidelink scheduling, the source network device determines an implementation of the target network device. In this implementation, because the terminal device supports the cross-radio access technology sidelink scheduling, the terminal device using NR PC5 may be scheduled by a network device using LTE Uu, or the terminal device using LIE PC5 may be scheduled by a network device using NR Uu. In addition, regardless of whether the terminal device supports the cross-radio access technology sidelink scheduling, the terminal device using NR PC5 may be scheduled by the network device using NR Uu, or the terminal device using LITE PC5 may be scheduled by the network device using LTE Uu. Therefore, the source network device can determine the target network device only by selecting a network device that meets the first air interface link communication condition. Therefore, the target network device determined in this implementation can better meet a communication requirement of the terminal device.

According to the first aspect or the first implementation of the first aspect, in a third implementation of the first aspect of the embodiments of this application, that the source network device determines a target network device based on sidelink information of the terminal device and the air interface link signal information of the neighboring network devices includes: The source network device determines the target network device based on the sidelink information of the terminal device, capability information of the neighboring network devices, and the air interface link signal information of the neighboring network devices.

In this embodiment, the capability information of the neighboring network devices is introduced as a reference, so that the source network device can comprehensively consider more factors to determine the target network device. Therefore, a target network device that is more suitable for the terminal device can be determined, and the determined target network device can better meet the communication requirement of the terminal device.

According to the third implementation of the first aspect, in a fourth implementation of the first aspect of the embodiments of this application, the capability information of the neighboring network devices includes at least one of sidelink scheduling capability information of the neighboring network devices or radio access technology information of the neighboring network devices.

In this implementation, the capability information of the neighboring network devices is further limited, so that more specific capability information of the neighboring network devices is used in different application scenarios to determine the target network device, and the determined target network device is more accurate.

According to the third implementation of the first aspect or the fourth implementation of the first aspect, in a fifth implementation of the first aspect of the embodiments of this application, that the source network device determines the target network device based on the sidelink information of the terminal device, capability information of the neighboring network devices, and the air interface link signal information of the neighboring network devices includes: The source network device determines a network device that is in the neighboring network devices and that meets a first air interface link communication condition and supports sidelink communication scheduling of the terminal device as the target network device based on the first sidelink information, the capability information of the neighboring network devices, and the air interface link signal information of the neighboring network devices. Alternatively, when the source network device determines, based on the first sidelink information, the capability information of the neighboring network devices, and the air interface link signal information of the neighboring network devices, that no network device that meets a first air interface link communication condition and supports sidelink communication scheduling of the terminal device exists in the neighboring network devices, the source network device determines the target network device based on the second sidelink information. The air interface link signal information of the neighboring network devices includes air interface link signal values of the neighboring network devices, and the first air interface link communication condition includes that an air interface link signal value is greater than a first air interface link signal threshold.

In this implementation, a scenario in which the first sidelink information or the second sidelink information is used is separately provided. In this way, the source network device may use suitable sidelink information of the terminal device as a reference in different scenarios, and then may accurately determine the target network device that meets the communication requirement of the terminal device.

According to the fifth implementation of the first aspect, in a sixth implementation of the first aspect of the embodiments of this application, the capability information of the neighboring network devices includes the sidelink scheduling capability information of the neighboring network devices, and the first sidelink information includes the sidelink communication capability information of the terminal device and the sidelink authorization information of the terminal device. That the source network device determines a network device that is in the neighboring network devices and that meets a first air interface link communication condition and supports sidelink communication scheduling of the terminal device as the target network device based on the first sidelink information, the capability information of the neighboring network devices, and the air interface link signal information of the neighboring network devices includes: The source network device determines at least one candidate network device based on the sidelink communication capability information of the terminal device, the sidelink authorization information of the terminal device, and the sidelink scheduling capability information of the neighboring network devices, where an intersection exists between a sidelink communication type supported by the at least one candidate network device for scheduling, a sidelink communication type supported by the terminal device, and an authorized sidelink communication type of the terminal device, and the source network device determines a network device that is in the at least one candidate network device and that meets the first air interface link communication condition as the target network device based on air interface link signal information of the at least one candidate network device. Alternatively, the source network device determines at least one candidate network device that is in the neighboring network devices and that meets the first air interface link communication condition based on the air interface link signal information of the neighboring network devices, and the source network device determines the target network device based on sidelink scheduling capability information of the at least one candidate network device, the sidelink communication capability information of the terminal device, and the sidelink authorization information of the terminal device, where an intersection exists between a sidelink communication type supported by the target network device for scheduling, a sidelink communication type supported by the terminal device, and an authorized sidelink communication type of the terminal device.

In this implementation, it is clear that when the capability information of the neighboring network devices includes the sidelink scheduling capability information of the neighboring network devices, the source network device may determine, based on the sidelink scheduling capability information of the neighboring network devices, the sidelink communication types supported by the neighboring network devices for scheduling, or the source network device may separately determine the sidelink communication type supported by the terminal device and the authorized sidelink communication type of the terminal device based on the sidelink communication capability information of the terminal device and the sidelink authorization information of the terminal device. Therefore, the source network device obtains an intersection by using the foregoing three types, and can determine that the target network device can meet the sidelink communication requirement of the terminal device. In addition, the source network device may determine, based on the first air interface link communication condition, whether the neighboring network devices meet air interface link communication of the terminal device. Certainly, the step of determining, by the source network device, whether the neighboring network devices meet the sidelink communication requirement of the terminal device and the step of determining, by the source network device, whether the neighboring network devices meet the air interface link communication requirement of the terminal device are not limited in a time sequence. Therefore, the source network device accurately and flexibly determines the target network device, and the target network device can better meet the requirement of the terminal device.

According to the fifth implementation of the first aspect, in a seventh implementation of the first aspect of the embodiments of this application, the capability information of the neighboring network devices includes the sidelink scheduling capability information of the neighboring network devices, and the first sidelink information includes the available sidelink communication type information of the terminal device. That the source network device determines a network device that is in the neighboring network devices and that meets a first air interface link communication condition and supports sidelink communication scheduling of the terminal device as the target network device based on the first sidelink information, the capability information of the neighboring network devices, and the air interface link signal information of the neighboring network devices includes: The source network device determines at least one candidate network device based on the available sidelink communication type information of the terminal device and the sidelink scheduling capability information of the neighboring network devices, where an intersection exists between a sidelink communication type supported by the candidate network device for scheduling and an available sidelink communication type of the terminal device, and the source network device determines a network device that is in the at least one candidate network device and that meets the first air interface link communication condition as the target network device based on air interface link signal information of the at least one candidate network device. Alternatively, the source network device determines at least one candidate network device that is in the neighboring network devices and that meets the first air interface link communication condition based on the air interface link signal information of the neighboring network devices, and the source network device determines the target network device based on sidelink scheduling capability information of the at least one candidate network device and the available sidelink communication type information of the terminal device, where an intersection exists between a sidelink communication type supported by the target network device for scheduling and an available sidelink communication type of the terminal device.

Compared with the sixth implementation of the first aspect, this implementation provides a manner of determining the available sidelink communication type of the terminal device. In this way, the source network device can determine a neighboring network device that meets the sidelink communication requirement of the terminal device by obtaining an intersection based on the sidelink communication types supported by the neighboring network devices for scheduling and the available sidelink communication type of the terminal device. Therefore, the implementation flexibility of this solution is increased.

According to the fifth implementation of the first aspect, in an eighth implementation of the first aspect of the embodiments of this application, the first sidelink information includes the cross-radio access technology sidelink scheduling authorization information of the terminal device, the sidelink communication capability information of the terminal device, and the sidelink authorization information of the terminal device; and the capability information of the neighboring network devices includes the radio access technology information of the neighboring network devices. That the source network device determines a network device that is in the neighboring network devices and that meets a first air interface link communication condition and supports sidelink communication scheduling of the terminal device as the target network device based on the first sidelink information, the capability information of the neighboring network devices, and the air interface link signal information of the neighboring network devices includes: When the cross-radio access technology sidelink scheduling authorization information of the terminal device indicates that the terminal device does not support cross-radio access technology sidelink scheduling, the source network device determines at least one candidate network device based on the radio access technology information of the neighboring network devices, the sidelink communication capability information of the terminal device, and the sidelink authorization information of the terminal device, where an intersection exists between a radio access technology type of the at least one candidate network device, a sidelink communication type supported by the terminal device, and an authorized sidelink communication type of the terminal device, and the source network device determines a network device that is in the at least one candidate network device and that meets the first air interface link communication condition as the target network device based on air interface link signal information of the at least one candidate network device. Alternatively, when the cross-radio access technology sidelink scheduling authorization information of the terminal device indicates that the terminal device does not support cross-radio access technology sidelink scheduling, the source network device determines at least one candidate network device that is in the neighboring network devices and that meets the first air interface link communication condition based on the air interface link signal information of the neighboring network devices, and the source network device determines the target network device based on radio access technology information of the at least one candidate network device, the sidelink communication capability information of the terminal device, and the sidelink authorization information of the terminal device, where an intersection exists between a radio access technology type of the target network device, a sidelink communication type supported by the terminal device, and an authorized sidelink communication type of the terminal device.

Compared with the sixth implementation of the first aspect, this implementation uses another manner of determining the neighboring network device that meets the sidelink communication requirement of the terminal device. In this manner, because the cross-radio access technology sidelink scheduling authorization information of the terminal device indicates that the terminal device does not support the cross-radio access technology sidelink scheduling, a terminal device using NR PC5 may be scheduled only by a network device using NR Uu, or a terminal device using LTE PC5 may be scheduled only by a network device using LTE Uu. Therefore, the source network device can determine the at least one candidate network device that meets the sidelink communication requirement of the terminal device by obtaining an intersection based on the radio access technology types that are of the neighboring network devices and that are indicated by the radio access technology information of the neighboring network devices, the sidelink communication type supported by the terminal device, and the authorized sidelink communication type of the terminal device. In this way, when the terminal device does not support the cross-radio access technology sidelink scheduling, the source network device can also determine the target network device that meets the communication requirement of the terminal device.

According to the fifth implementation of the first aspect, in a ninth implementation of the first aspect of the embodiments of this application, the first sidelink information includes the cross-radio access technology sidelink scheduling authorization information of the terminal device and the available sidelink communication type information of the terminal device; and the capability information of the neighboring network devices includes the radio access technology information of the neighboring network devices. That the source network device determines a network device that is in the neighboring network devices and that meets a first air interface link communication condition and supports sidelink communication scheduling of the terminal device as the target network device based on the first sidelink information, the capability information of the neighboring network devices, and the air interface link signal information of the neighboring network devices includes: When the cross-radio access technology sidelink scheduling authorization information of the terminal device indicates that the terminal device does not support cross-radio access technology sidelink scheduling, the source network device determines at least one candidate network device based on the radio access technology information of the neighboring network devices and the available sidelink communication type information of the terminal device, where an intersection exists between a radio access technology type of the at least one candidate network device and an available sidelink communication type of the terminal device, and the source network device determines a network device that is in the at least one candidate network device and that meets the first air interface link communication condition as the target network device based on air interface link signal information of the at least one candidate network device. Alternatively, when the cross-radio access technology sidelink scheduling authorization information of the terminal device indicates that the terminal device does not support cross-radio access technology sidelink scheduling, the source network device determines at least one candidate network device that is in the neighboring network devices and that meets the first air interface link communication condition based on the air interface link signal information of the neighboring network devices, and the source network device determines the target network device based on radio access technology information of the at least one candidate network device and the available sidelink communication type information of the terminal device, where an intersection exists between a radio access technology type of the target network device and an available sidelink communication type of the terminal device.

Compared with the eighth implementation of the first aspect, this implementation provides a manner of determining the available sidelink communication type of the terminal device. In this way, the source network device can determine a target network device that meets the sidelink communication requirement of the terminal device by obtaining an intersection based on the radio access technology types of the neighboring network devices and the available sidelink communication type of the terminal device. Therefore, the implementation flexibility of this solution is increased.

According to the fifth implementation of the first aspect, in a tenth implementation of the first aspect of the embodiments of this application, the sidelink priority information of the terminal device is used to indicate that a sidelink communication priority of the terminal device is higher than an air interface link communication priority of the terminal device, or a sidelink communication priority of the terminal device is lower than an air interface link communication priority of the terminal device; or the sidelink priority information of the terminal device is used to indicate that sidelink communication of the terminal device is preferential, or sidelink communication of the terminal device is not preferential.

In this implementation, a function and a representation form of the sidelink priority information that is of the terminal device and that is included in the second sidelink information are specified. The sidelink priority information of the terminal device may indicate, for the terminal device, importance degrees of meeting the sidelink communication and meeting the air interface link communication. In other words, it is more important to first meet the sidelink communication, or more important to first meet the air interface link communication. Therefore, after the source network device learns the sidelink priority information of the terminal device, it is helpful for the source network device to determine a more suitable target network device for the terminal device, to better meet the communication requirement of the terminal device.

According to the ninth implementation of the first aspect or the tenth implementation of the first aspect, in an eleventh implementation of the first aspect of the embodiments of this application, that the source network device determines the target network device based on the second sidelink information includes: When the sidelink priority information of the terminal device indicates that the sidelink communication priority of the terminal device is lower than the air interface link communication priority of the terminal device, or indicates that the sidelink communication of the terminal device is not preferential, the source network device determines the target network device based on the air interface link signal information of the neighboring network devices. Alternatively, when the sidelink priority information of the terminal device indicates that the sidelink communication priority of the terminal device is higher than the air interface link communication priority of the terminal device, or indicates that the sidelink communication of the terminal device is preferential, the source network device determines a network device that is in the neighboring network devices and that meets a second air interface link communication condition and supports the sidelink communication scheduling of the terminal device as the target network device. The second air interface link communication condition includes that an air interface link signal value is greater than a second air interface link signal threshold, and the second air interface link signal threshold is less than the first air interface link signal threshold.

In this implementation, an implementation in which the source network device determines the target network device based on the second sidelink information is specified. The second sidelink information includes the sidelink priority information of the terminal device, and the sidelink priority information of the terminal device may indicate the importance degrees of the air interface link communication and the sidelink communication. Therefore, the source network device determines, based on different priority requirements of the terminal device, a target network device that is more suitable for the terminal device, so that the target network device can better meet the communication requirement of the terminal device.

According to the eleventh implementation of the first aspect, in a twelfth implementation of the first aspect of the embodiments of this application, the air interface link signal value includes an air interface link signal strength value, the first air interface link signal threshold includes a first air interface link signal strength threshold, and the second air interface link signal threshold is a second air interface link signal strength threshold; and/or the air interface link signal value includes an air interface link signal quality value, the first air interface link signal threshold includes a first air interface link signal quality threshold, and the second air interface link signal threshold includes a second air interface link signal quality threshold.

In this implementation, two specific implementations of the air interface link signal value are provided. The air interface link signal value may be the air interface link signal strength value or the air interface link signal quality value. In this way, the source network device may use a more suitable air interface link signal value in a specific application scenario, to more accurately determine whether an air interface link signal value of a neighboring network device meets the first air interface link communication condition or the second air interface link communication condition.

According to the eleventh implementation of the first aspect or the twelfth implementation of the first aspect, in a thirteenth implementation of the first aspect of the embodiments of this application, the method further includes: The source network device receives the sidelink priority information of the terminal device from the terminal device. Alternatively, the source network device receives a correspondence from a policy control device, where the correspondence includes a correspondence between air interface link service requirement identification information and a communication priority and a correspondence between sidelink service requirement identification information and a communication priority, and determines the sidelink priority information of the terminal device based on the air interface link service requirement identification information of the terminal device, the sidelink service requirement identification information of the terminal device, and the correspondence.

In this implementation, a plurality of sources of the sidelink priority information of the terminal device are specified. Therefore, the implementation flexibility of this solution is improved.

According to any one of the fourth implementation of the first aspect to the thirteenth implementation of the first aspect, in a fourteenth implementation of the first aspect of the embodiments of this application, the method further includes: The source network device receives the capability information of the neighboring network devices from the neighboring network devices through interfaces between the source network device and the neighboring network devices. Alternatively, the source network device receives the capability information of the neighboring network devices from a network management device. Alternatively, the source network device receives the capability information of the neighboring network devices from the terminal device.

In this implementation, a plurality of channels for receiving the capability information of the neighboring network devices are provided. Therefore, the implementation flexibility of the solution can be enhanced, and the source network device can use a more suitable manner in a specific application scenario to actively receive or passively receive the capability information of the neighboring network devices.

According to a second aspect, an embodiment of this application provides a communication method, including: A terminal device obtains air interface link signal information of neighboring network devices. The terminal device receives a system message, and obtains capability information of the neighboring network devices from the system message. The terminal device sends the air interface link signal information of the neighboring network devices and the capability information of the neighboring network devices to a source network device.

In this implementation, the terminal device sends the air interface link signal information of the neighboring network devices and the capability information of the neighboring network devices to the source network device, so that the source network device determines a target network device based on the air interface link signal information of the neighboring network devices and the capability information of the neighboring network devices. Therefore, the target network device determined by the source network device can better meet an air interface link communication requirement and a sidelink communication requirement of the terminal device. Therefore, if the terminal device is handed over to the target network device, a communication effect of the terminal device may not be reduced.

According to the second aspect, in a first implementation of the second aspect of the embodiments of this application, the capability information of the neighboring network devices includes at least one of sidelink scheduling capability information of the neighboring network devices or radio access technology information of the neighboring network devices.

In this implementation, a specific implementation of the capability information of the neighboring network devices is provided, so that the source network device uses more specific capability information of the neighboring network devices in different application scenarios to determine the target network device, and the determined target network device is more accurate.

According to the second aspect or the first implementation of the second aspect, in a second implementation of the second aspect of the embodiments of this application, the method further includes: The terminal device receives a correspondence from a policy control device, where the correspondence includes a correspondence between air interface link service requirement identification information and a communication priority and a correspondence between sidelink service requirement identification information and a communication priority. The terminal device determines sidelink priority information of the terminal device based on the air interface link service requirement identification information of the terminal device, the sidelink service requirement identification information of the terminal device, and the correspondence. The terminal device sends the sidelink priority information of the terminal device to the source network device.

In this implementation, a specific implementation in which the terminal device determines the sidelink priority information of the terminal device is specified, so that the sidelink priority information of the terminal device in this solution may be determined by the terminal device in addition to the source network device. Therefore, the implementation flexibility of determining the sidelink priority information of the terminal device is increased.

According to a third aspect, an embodiment of this application provides a communication method, including: An access management device receives sidelink communication capability information of a terminal device from the terminal device. The access management device receives sidelink authorization information of the terminal device from a unified data management device. The access management device sends the sidelink communication capability information and the sidelink authorization information to a source network device.

In this implementation, an approach for the source network device to obtain the sidelink communication capability information and the sidelink authorization information is specified, so that the source network device can determine the target network device based on the sidelink communication capability information, the sidelink authorization information, and other information.

According to a fourth aspect, an embodiment of this application provides a communication method, including: An access management device receives sidelink communication capability information of a terminal device from the terminal device. The access management device receives sidelink authorization information of the terminal device from a unified data management device. The access management device determines an available sidelink communication type of the terminal device based on the sidelink communication capability information of the terminal device and the sidelink authorization information of the terminal device. The access management device sends available sidelink communication type information of the terminal device to a source network device, where the available sidelink communication type information of the terminal device is used to indicate the available sidelink communication type of the terminal device.

In this implementation, the source network device may further directly obtain the available sidelink communication type of the terminal device, so that the source network device determines the target network device based on the available sidelink communication type of the terminal device and other information.

According to a fifth aspect, an embodiment of this application provides a communication device, including a transceiver module, configured to receive air interface link signal information of neighboring network devices from a terminal device; and a processing module, configured to determine a target network device based on sidelink information of the terminal device and the air interface link signal information of the neighboring network devices. The transceiver module is further configured to send a handover request to the target network device, where the handover request is used to request to hand over the terminal device from a source network device to the target network device.

In this embodiment of this application, when determining the target network device, the processing module in the communication device considers not only the air interface link signal information of the neighboring network devices, but also the sidelink information of the terminal device. Therefore, the target network device determined by the communication device can better meet an air interface link communication requirement and a sidelink communication requirement of the terminal device. Therefore, if the terminal device is handed over to the target network device, a communication effect of the terminal device may not be reduced.

According to the fifth aspect, in a first implementation of the fifth aspect of the embodiments of this application, the sidelink information of the terminal device includes at least one of first sidelink information of the terminal device or second sidelink information of the terminal device. The first sidelink information includes at least one of sidelink communication capability information of the terminal device, sidelink authorization information of the terminal device, or cross-radio access technology sidelink scheduling authorization information of the terminal device, or the first sidelink information includes at least one of available sidelink communication type information of the terminal device or cross-radio access technology sidelink scheduling authorization information of the terminal device. The second sidelink information includes sidelink priority information of the terminal device.

In this implementation, the sidelink information of the terminal device is further classified. The sidelink information of the terminal device may be classified into the first sidelink information and the second sidelink information in different application scenarios. Further, the first sidelink information may be classified into two types. Type 1: The first sidelink information may include at least one of the sidelink communication capability information of the terminal device, the sidelink authorization information of the terminal device, or the cross-radio access technology sidelink scheduling authorization information of the terminal device. Type 2: The first sidelink information may include at least one of the available sidelink communication type information of the terminal device or the cross-radio access technology sidelink scheduling authorization information of the terminal device. In addition, the second sidelink information includes sidelink priority information of the terminal device. The first sidelink information or the second sidelink information used in different application scenarios may be different. Therefore, in this implementation, the sidelink information of the terminal device is subdivided, so that the solution is clearer and the feasibility of the solution is enhanced.

According to the fifth aspect, in a second implementation of the fifth aspect of the embodiments of this application, the sidelink information of the terminal device includes the cross-radio access technology sidelink scheduling authorization information of the terminal device. The processing module is specifically configured to: when the cross-radio access technology sidelink scheduling authorization information of the terminal device indicates that the terminal device supports cross-radio access technology sidelink scheduling, determine a network device that is in the neighboring network devices and that meets a first air interface link communication condition of the terminal device as the target network device based on the air interface link signal information of the neighboring network devices. The air interface link signal information of the neighboring network devices includes air interface link signal values of the neighboring network devices, and the first air interface link communication condition includes that an air interface link signal value is greater than a first air interface link signal threshold.

In this implementation, it is clear that the sidelink information of the terminal device includes the cross-radio access technology sidelink scheduling authorization information of the terminal device, and when the cross-radio access technology sidelink scheduling authorization information of the terminal device indicates that the terminal device supports the cross-radio access technology sidelink scheduling, the communication device determines an implementation of the target network device. In this implementation, because the terminal device supports the cross-radio access technology sidelink scheduling, the terminal device using NR PC5 may be scheduled by a network device using LTE Uu, or the terminal device using LTE PC5 may be scheduled by a network device using NR Uu. In addition, regardless of whether the terminal device supports the cross-radio access technology sidelink scheduling, the terminal device using NR PC5 may be scheduled by the network device using NR Uu, or the terminal device using LTE PC5 may be scheduled by the network device using LTE Uu. Therefore, the processing module in the communication device can determine the target network device only by selecting a network device that meets the first air interface link communication condition. Therefore, the target network device determined in this implementation can better meet the communication requirement of the terminal device.

According to the fifth aspect or the first implementation of the fifth aspect, in a third implementation of the fifth aspect of the embodiments of this application, the processing module is specifically configured to determine the target network device based on the sidelink information of the terminal device, capability information of the neighboring network devices, and the air interface link signal information of the neighboring network devices.

In this embodiment, the capability information of the neighboring network devices is introduced as a reference, so that the processing module of the communication device can comprehensively consider more factors to determine the target network device. Therefore, a target network device that is more suitable for the terminal device can be determined, and the determined target network device can better meet the communication requirement of the terminal device.

According to the third implementation of the fifth aspect, in a fourth implementation of the fifth aspect of the embodiments of this application, the capability information of the neighboring network devices includes at least one of sidelink scheduling capability information of the neighboring network devices or radio access technology information of the neighboring network devices.

In this implementation, the capability information of the neighboring network devices is further limited, so that more specific capability information of the neighboring network devices is used in different application scenarios to determine the target network device, and the determined target network device is more accurate.

According to the third implementation of the fifth aspect or the fourth implementation of the fifth aspect, in a fifth implementation of the fifth aspect of the embodiments of this application, the processing module is specifically configured to: determine a network device that is in the neighboring network devices and that meets a first air interface link communication condition and supports sidelink communication scheduling of the terminal device as the target network device based on the first sidelink information, the capability information of the neighboring network devices, and the air interface link signal information of the neighboring network devices. Alternatively, when the communication device determines, based on the first sidelink information, the capability information of the neighboring network devices, and the air interface link signal information of the neighboring network devices, that no network device that meets the first air interface link communication condition and supports sidelink communication scheduling of the terminal device exists in the neighboring network devices, the processing module is specifically configured to determine the target network device based on the second sidelink information. The air interface link signal information of the neighboring network devices includes air interface link signal values of the neighboring network devices, and the first air interface link communication condition includes that an air interface link signal value is greater than a first air interface link signal threshold.

In this implementation, a scenario in which the first sidelink information or the second sidelink information is used is separately provided. In this way, the processing module in the communication device may use suitable sidelink information of the terminal device as a reference in different scenarios, and then may accurately determine the target network device that meets the communication requirement of the terminal device.

According to the fifth implementation of the fifth aspect, in a sixth implementation of the fifth aspect of the embodiments of this application, the capability information of the neighboring network devices includes the sidelink scheduling capability information of the neighboring network devices, and the first sidelink information includes the sidelink communication capability information of the terminal device and the sidelink authorization information of the terminal device. The processing module is specifically configured to: determine at least one candidate network device based on the sidelink communication capability information of the terminal device, the sidelink authorization information of the terminal device, and the sidelink scheduling capability information of the neighboring network devices, where an intersection exists between a sidelink communication type supported by the at least one candidate network device for scheduling, a sidelink communication type supported by the terminal device, and an authorized sidelink communication type of the terminal device, and determine a network device that is in the at least one candidate network device and that meets the first air interface link communication condition as the target network device based on air interface link signal information of the at least one candidate network device. Alternatively, the processing module is specifically configured to determine at least one candidate network device that is in the neighboring network devices and that meets the first air interface link communication condition based on the air interface link signal information of the neighboring network devices, and determine the target network device based on sidelink scheduling capability information of the at least one candidate network device, the sidelink communication capability information of the terminal device, and the sidelink authorization information of the terminal device, where an intersection exists between a sidelink communication type supported by the target network device for scheduling, a sidelink communication type supported by the terminal device, and an authorized sidelink communication type of the terminal device.

In this implementation, it is clear that when the capability information of the neighboring network devices includes the sidelink scheduling capability information of the neighboring network devices, the processing module in the communication device may determine, based on the sidelink scheduling capability information of the neighboring network devices, the sidelink communication type supported by the neighboring network devices for scheduling, or the communication device may separately determine the sidelink communication type supported by the terminal device and the authorized sidelink communication type of the terminal device based on the sidelink communication capability information of the terminal device and the sidelink authorization information of the terminal device. Therefore, the processing module in the communication device obtains an intersection by using the foregoing three types, and can determine that the target network device can meet the sidelink communication requirement of the terminal device. In addition, the processing module in the communication device may determine, based on the first air interface link communication condition, whether the neighboring network devices meet air interface link communication of the terminal device. Certainly, the step of determining, by the communication device, whether the neighboring network devices meet the sidelink communication requirement of the terminal device and the step of determining, by the communication device, whether the neighboring network devices meet the air interface link communication requirement of the terminal device are not limited in a time sequence. Therefore, the communication device can accurately and flexibly determine the target network device, and the target network device can better meet the requirement of the terminal device.

According to the fifth implementation of the fifth aspect, in a seventh implementation of the fifth aspect of the embodiments of this application, the capability information of the neighboring network devices includes the sidelink scheduling capability information of the neighboring network devices, and the first sidelink information includes the available sidelink communication type information of the terminal device. The processing module is specifically configured to: determine at least one candidate network device based on the available sidelink communication type information of the terminal device and the sidelink scheduling capability information of the neighboring network devices, where an intersection exists between a sidelink communication type supported by the at least one candidate network device for scheduling and an available sidelink communication type of the terminal device, and determine a network device that is in the at least one candidate network device and that meets the first air interface link communication condition as the target network device based on air interface link signal information of the at least one candidate network device. Alternatively, the processing module is specifically configured to: determine at least one candidate network device that is in the neighboring network devices and that meets the first air interface link communication condition based on the air interface link signal information of the neighboring network devices, and determine the target network device based on the sidelink scheduling capability information of the at least one candidate network device and the available sidelink communication type information of the terminal device, where an intersection exists between a sidelink communication type supported by the target network device for scheduling and an available sidelink communication type of the terminal device.

Compared with the sixth implementation of the fifth aspect, this implementation provides a manner of determining the available sidelink communication type of the terminal device. In this way, the processing module in the communication device can determine a target network device that meets the sidelink communication requirement of the terminal device by obtaining an intersection based on the sidelink communication types supported by the neighboring network devices for scheduling and the available sidelink communication type of the terminal device. Therefore, the implementation flexibility of this solution is increased.

According to the fifth implementation of the fifth aspect, in an eighth implementation of the fifth aspect of the embodiments of this application, the first sidelink information includes the cross-radio access technology sidelink scheduling authorization information of the terminal device, the sidelink communication capability information of the terminal device, and the sidelink authorization information of the terminal device; and the capability information of the neighboring network devices includes the radio access technology information of the neighboring network devices. The processing module is specifically configured to: when the cross-radio access technology sidelink scheduling authorization information of the terminal device indicates that the terminal device does not support cross-radio access technology sidelink scheduling, determine at least one candidate network device based on the radio access technology information of the neighboring network devices, the sidelink communication capability information of the terminal device, and the sidelink authorization information of the terminal device, where an intersection exists between a radio access technology type of the at least one candidate network device, a sidelink communication type supported by the terminal device, and an authorized sidelink communication type of the terminal device, and determine a network device that is in the at least one candidate network device and that meets the first air interface link communication condition as the target network device based on air interface link signal information of the at least one candidate network device. Alternatively, the processing module is specifically configured to: when the cross-radio access technology sidelink scheduling authorization information of the terminal device indicates that the terminal device does not support cross-radio access technology sidelink scheduling, determine at least one candidate network device that is in the neighboring network devices and that meets the first air interface link communication condition based on the air interface link signal information of the neighboring network devices, and determine the target network device based on radio access technology information of the at least one candidate network device, the sidelink communication capability information of the terminal device, and the sidelink authorization information of the terminal device, where an intersection exists between a radio access technology type of the target network device, a sidelink communication type supported by the terminal device, and an authorized sidelink communication type of the terminal device.

Compared with the sixth implementation of the fifth aspect, this implementation uses another manner of determining the neighboring network device that meets the sidelink communication requirement of the terminal device. In this manner, because the cross-radio access technology sidelink scheduling authorization information of the terminal device indicates that the terminal device does not support the cross-radio access technology sidelink scheduling, a terminal device using NR PC5 may be scheduled only by a network device using NR Uu, or a terminal device using LTE PC5 may be scheduled only by a network device using LTE Uu. Therefore, the processing module in the communication device can determine the neighboring network devices that meet the sidelink communication requirement of the terminal device by obtaining an intersection based on the radio access technology types that are of the neighboring network devices and that are indicated by the radio access technology information of the neighboring network devices, the sidelink communication type supported by the terminal device, and the authorized sidelink communication type of the terminal device. In this way, when the terminal device does not support the cross-radio access technology sidelink scheduling, the communication device can also determine the target network device that meets the communication requirement of the terminal device.

According to the fifth implementation of the fifth aspect, in a ninth implementation of the fifth aspect of the embodiments of this application, the first sidelink information includes the cross-radio access technology sidelink scheduling authorization information of the terminal device and the available sidelink communication type information of the terminal device; and the capability information of the neighboring network devices includes the radio access technology information of the neighboring network devices. The processing module is specifically configured to: when the cross-radio access technology sidelink scheduling authorization information of the terminal device indicates that the terminal device does not support cross-radio access technology sidelink scheduling, determine at least one candidate network device based on the radio access technology information of the neighboring network devices and the available sidelink communication type information of the terminal device, where an intersection exists between a radio access technology type of the at least one candidate network device and an available sidelink communication type of the terminal device, and determine a network device that is in the at least one candidate network device and that meets the first air interface link communication condition as the target network device based on air interface link signal information of the at least one candidate network device. Alternatively, the processing module is specifically configured to: when the cross-radio access technology sidelink scheduling authorization information of the terminal device indicates that the terminal device does not support cross-radio access technology sidelink scheduling, determine at least one candidate network device that is in the neighboring network devices and that meets the first air interface link communication condition based on the air interface link signal information of the neighboring network devices, and determine the target network device based on radio access technology information of the at least one candidate network device and the available sidelink communication type information of the terminal device, where an intersection exists between a radio access technology type of the target network device and an available sidelink communication type of the terminal device.

Compared with the eighth implementation of the first aspect, this implementation provides a manner of determining the available sidelink communication type of the terminal device. In this way, the processing module in the communication device can determine a target network device that meets the sidelink communication requirement of the terminal device by obtaining an intersection based on the radio access technology types of the neighboring network devices and the available sidelink communication type of the terminal device. Therefore, the implementation flexibility of this solution is increased.

According to the fifth implementation of the fifth aspect, in a tenth implementation of the fifth aspect of the embodiments of this application, the sidelink priority information of the terminal device is used to indicate that a sidelink communication priority of the terminal device is higher than an air interface link communication priority of the terminal device, or a sidelink communication priority of the terminal device is lower than an air interface link communication priority of the terminal device; or the sidelink priority information of the terminal device is used to indicate that sidelink communication of the terminal device is preferential, or sidelink communication of the terminal device is not preferential.

In this implementation, a function and a representation form of the sidelink priority information that is of the terminal device and that is included in the second sidelink information are specified. The sidelink priority information of the terminal device may indicate, for the terminal device, importance degrees of meeting the sidelink communication and meeting the air interface link communication. In other words, it is more important to first meet the sidelink communication, or more important to first meet the air interface link communication. Therefore, after the transceiver module of the communication device receives the sidelink priority information of the terminal device, it is helpful for the processing module in the communication device to determine a more suitable target network device for the terminal device based on the sidelink priority information of the terminal device, to better meet the communication requirement of the terminal device.

According to the ninth implementation of the fifth aspect or the tenth implementation of the fifth aspect, in an eleventh implementation of the fifth aspect of the embodiments of this application, the processing module is specifically configured to: when the sidelink priority information of the terminal device indicates that the sidelink communication priority of the terminal device is lower than the air interface link communication priority of the terminal device, or indicates that the sidelink communication of the terminal device is not preferential, determine the target network device based on the air interface link signal information of the neighboring network devices. Alternatively, the processing module is specifically configured to: when the sidelink priority information of the terminal device indicates that the sidelink communication priority of the terminal device is higher than the air interface link communication priority of the terminal device, or indicates that the sidelink communication of the terminal device is preferential, determine a network device that is in the neighboring network devices and that meets a second air interface link communication condition and supports the sidelink communication scheduling of the terminal device as the target network device. The second air interface link communication condition includes that an air interface link signal value is greater than a second air interface link signal threshold, and the second air interface link signal threshold is less than the first air interface link signal threshold.

In this implementation, an implementation in which the processing module in the communication device determines the target network device based on the second sidelink information is specified. The second sidelink information includes the sidelink priority information of the terminal device, and the sidelink priority information of the terminal device may indicate the importance degrees of the air interface link communication and the sidelink communication. Therefore, the processing module in the communication device determines, based on different priority requirements of the terminal device, a target network device that is more suitable for the terminal device, so that the target network device can better meet the communication requirement of the terminal device.

According to the eleventh implementation of the fifth aspect, in a twelfth implementation of the fifth aspect of the embodiments of this application, the air interface link signal value includes an air interface link signal strength value, the first air interface link signal threshold includes a first air interface link signal strength threshold, and the second air interface link signal threshold is a second air interface link signal strength threshold; and/or the air interface link signal value includes an air interface link signal quality value, the first air interface link signal threshold includes a first air interface link signal quality threshold, and the second air interface link signal threshold includes a second air interface link signal quality threshold.

In this implementation, two specific implementations of the air interface link signal value are provided. The air interface link signal value may be the air interface link signal strength value or the air interface link signal quality value. In this way, the communication device may use a more suitable air interface link signal value in a specific application scenario, to more accurately determine whether an air interface link signal value of a neighboring network device meets the first air interface link communication condition or the second air interface link communication condition.

According to the eleventh implementation of the fifth aspect or the twelfth implementation of the fifth aspect, in a thirteenth implementation of the fifth aspect of the embodiments of this application, the transceiver module is further configured to receive the sidelink priority information of the terminal device from the terminal device. Alternatively, the transceiver module is further configured to: receive a correspondence from a policy control device, where the correspondence includes a correspondence between air interface link service requirement identification information and a communication priority and a correspondence between sidelink service requirement identification information and a communication priority, and determine the sidelink priority information of the terminal device based on the air interface link service requirement identification information of the terminal device, the sidelink service requirement identification information of the terminal device, and the correspondence.

In this implementation, a plurality of sources of the sidelink priority information of the terminal device are specified. Therefore, the implementation flexibility of this solution is improved.

According to any one of the fourth implementation of the fifth aspect to the thirteenth implementation of the fifth aspect, in a fourteenth implementation of the fifth aspect of the embodiments of this application, the transceiver module is further configured to: receive the capability information of the neighboring network devices from the neighboring network devices through interfaces between the communication device and the neighboring network devices; receive the capability information of the neighboring network devices from a network management device; or receive the capability information of the neighboring network devices from the terminal device.

In this implementation, a plurality of channels for receiving the capability information of the neighboring network devices are provided. Therefore, the implementation flexibility of the solution can be enhanced, and the communication device can use a more suitable manner in a specific application scenario to actively receive or passively receive the capability information of the neighboring network devices.

According to a sixth aspect, an embodiment of this application provides a communication device, including: a transceiver module, configured to obtain air interface link signal information of neighboring network devices. The transceiver module is further configured to: receive a system message, and obtain capability information of the neighboring network devices from the system message. The transceiver module is further configured to send the air interface link signal information of the neighboring network devices and the capability information of the neighboring network devices to a source network device.

In this implementation, the communication device sends the air interface link signal information of the neighboring network devices and the capability information of the neighboring network devices to the source network device, so that the source network device determines a target network device based on the air interface link signal information of the neighboring network devices and the capability information of the neighboring network devices. Therefore, the target network device determined by the source network device can better meet an air interface link communication requirement and a sidelink communication requirement of the terminal device. Therefore, if the terminal device is handed over to the target network device, a communication effect of the terminal device may not be reduced.

According to the sixth aspect, in a first implementation of the sixth aspect of the embodiments of this application, the capability information of the neighboring network devices includes at least one of sidelink scheduling capability information of the neighboring network devices or radio access technology information of the neighboring network devices.

In this implementation, a specific implementation of the capability information of the neighboring network devices is provided, so that the source network device uses more specific capability information of the neighboring network devices in different application scenarios to determine the target network device, and the determined target network device is more accurate.

According to the sixth aspect or the first implementation of the sixth aspect, in a second implementation of the sixth aspect of the embodiments of this application, the communication device further includes a processing module. The processing module is configured to receive a correspondence from a policy control device, where the correspondence includes a correspondence between air interface link service requirement identification information and a communication priority and a correspondence between sidelink service requirement identification information and a communication priority; determine sidelink priority information of the terminal device based on the air interface link service requirement identification information of the terminal device, the sidelink service requirement identification information of the terminal device, and the correspondence; and send the sidelink priority information of the terminal device to the source network device.

In this implementation, a specific implementation in which the communication device determines the sidelink priority information of the terminal device is specified, so that the sidelink priority information of the terminal device in this solution may be determined by the communication device in addition to the source network device. Therefore, the implementation flexibility of determining the sidelink priority information of the terminal device is increased.

According to a seventh aspect, an embodiment of this application provides a communication device, including a transceiver module, configured to receive sidelink communication capability information of a terminal device from the terminal device. The transceiver module is further configured to receive sidelink authorization information of the terminal device from a unified data management device. The transceiver module is further configured to send the sidelink communication capability information and the sidelink authorization information to a source network device.

In this implementation, an approach for the source network device to obtain the sidelink communication capability information and the sidelink authorization information is specified, so that the source network device can determine the target network device based on the sidelink communication capability information, the sidelink authorization information, and other information.

According to an eighth aspect, an embodiment of this application provides a communication device, including a transceiver module, configured to receive sidelink communication capability information of a terminal device from the terminal device, where the transceiver module is further configured to receive sidelink authorization information of the terminal device from a unified data management device; and a processing module, configured to determine an available sidelink communication type of the terminal device based on the sidelink communication capability information of the terminal device and the sidelink authorization information of the terminal device. The transceiver module is further configured to send available sidelink communication type information of the terminal device to a source network device, where the available sidelink communication type information of the terminal device is used to indicate the available sidelink communication type of the terminal device.

In this implementation, the source network device may further directly obtain the available sidelink communication type of the terminal device, so that the source network device determines the target network device based on the available sidelink communication type of the terminal device and other information.

According to a ninth aspect, an embodiment of this application provides a communication device. The communication device may be a source network device, or may be a chip in the source network device. The communication device may include a processing module and a transceiver module. When the communication device is the source network device, the processing module may be a processor, and the transceiver module may be a transceiver. The communication device may further include a storage module, and the storage module may be a memory. The storage module is configured to store instructions, and the processing module executes the instructions stored in the storage module, to enable the communication device to perform the method according to any one of the first aspect or the implementations of the first aspect. When the communication device is the chip in the source network device, the processing module may be a processor, and the transceiver module may be an input/output interface, a pin, a circuit, or the like. The processing module executes instructions stored in a storage module, to enable the source network device to perform the method in any one of the first aspect or the implementations of the first aspect. The storage module may be a storage module (for example, a register or a cache) in the chip, or may be a storage module (for example, a read-only memory and a random access memory) outside the chip in the source network device.

According to a tenth aspect, an embodiment of this application provides a communication device. The communication device may be a terminal device, or may be a chip in the terminal device. The communication device may include a processing module and a transceiver module. When the communication device is the terminal device, the processing module may be a processor, and the transceiver module may be a transceiver. The communication device may further include a storage module, and the storage module may be a memory. The storage module is configured to store instructions, and the processing module executes the instructions stored in the storage module, to enable the terminal device to perform the method according to any one of the first aspect or the implementations of the first aspect. When the communication device is the chip in the terminal device, the processing module may be a processor, and the transceiver module may be an input/output interface, a pin, a circuit, or the like. The processing module executes instructions stored in a storage module, to enable the terminal device to perform the method in any one of the first aspect or the implementations of the first aspect. The storage module may be a storage module (for example, a register or a cache) in the chip, or may be a storage module (for example, a read-only memory and a random access memory) outside the chip in the terminal device.

According to an eleventh aspect, an embodiment of this application provides a communication device. The communication device may be an access management device, or may be a chip in the access management device. The communication device includes a processor and a memory. The memory is configured to store a program; and the processor is configured to execute the program, to implement the method described in the third aspect or the fourth aspect.

According to a twelfth aspect, an embodiment of this application provides a communication system. The communication system includes a source network device and a target network device. The source network device is configured to: receive air interface link signal information of neighboring network devices from a terminal device, determine the target network device based on sidelink information of the terminal device and the air interface link signal information of the neighboring network devices, and send a handover request to the target network device, where the handover request is used to request to hand over the terminal device from the source network device to the target network device. The target network device is configured to: allocate an air interface resource and a service bearer resource to the terminal device based on the handover request, and send a response message of the handover request to the source network device.

According to the twelfth aspect, in a first implementation of the twelfth aspect of the embodiments of this application, the communication system further includes the terminal device. The terminal device is configured to: obtain the air interface link signal information of the neighboring network devices, receive a system message, obtain capability information of the neighboring network devices from the system message, and send the air interface link signal information of the neighboring network devices and the capability information of the neighboring network devices to the source network device.

According to the first implementation of the twelfth aspect, in a second implementation of the twelfth aspect of the embodiments of this application, the communication system further includes an access management device. The access management device is configured to: receive sidelink communication capability information of the terminal device from the terminal device, and receive sidelink authorization information of the terminal device from a unified data management device; and send the sidelink communication capability information of the terminal device and the sidelink authorization information of the terminal device to the source network device, or determine an available sidelink communication type of the terminal device based on the sidelink communication capability information of the terminal device and the sidelink authorization information of the terminal device, and send available sidelink communication type information of the terminal device to the source network device. The available sidelink communication type information of the terminal device is used to indicate the available sidelink communication type of the terminal device.

According to a thirteenth aspect, an embodiment of this application provides a computer program product including instructions. When the computer program product runs on a computer, the computer is enabled to perform the method according to any one of the first aspect and the implementations of the first aspect, any one of the second aspect and the implementations of the second aspect, any one of the third aspect and the implementations of the third aspect, or any one of the fourth aspect and the implementations of the fourth aspect.

According to a fourteenth aspect, an embodiment of this application provides a computer-readable storage medium, including instructions. When the instructions are run on a computer, the computer is enabled to perform the method according to any one of the first aspect and the implementations of the first aspect, any one of the second aspect and the implementations of the second aspect, any one of the third aspect and the implementations of the third aspect, or any one of the fourth aspect and the implementations of the fourth aspect.

It can be learned from the foregoing technical solutions that the embodiments of this application have the following advantages:

In the embodiments of this application, when determining the target network device, the source network device considers not only the air interface link signal information of the neighboring network devices, but also the sidelink information of the terminal device. Therefore, the target network device determined by the source network device can better meet an air interface link communication requirement and a sidelink communication requirement of the terminal device. Therefore, if the terminal device is handed over to the target network device, a communication effect of the terminal device may not be reduced.

BRIEF DESCRIPTION OF DRAWINGS

To describe the technical solutions in the embodiments of this application more clearly, the following briefly describes the accompanying drawings for describing the embodiments. It is clear that the accompanying drawings in the following description show merely some embodiments of this application.

FIG. 5A and FIG. 513 are a flowchart of another communication method according to an embodiment of this application;

FIG. 613 is a schematic diagram of another V2X communication system according to an embodiment of this application;

FIG. 7A and FIG. 713 are a flowchart of another communication method according to an embodiment of this application;

FIG. 10A and FIG. 1013 are a flowchart of another communication method according to an embodiment of this application;

FIG. 1I is a flowchart of another communication method according to an embodiment of this application;

DESCRIPTION OF EMBODIMENTS

Figure 1:
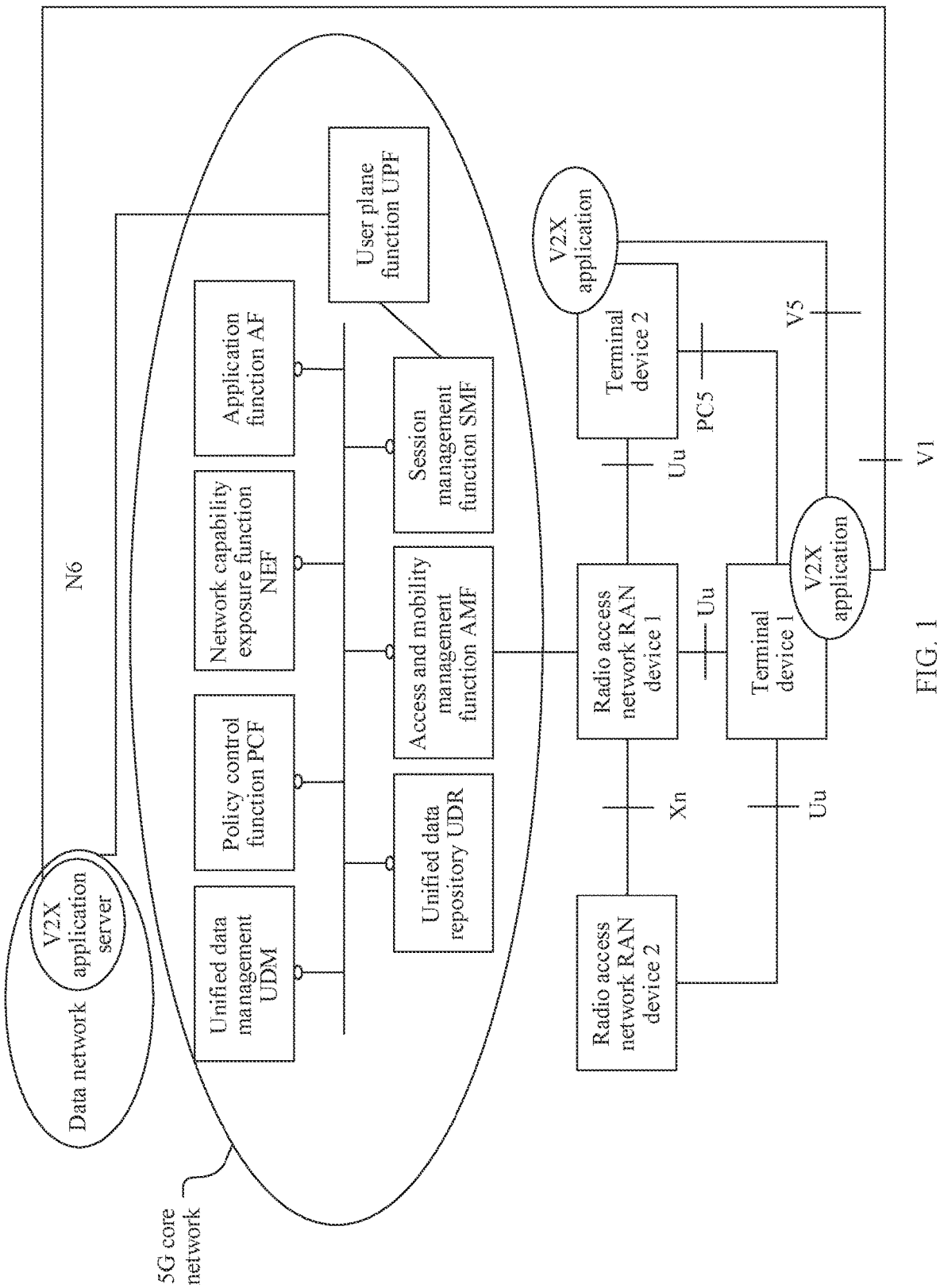
FIG. 1 is a schematic architectural diagram of a 5G-based internet of vehicles communication system.

Embodiments of this application provide a communication method and a related communication device, so that a target network device determined by a source network device can better meet an air interface link communication requirement and a sidelink communication requirement of a terminal device.

"First", "second", "third", "fourth", and the like in the embodiments of this application and the accompanying drawings are only used to distinguish between objects, and do not have a function of an order or a sequence. In addition, "comprising", "including", "having", and the like may all be understood as non-exclusive inclusion. In addition, the term "and/or" used in the embodiments of this application refers to and includes any or all possible combinations of one or more associated listed items.

For ease of understanding, the following describes some terms in the embodiments of this application.

Internet of vehicles (vehicle to X, V2X): The internet of vehicles can provide vehicle information by using a sensor mounted on a vehicle, a vehicle-mounted terminal device, or the like, to implement vehicle to vehicle (V2V) communication, vehicle to infrastructure (V2I), vehicle to network (V2N) communication, and vehicle to pedestrian (V2P) communication. Therefore, a terminal device related to the internet of vehicles may be referred to as a V2X terminal device.

Sidelink interface: The sidelink interface refers to a direct communication link interface between V2X terminal devices, and may be used for short-distance communication between the V2X terminal devices. The sidelink interface may also be referred to as a prose communication 5 (PC5) interface, or a direct link interface.

Air interface link interface: The air interface link interface may be a radio interface between a universal terrestrial radio access network (UTRAN) and user equipment (the radio interface between UTRAN and the user equipment, Uu). In the embodiments of this application, the air interface link interface may be a communication link interface between a terminal device and an access network device. The air interface link interface may alternatively be referred to as the Uu interface.

Sidelink communication capability (PC5 capability) information of the terminal device: The sidelink communication capability information of the terminal device may be used to indicate a sidelink communication type supported by the terminal device. The communication type may be long term evolution sidelink (LTE PC5) communication or new radio sidelink (NR PC5) communication. The communication type may change with the evolution of communication systems. Sidelink capabilities of the terminal device may include three types: supporting only the NR PC5 communication, supporting only the LIFE PC5 communication, and supporting both the LTE PC5 communication and the NR PC5 communication. It should be understood that the sidelink communication type supported by the terminal device may include one or more communication types. This is not specifically limited herein.

Sidelink authorization information of the terminal device: The sidelink authorization information may also be referred to as V2X service authorized information, and may be used to indicate an authorized sidelink communication type of the terminal device. Specifically, the sidelink authorization information may include whether sidelink communication of the terminal device is authorized and/or an authorized communication type. For example, the terminal device is authorized with the LTE PC5 communication, the terminal device is authorized with the NR PC5 communication, the terminal device is authorized with the NR PC5 communication and the LTE PC5 communication, or the terminal device is not authorized with the PC5 communication. For another example, the terminal device is authorized with the PC5 communication or the terminal device is not authorized with the PC5 communication. It should be understood that the authorized sidelink communication type of the terminal device may include one or more communication types. This is not specifically limited herein.

Available sidelink communication type (available PC5 RAT) information of the terminal device: The available sidelink communication type information of the terminal device may be used to indicate an available sidelink communication type of the terminal device. The available sidelink communication type of the terminal device may be determined based on the sidelink communication capability information of the terminal device and the sidelink authorization information of the terminal device. Specifically, the available sidelink communication type may be an intersection of the sidelink communication type supported by the terminal device and the authorized sidelink communication type of the terminal device. For example, assuming that the sidelink capability of the terminal device is supporting the LTE PC5 communication, and the authorized sidelink communication type of the terminal device is the LTE PC5 communication, the available sidelink communication type of the terminal device is the LTE PC5 communication. In addition, the available sidelink communication type of the terminal device may include one or more communication types. This is not specifically limited herein.

Radio access technology (RAT) information of a neighboring network device: The radio access technology information of a neighboring network device may be used to indicate a radio access technology used by an air interface link of the neighboring network device, for example, NR Uu or LTE Uu.

Cross-radio access technology sidelink scheduling authorization (cross-RAT PC5 scheduling authorization) information of the terminal device: The cross-radio access technology sidelink scheduling authorization information may be used to indicate whether the terminal device is authorized or allowed to be scheduled by a network device using a radio access technology different from that used by the terminal device. Specifically, the cross-radio access technology sidelink scheduling authorization information of the terminal device may be used to indicate that the terminal device is authorized with cross-radio access technology sidelink scheduling, or the terminal device is not authorized with cross-radio access technology sidelink scheduling. It should be noted that if the terminal device is authorized with the cross-radio access technology sidelink scheduling, the terminal device that performs communication by using NR. PC5 may be scheduled by the network device that uses an LTE radio access technology, or the terminal device that performs communication by using LTE PC5 may be scheduled by the network device that uses an NR radio access technology. If the terminal device is not authorized with the cross-radio access technology sidelink scheduling, the terminal device that performs communication by using NR PC5 may be scheduled only by the network device that uses the NR radio access technology, or the terminal device that performs communication by using LTE PC5 may be scheduled only by the network device that uses the LTE radio access technology.

Sidelink scheduling capability (scheduling capability for PC5) information of the neighboring network device: The sidelink scheduling capability information of the neighboring network device may be used to indicate a capability of the neighboring network device to perform sidelink communication scheduling on the terminal device. For example, the neighboring network device supports scheduling the terminal device to perform the NR PC5 communication only. Alternatively, the neighboring network device supports scheduling the terminal device to perform the LTE PC5 communication only. Alternatively, the neighboring network device supports scheduling the terminal device to perform the LTE PC-5 communication and the NR PC5 communication.

The solutions proposed in the embodiments of this application may be applied to a V2X communication system. The V2X communication system may be based on 5G, may be based on 4G, or may be based on a subsequently evolved access standard.

FIG. 1 is a schematic architectural diagram of a 5G-based V2X communication system. The V2X communication system mainly includes a 5G core network (5th generation core, 5GC) and a next generation radio access network (NG-RAN). The 5GC may include a plurality of network elements, which are specifically as follows.

Access and mobility management function (AMF) network element: The access and mobility management function network element may also be referred to as an access management device, and is mainly responsible for functions such as access control, mobility management, attach and detach, and gateway selection. When providing a service for a session in a terminal device, the AMF network element may provide a control plane storage resource for the session, to store a context of the session, and the like.

Session management function (SMF) network element: The session management function network element is responsible for user plane network element selection, user plane network element redirection, internet protocol (IP) address allocation, bearer establishment, modification, and release, quality of service (QoS) control, and the like.

User plane function (UPF) network element: The user plane function network element is responsible for forwarding user data of the terminal device. For example, the UPF network element receives user data from a data network, and transmits the user data to the terminal device by using an access network device. The UPF network element may alternatively receive user data from the terminal device by using the access network device, and forward the user data to the data network.

Network exposure function (NEF) network element: The network exposure function network element is mainly used to support interaction between a 3rd generation partnership project (3GPP) network and a third-party application. For example, the NEF network element may expose capabilities and events of the 3GPP network to a third party, to enhance or improve application quality of service. The 3GPP network may obtain related data of the third-party application from the third party through the NEF network element, to enhance intelligent decision-making of the network. The NEF network element may further support restoring structured data from a unified database or storing structured data in the unified database.

Application function (AF) network element: The application function network element mainly supports interaction with a 3GPP core network to provide a service. For example, some services of the third party are provided to a network side.

Policy control function (PCF) network element: The policy control function network element mainly provides a unified policy framework to control network behavior, or provides a policy rule for a control layer network function, and is responsible for obtaining user subscription information related to policy decision-making.

Unified data management (UDM) network element: The unified data management network element is mainly used for user data management, for example, subscription information management. Specifically, for a V2X terminal, the subscription information management includes managing the sidelink authorization information of the terminal device, the cross-radio access technology sidelink scheduling authorization information of the terminal device, and the like. This is not specifically limited herein.

Unified data repository (UDR) network element: The unified data repository network element is used to store and retrieve subscription data, policy data, public architecture data, and the like, and is also used by the UDM, the PCF, and the NEF to obtain related data.

Radio access network (RAN) device: The radio access network device includes a base station and an access point, and may be a device that is in an access network and that communicates with a terminal device by using one or more cells over an air interface. The RAN device may be configured to perform mutual conversion between a received over-the-air frame and a received internet protocol (IP) packet, and serve as a router between the terminal device and a remaining part of the access network. The RAN device may further coordinate attribute management of the air interface. For example, the RAN device may be an evolved base station (evolved NodeB, NodeB, eNB, or e-NodeB) in a long term evolution LTE system and an evolved LTE (LTE-Advanced, LTE-A) system, a next generation NodeB (gNB) in a new radio NR system, or a centralized unit (CU) and a distributed unit (DU) in a cloud access network (Cloud RAN) system. This is not limited in the embodiments of this application.

In addition, in the architectural diagram of the 5G-based V2X communication system shown in FIG. 1, radio access network devices may exchange data through an interface between the radio access network devices. The interface between the radio access network devices may be a point-to-point logical interface Xn. It should be understood that there may be a plurality of radio access network devices in the communication system. This is not specifically limited herein.

Terminal device: The terminal device includes a device that provides voice and/or data connectivity for a user. For example, the terminal device may include a handheld device having a wireless connection function, or a processing device connected to a wireless modem. The terminal device may communicate with a core network over a RAN, and exchange a voice and/or data with the RAN. Specifically, in a V2V communication process, the terminal device may be a vehicle-mounted terminal. In a V2I communication process, the terminal device may be a vehicle-mounted terminal or an infrastructure with a mobile communication function. In another V2X scenario, the terminal device may alternatively be another V2X device. This is not specifically limited herein. The terminal device may alternatively be a wearable device, such as glasses, gloves, watches, clothing, and shoes, or another portable device that may be directly worn on a body or integrated into clothes or accessories of a user.

In addition, in the architectural diagram of the internet of vehicles communication system shown in FIG. 1, the terminal device may communicate with another terminal device through a sidelink interface (PC5 interface). Alternatively, the terminal device may communicate with a radio access network through an air interface link interface (Uu interface), and may further communicate with a V2X server or another terminal device over a radio access network and a core network.

The solutions provided in the embodiments of this application are mainly applied to a handover scenario in V2X communication. For example, when a terminal device is handed over, a target network device of the terminal device may be determined from neighboring network devices of a source network device by using the solutions provided in the embodiments of this application. The source network device, namely, a network device that currently provides a service for the terminal device, is connected to the terminal device. The neighboring network devices are network devices near the source network device. The target network device is a network device to which the terminal device is to be handed over.

It should be noted that each of the network device, the source network device, the neighboring network device, and the target network device in this application may be a RAN device, or may be a device having a same or similar function, for example, a ng-eNB, a gNB, or an eNB. The gNB is a 5G base station, the eNB is a 4G base station, and the ng-eNB is a 4G base station connected to a 5GC. In addition, for the foregoing related nouns, terms, and steps, refer to the embodiments of this application.

For ease of understanding, the following describes a procedure of the communication method in the embodiments.

Figure 2:
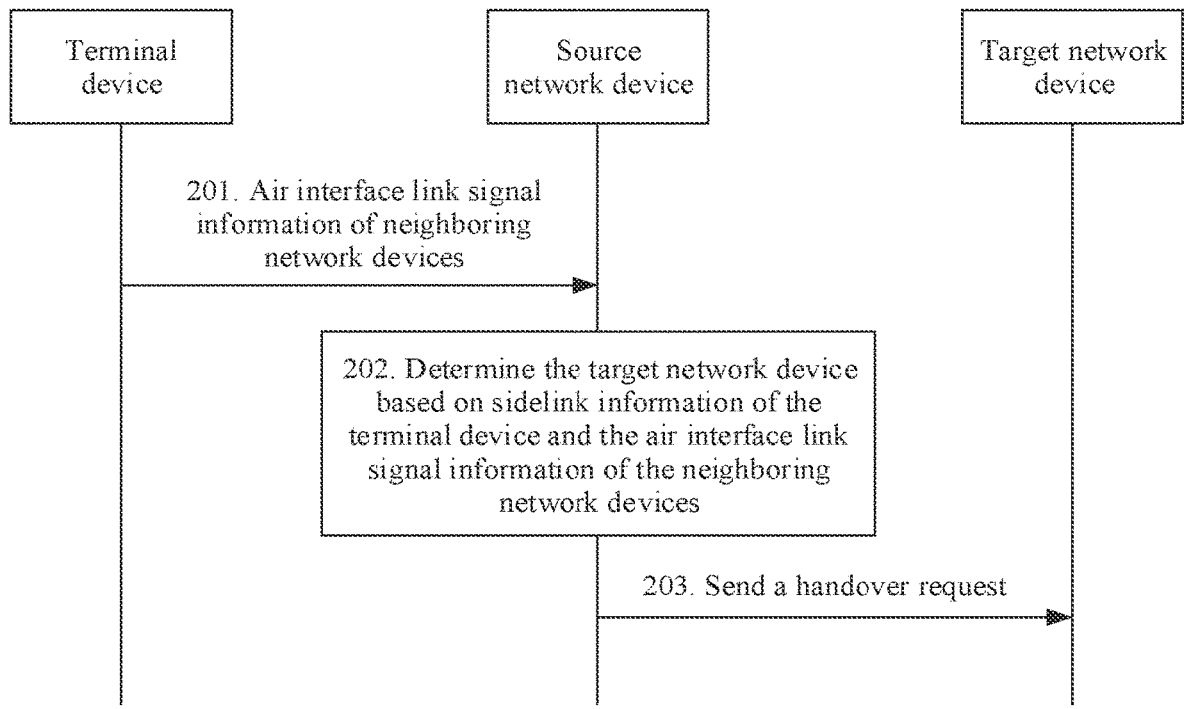
FIG. 2 is a flowchart of a communication method according to an embodiment of this application.

As shown in FIG. 2, an embodiment of this application provides a communication method. Details are as follows.

201. A source network device receives air interface link signal information of neighboring network devices from a terminal device.

The air interface link signal information may be used to indicate strength or quality of air interface link signals of the neighboring network devices, to indicate quality of the air interface link signals of the neighboring network devices.

The air interface link signal information of the neighboring network devices may include air interface link signal values of the neighboring network devices, and the air interface link signal values may include at least one of air interface link signal strength values and air interface link signal quality values. The air interface link signal strength value may be used to indicate signal strength of an air interface link. For example, the air interface link signal strength value may be reference signal received power (RSRP). The air interface link signal quality value may be used to indicate signal quality of an air interface link. For example, the air interface link signal quality value may be reference signal received quality (RSRQ).

202. The source network device determines a target network device based on sidelink information of the terminal device and the air interface link signal information of the neighboring network devices.

The sidelink information of the terminal device may include at least one of the following: first sidelink information of the terminal device or second sidelink information of the terminal device.

In an implementation, the first sidelink information may include at least one of the following: sidelink communication capability information of the terminal device, sidelink authorization information of the terminal device, or cross-radio access technology sidelink scheduling authorization information of the terminal device.

In another implementation, the first sidelink information of the terminal device includes at least one of the following: available sidelink communication type information of the terminal device, or cross-radio access technology sidelink scheduling authorization information of the terminal device.

The second sidelink information may include sidelink priority information of the terminal device.

In an implementation, the sidelink priority information of the terminal device may be used to indicate that a sidelink communication priority of the terminal device is higher than an air interface link communication priority of the terminal device, or a sidelink communication priority of the terminal device is lower than an air interface link communication priority of the terminal device.

In another implementation, the sidelink priority information of the terminal device may be used to indicate that sidelink communication of the terminal device is preferential, or sidelink communication of the terminal device is not preferential.

203. The source network device sends a handover request to the target network device.

The handover request may be used to request to hand over the terminal device from the source network device to the target network device.

After determining the target network device, the source network device may send the handover request to the target network device, so that the target network device allocates an air interface resource and a service bearer resource for access of the terminal device, and sends a response message of the handover request to the source network device.

According to the method provided in this embodiment, when determining the target network device, the source network device considers not only the air interface link signal information of the neighboring network devices, but also the sidelink information of the terminal device, to ensure that the target network device can better meet an air interface link communication requirement and a sidelink communication requirement of the terminal device. This improves a communication effect of the terminal device after the terminal device is handed over to the target network device.

Optionally, in a first implementation scenario of the foregoing embodiment, the sidelink information of the terminal device includes the cross-radio access technology sidelink scheduling authorization information of the terminal device, and step 202 may include the following step:

When the cross-radio access technology sidelink scheduling authorization information of the terminal device indicates that the terminal device supports cross-radio access technology sidelink scheduling, the source network device determines a network device that is in the neighboring network devices and that meets a first air interface link communication condition of the terminal device as the target network device based on the air interface link signal information of the neighboring network devices.

The first air interface link communication condition may include that an air interface link signal value is greater than a first air interface link signal threshold.

In such an implementation, because the terminal device supports the cross-radio access technology sidelink scheduling, the terminal device using NR PC5 may be scheduled by a network device using LTE Uu, or the terminal device using LTE PC5 may be scheduled by a network device using NR Uu. In addition, regardless of whether the terminal device supports the cross-radio access technology sidelink scheduling, the terminal device using NR PC5 may be scheduled by the network device using NR Uu, or the terminal device using LTE PC5 may be scheduled by the network device using LTE Uu. Therefore, the source network device can determine the target network device only by selecting a network device that meets the first air interface link communication condition. Therefore, the target network device determined in this implementation can better meet a communication requirement of the terminal device.

Optionally, in a second implementation scenario of the foregoing embodiment, step 202 may include the following step:

The source network device determines the target network device based on the sidelink information of the terminal device, capability information of the neighboring network devices, and the air interface link signal information of the neighboring network devices.

The capability information of the neighboring network devices includes at least one of the following: sidelink scheduling capability information of the neighboring network devices or radio access technology information of the neighboring network devices.

Further, the method may further include: The source network device receives the capability information of the neighboring network devices.

For example, the source network device may receive the capability information of the neighboring network devices in any one of the following manners:

Manner (1): The source network device receives the capability information of the neighboring network devices from the neighboring network devices through interfaces between the source network device and the neighboring network devices.

For example, in a 4G network, the interface between the source network device and the neighboring network device is an X2 interface, and the X2 interface is a logical interface between two eNodeBs in an E-UTRAN. In a 5G network, the interface between the source network device and the neighboring network device is an Xn interface, and the Xn interface is a point-to-point logical interface between two NG-RAN nodes.

Manner (2): The source network device receives the capability information of the neighboring network devices from a network management device.

The network management device may be any one of an operation, administration and maintenance (OAM) network element, a network management system (NMS) network element, or an element management system (EMS) network element. This is not specifically limited herein.

Manner (3): The source network device receives the capability information of the neighboring network devices from the terminal device.

The terminal device may send the capability information of the neighboring network devices to the source network device by using a measurement report, or may send the capability information of the neighboring network devices to the source network device by using another message. This is not specifically limited herein.

In such an implementation, in addition to the air interface link signal information of the neighboring network devices and the sidelink information of the terminal device, the capability information of the neighboring network devices is further introduced as a reference for the source network device to consider. Therefore, the target network device determined by the source network device may be more accurate, so that it is ensured that the target network device can better meet the air interface link communication requirement and the sidelink communication requirement of the terminal device.

Optionally, in the foregoing second implementation scenario, that the source network device determines the target network device based on the sidelink information of the terminal device, capability information of the neighboring network devices, and the air interface link signal information of the neighboring network devices includes:

The source network device determines a network device that is in the neighboring network devices and that meets a first air interface link communication condition and supports sidelink communication scheduling of the terminal device as the target network device based on the first sidelink information, the capability information of the neighboring network devices, and the air interface link signal information of the neighboring network devices.

The first air interface link communication condition includes that an air interface link signal value is greater than a first air interface link signal threshold.

The capability information of the neighboring network devices may include the sidelink scheduling capability information of the neighboring network devices.

In an example, the capability information of the neighboring network devices includes the sidelink scheduling capability information of the neighboring network devices, and the first sidelink information includes the sidelink communication capability information of the terminal device and the sidelink authorization information of the terminal device. That the source network device determines a network device that is in the neighboring network devices and that meets a first air interface link communication condition and supports sidelink communication scheduling of the terminal device as the target network device based on the first sidelink information, the capability information of the neighboring network devices, and the air interface link signal information of the neighboring network devices includes:

The source network device determines at least one candidate network device based on the sidelink communication capability information of the terminal device, the sidelink authorization information of the terminal device, and the sidelink scheduling capability information of the neighboring network devices.

The source network device determines a network device that is in the at least one candidate network device and that meets the first air interface link communication condition as the target network device based on air interface link signal information of the at least one candidate network device.

An intersection exists between a sidelink communication type supported by the at least one candidate network device for scheduling, a sidelink communication type supported by the terminal device, and an authorized sidelink communication type of the terminal device.

In another example, the capability information of the neighboring network devices includes the sidelink scheduling capability information of the neighboring network devices, and the first sidelink information includes the sidelink communication capability information of the terminal device and the sidelink authorization information of the terminal device. That the source network device determines a network device that is in the neighboring network devices and that meets a first air interface link communication condition and supports sidelink communication scheduling of the terminal device as the target network device based on the first sidelink information, the capability information of the neighboring network devices, and the air interface link signal information of the neighboring network devices includes:

The source network device determines at least one candidate network device that is in the neighboring network devices and that meets the first air interface link communication condition based on the air interface link signal information of the neighboring network devices.

The source network device determines the target network device based on sidelink scheduling capability information of the at least one candidate network device, the sidelink communication capability information of the terminal device, and the sidelink authorization information of the terminal device. An intersection exists between a sidelink communication type supported by the target network device for scheduling, a sidelink communication type supported by the terminal device, and an authorized sidelink communication type of the terminal device.

In another example, the capability information of the neighboring network devices includes the sidelink scheduling capability information of the neighboring network devices, and the first sidelink information includes available sidelink communication type information of the terminal device. That the source network device determines a network device that is in the neighboring network devices and that meets a first air interface link communication condition and supports sidelink communication scheduling of the terminal device as the target network device based on the first sidelink information, the capability information of the neighboring network devices, and the air interface link signal information of the neighboring network devices includes:

The source network device determines at least one candidate network device based on the available sidelink communication type information of the terminal device and the sidelink scheduling capability information of the neighboring network devices.

The source network device determines a network device that is in the at least one candidate network device and that meets the first air interface link communication condition as the target network device based on air interface link signal information of the at least one candidate network device.

An intersection exists between a sidelink communication type supported by the at least one candidate network device for scheduling and an available sidelink communication type of the terminal device.

In another example, the capability information of the neighboring network devices includes the sidelink scheduling capability information of the neighboring network devices, and the first sidelink information includes available sidelink communication type information of the terminal device. That the source network device determines a network device that is in the neighboring network devices and that meets a first air interface link communication condition and supports sidelink communication scheduling of the terminal device as the target network device based on the first sidelink information, the capability information of the neighboring network devices, and the air interface link signal information of the neighboring network devices includes:

The source network device determines at least one candidate network device that is in the neighboring network devices and that meets the first air interface link communication condition based on the air interface link signal information of the neighboring network devices.

The source network device determines the target network device based on sidelink scheduling capability information of the at least one candidate network device and the available sidelink communication type information of the terminal device.

An intersection exists between a sidelink communication type supported by the target network device for scheduling and an available sidelink communication type of the terminal device.

In another implementation of the foregoing second implementation scenario, the capability information of the neighboring network devices includes radio access technology information of the neighboring network devices.

In an example, the first sidelink information includes the cross-radio access technology sidelink scheduling authorization information of the terminal device, the sidelink communication capability information of the terminal device, and the sidelink authorization information of the terminal device; and the capability information of the neighboring network devices includes the radio access technology information of the neighboring network devices. That the source network device determines a network device that is in the neighboring network devices and that meets a first air interface link communication condition and supports sidelink communication scheduling of the terminal device as the target network device based on the first sidelink information, the capability information of the neighboring network devices, and the air interface link signal information of the neighboring network devices includes the following step:

When the cross-radio access technology sidelink scheduling authorization information of the terminal device indicates that the terminal device does not support cross-radio access technology sidelink scheduling, the source network device determines at least one candidate network device based on the radio access technology information of the neighboring network devices, the sidelink communication capability information of the terminal device, and the sidelink authorization information of the terminal device.

The source network device determines a network device that is in the at least one candidate network device and that meets the first air interface link communication condition as the target network device based on air interface link signal information of the at least one candidate network device.

An intersection exists between a radio access technology type of the at least one candidate network device, a sidelink communication type supported by the terminal device, and an authorized sidelink communication type of the terminal device.

In another example, the first sidelink information includes the cross-radio access technology sidelink scheduling authorization information of the terminal device, the sidelink communication capability information of the terminal device, and the sidelink authorization information of the terminal device; and the capability information of the neighboring network devices includes the radio access technology information of the neighboring network devices. That the source network device determines a network device that is in the neighboring network devices and that meets a first air interface link communication condition and supports sidelink communication scheduling of the terminal device as the target network device based on the first sidelink information, the capability information of the neighboring network devices, and the air interface link signal information of the neighboring network devices includes the following step:

When the cross-radio access technology sidelink scheduling authorization information of the terminal device indicates that the terminal device does not support cross-radio access technology sidelink scheduling, the source network device determines at least one candidate network device that is in the neighboring network devices and that meets the first air interface link communication condition based on the air interface link signal information of the neighboring network devices.

The source network device determines the target network device based on radio access technology information of the at least one candidate network device, the sidelink communication capability information of the terminal device, and the sidelink authorization information of the terminal device.

An intersection exists between a radio access technology type of the target network device, a sidelink communication type supported by the terminal device, and an authorized sidelink communication type of the terminal device.

In another example, the first sidelink information includes the cross-radio access technology sidelink scheduling authorization information of the terminal device and the available sidelink communication type information of the terminal device; and the capability information of the neighboring network devices includes the radio access technology information of the neighboring network devices. That the source network device determines a network device that is in the neighboring network devices and that meets a first air interface link communication condition and supports sidelink communication scheduling of the terminal device as the target network device based on the first sidelink information, the capability information of the neighboring network devices, and the air interface link signal information of the neighboring network devices includes the following step:

When the cross-radio access technology sidelink scheduling authorization information of the terminal device indicates that the terminal device does not support cross-radio access technology sidelink scheduling, the source network device determines at least one candidate network device based on the radio access technology information of the neighboring network devices and the available sidelink communication type information of the terminal device.

The source network device determines a network device that is in the at least one candidate network device and that meets the first air interface link communication condition as the target network device based on air interface link signal information of the at least one candidate network devices.

An intersection exists between a radio access technology type of the at least one candidate network device and an available sidelink communication type of the terminal device.

In another example, the first sidelink information includes the cross-radio access technology sidelink scheduling authorization information of the terminal device and the available sidelink communication type information of the terminal device; and the capability information of the neighboring network devices includes the radio access technology information of the neighboring network devices. That the source network device determines a network device that is in the neighboring network devices and that meets a first air interface link communication condition and supports sidelink communication scheduling of the terminal device as the target network device based on the first sidelink information, the capability information of the neighboring network devices, and the air interface link signal information of the neighboring network devices includes the following step:

When the cross-radio access technology sidelink scheduling authorization information of the terminal device indicates that the terminal device does not support cross-radio access technology sidelink scheduling, the source network device determines at least one candidate network device that is in the neighboring network devices and that meets the first air interface link communication condition based on the air interface link signal information of the neighboring network devices.

The source network device determines the target network device based on radio access technology information of the at least one candidate network device and the available sidelink communication type information of the terminal device.

An intersection exists between a radio access technology type of the target network device and an available sidelink communication type of the terminal device.

In such an implementation, the source network device may subdivide the capability information of the neighboring network devices into the sidelink scheduling capability information of the neighboring network devices and the radio access technology information of the neighboring network devices in different example scenarios. In addition, the source network device subdivides the sidelink information of the terminal device into the first sidelink information and the second sidelink information in different example scenarios. Further, the source network device can determine the target network device based on more suitable information in different example scenarios.

Optionally, in a third implementation scenario of the foregoing embodiment, step 202 may include the following step:

When the source network device determines, based on the first sidelink information, the capability information of the neighboring network devices, and the air interface link signal information of the neighboring network devices, that no network device that meets a first air interface link communication condition and supports sidelink communication scheduling of the terminal device exists in the neighboring network devices, the source network device determines the target network device based on the second sidelink information.

For example, assuming that the second sidelink information is the sidelink priority information of the terminal device, the source network device may determine the target network device based on the sidelink priority information of the terminal device in the following two manners:

Manner 1: When the sidelink priority information of the terminal device indicates that a sidelink communication priority of the terminal device is lower than an air interface link communication priority of the terminal device, or indicates that sidelink communication of the terminal device is not preferential, the source network device determines the target network device based on the air interface link signal information of the neighboring network devices.

Manner 2: When the sidelink priority information of the terminal device indicates that a sidelink communication priority of the terminal device is higher than an air interface link communication priority of the terminal device, or indicates that sidelink communication of the terminal device is preferential, the source network device determines a network device that is in the neighboring network devices and that meets a second air interface link communication condition and supports the sidelink communication scheduling of the terminal device as the target network device.

The second air interface link communication condition may include that an air interface link signal value is greater than a second air interface link signal threshold, and the second air interface link signal threshold is less than a first air interface link signal threshold.

In this implementation, the second sidelink information includes the sidelink priority information of the terminal device, and the sidelink priority information of the terminal device may indicate importance degrees of air interface link communication and the sidelink communication. Therefore, the source network device determines, based on different priority requirements of the terminal device, a target network device that is more suitable for the terminal device, so that the target network device can better meet the communication requirement of the terminal device.

Optionally, in a fourth implementation scenario of the foregoing embodiment, the method further includes the following step:

The source network device receives the sidelink priority information of the terminal device from the terminal device.

Alternatively, the source network device receives a correspondence from a policy control device, where the correspondence includes a correspondence between air interface link service requirement identification information and a communication priority and a correspondence between sidelink service requirement identification information and a communication priority, and determines the sidelink priority information of the terminal device based on the air interface link service requirement identification information of the terminal device, the sidelink service requirement identification information of the terminal device, and the correspondence.

In such an implementation, a plurality of channels for obtaining the sidelink priority information of the terminal device are provided for the source network device. Therefore, before the source network device determines, based on different priority requirements of the terminal device, a target network device that is more suitable for the terminal device, the source network device may ensure that the sidelink priority information of the terminal device can be obtained. In addition the implementation flexibility of the solution can be improved.

Optionally, in a fifth implementation scenario of the foregoing embodiment, the method further includes the following step:

When the first sidelink information includes the sidelink communication capability information of the terminal device and the sidelink authorization information of the terminal device, the source network device obtains the sidelink communication capability information of the terminal device and the sidelink authorization information of the terminal device from an access management device.

For example, the access management device may receive the sidelink communication capability information of the terminal device from the terminal device, and receive the sidelink authorization information of the terminal device from a unified data management device. Then, the access management device directly sends the sidelink communication capability information of the terminal device and the sidelink authorization information of the terminal device to the source network device.

In such an implementation, the source network device may directly obtain the sidelink communication capability information of the terminal device and the sidelink authorization information of the terminal device, so that available sidelink information of the terminal device is determined before the target network device is subsequently determined. Alternatively, the source network device directly determines, by using the sidelink communication capability information of the terminal device, the sidelink authorization information of the terminal device, and the capability information of the neighboring network devices, a type that can meet the sidelink communication requirement of the terminal device, to further determine the target network device. Therefore, the target network device can be flexibly and efficiently determined in this solution.

Optionally, in a sixth implementation scenario of the foregoing embodiment, the method further includes the following step:

When the first sidelink information includes the available sidelink communication type information of the terminal device, the source network device may directly obtain the available sidelink communication type information of the terminal device from an access management device.

For example, the access management device may receive the sidelink communication capability information of the terminal device from the terminal device, and receive the sidelink authorization information of the terminal device from a unified data management device. Then, the access management device determines an available sidelink communication type of the terminal device based on the sidelink communication capability information of the terminal device and the sidelink authorization information of the terminal device. Then, the access management device sends the available sidelink communication type information of the terminal device to the source network device. The available sidelink communication type information of the terminal device is used to indicate the available sidelink communication type of the terminal device.

In such an implementation, the source network device may alternatively receive the available sidelink communication type information of the terminal device. The available sidelink communication type information of the terminal device indicates the available sidelink communication type of the terminal device. Therefore, the source network device may directly obtain an intersection between the available sidelink communication type of the terminal device, and a sidelink type or a radio access technology type indicated by the capability information of the neighboring network devices, to determine the target network device. Therefore, in such an implementation, because the access management device performs the step of determining the available sidelink communication type information of the terminal device, the step of determining the target network device by the source network device is simplified.

It should be noted that the foregoing implementation scenarios may be combined. No limitation is imposed.

Figure 3:
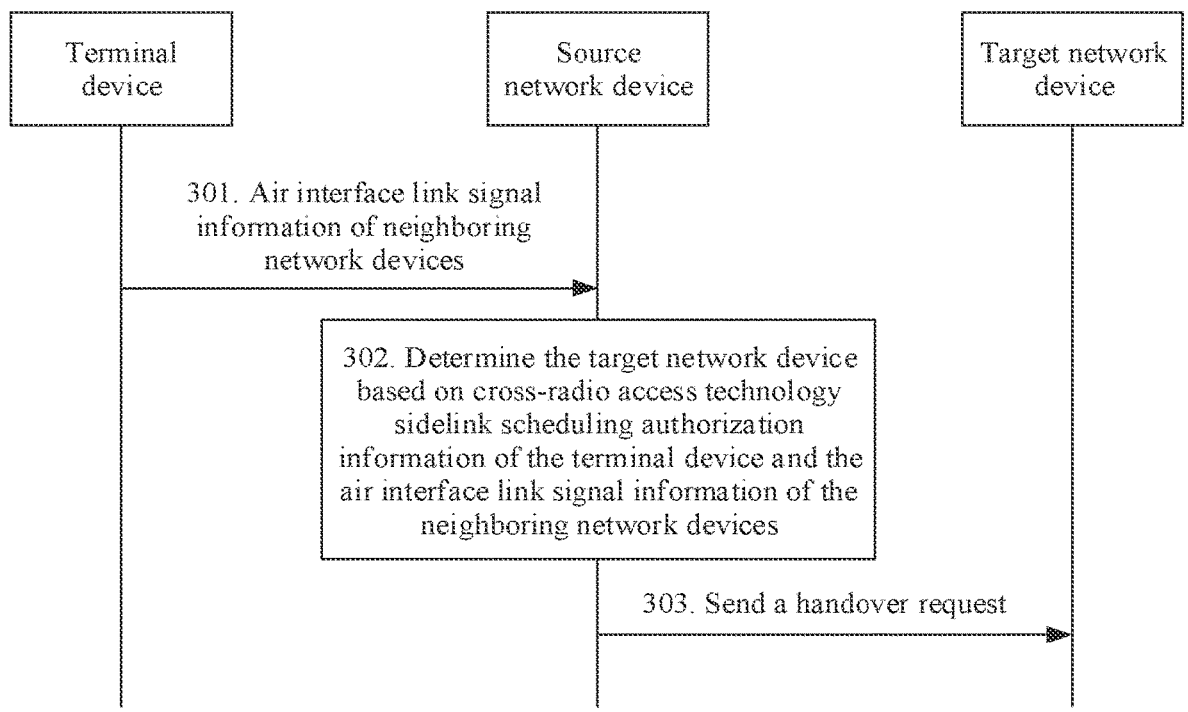
FIG. 3 is a flowchart of another communication method according to an embodiment of this application.

As shown in FIG. 3, an embodiment of this application provides another communication method. Details are as follows.

301. A source network device receives air interface link signal information of neighboring network devices from a terminal device.

For the air interface link signal information, refer to the related descriptions in the embodiment shown in FIG. 2. Details are not described again.

The source network device is connected to the terminal device.

It should be noted that, when the terminal device needs to be handed over from a network device, the source network device may use a plurality of neighboring network devices near the source network device as a reference, and receive the air interface link signal information of the neighboring network devices from the terminal device, to determine a target network device of the terminal device.

302. The source network device determines a target network device based on cross-radio access technology sidelink scheduling authorization information of the terminal device and the air interface link signal information of the neighboring network devices.

For step 302, refer to the first implementation scenario in the embodiment shown in FIG. 2.

The cross-radio access technology sidelink scheduling authorization information of the terminal device may be used to indicate whether the terminal device is allowed to be scheduled by a network device using a radio access technology different from that used by the terminal device. This may include: The terminal device is authorized with cross-radio access technology sidelink scheduling or the terminal device is not authorized with the cross-radio access technology sidelink scheduling. For example, if the terminal device is authorized with the cross-radio access technology sidelink scheduling, the terminal device using NR PC5 may be scheduled by the network device using LTE Uu, or the terminal device using LIE PC5 may be scheduled by the network device using NR Uu, if the terminal device is not authorized with the cross-radio access technology sidelink scheduling, the terminal device using NR PC5 may be scheduled only by the network device using NR Uu, or the terminal device using LTE PC5 may be scheduled only by the network device using LTE Uu.

It should be understood that the cross-radio access technology sidelink scheduling authorization information of the terminal device in this embodiment may be from an access management device. For example, the source network device actively obtains the cross-radio access technology sidelink scheduling authorization information of the terminal device from the access management device, or the source network device receives the cross-radio access technology sidelink scheduling authorization information of the terminal device that is actively sent by the access management device.

The access management device may be an AMF network element.

In an example, when the cross-radio access technology sidelink scheduling authorization information of the terminal device indicates that the terminal device supports cross-radio access technology sidelink scheduling, the source network device determines a network device that is in the neighboring network devices and that meets a first air interface link communication condition of the terminal device as the target network device based on the air interface link signal information of the neighboring network devices. The first air interface link communication condition is that an air interface link signal value is greater than a first air interface link signal threshold. For the air interface link signal value, refer to the related descriptions in the embodiment shown in FIG. 2. Details are not described again.

For ease of understanding, a description is provided below with reference to a specific example.

It is assumed that the cross-radio access technology sidelink scheduling authorization information of the terminal device indicates that the terminal device supports the cross-radio access technology sidelink scheduling, that is, a neighboring network device using LIE Uu can schedule a terminal device using NR PC5, or a neighboring network device using NR Uu can schedule a terminal device using LTE PC5. The neighboring network device using LTE Uu can schedule the terminal device using LTE PC5, and the neighboring network device using NR Uu can schedule the terminal device using NR PC5. In this case, the neighboring network device can schedule the terminal device regardless of which radio access technology is used by the neighboring network device. In this case, the source network device may determine a network device that meets the first air interface link communication condition as the target network device.

303. The source network device sends a handover request to the target network device.

Step 303 is similar to step 203. Details are not described again.

In this embodiment, because the terminal device supports the cross-radio access technology sidelink scheduling, the terminal device using NR PC5 may be scheduled by the network device using LTE Uu, or the terminal device using LTE PC5 may be scheduled by the network device using NR Uu. In addition, regardless of whether the terminal device supports the cross-radio access technology sidelink scheduling, the terminal device using NR PC5 may be scheduled by the network device using NR Uu, or the terminal device using LTE PC5 may be scheduled by the network device using LTE Uu. Therefore, the source network device can determine the target network device only by selecting a network device that meets the first air interface link communication condition. Therefore, the target network device determined in this implementation can better meet a communication requirement of the terminal device.

Figure 4:
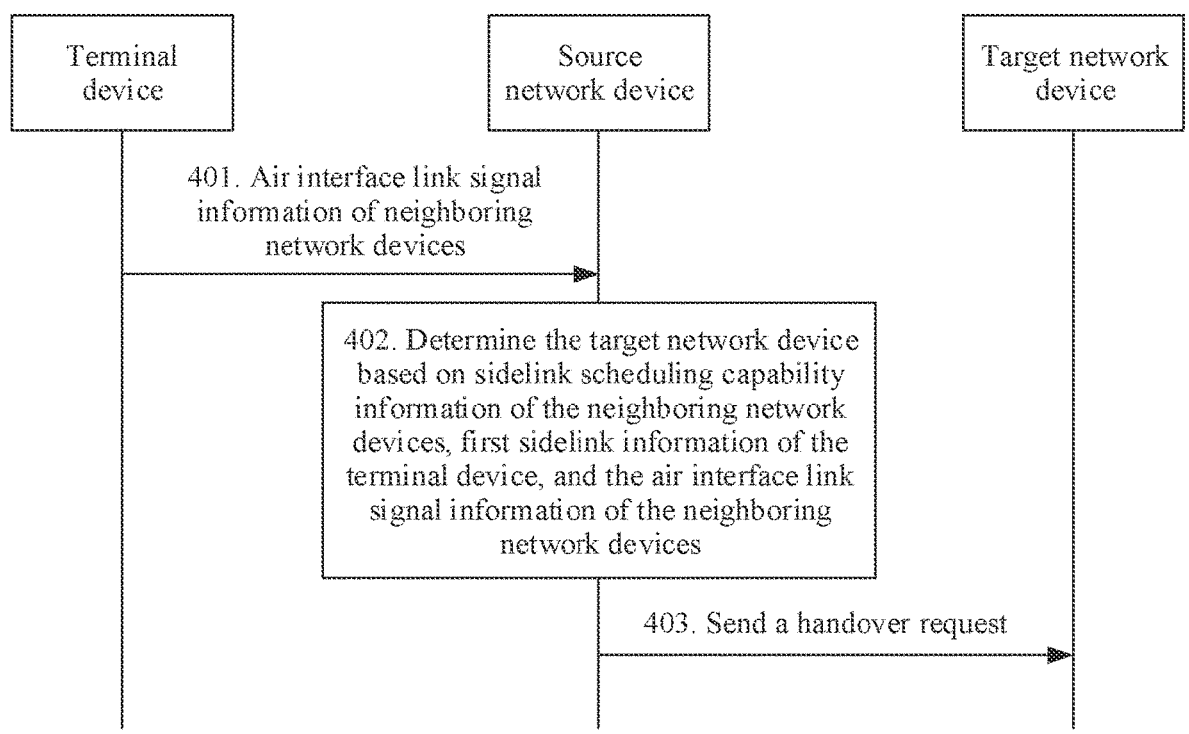
FIG. 4 is a flowchart of another communication method according to an embodiment of this application.

The following describes an implementation in which capability information of the neighboring network devices includes sidelink scheduling capability information of the neighboring network devices. As shown in FIG. 4, an embodiment of this application provides another communication method. Details are as follows.

401. A source network device receives air interface link signal information of neighboring network devices from a terminal device.

Step 401 is similar to step 301 Details are not described again.

402. The source network device determines a target network device based on sidelink scheduling capability information of the neighboring network devices, first sidelink information of the terminal device, and the air interface link signal information of the neighboring network devices.

The capability information of the neighboring network devices may be the sidelink scheduling capability information of the neighboring network devices. Specifically, the source network device may actively obtain the sidelink scheduling capability information of the neighboring network devices from another device, or may passively receive the sidelink scheduling capability information of the neighboring network devices from another device. This is not limited.

403. The source network device sends a handover request to the target network device.

Step 403 is similar to step 203. Details are not described again.

For step 402, refer to an implementation of the second implementation scenario in the embodiment shown in FIG. 2. The following may separately describe implementations of step 402 with reference to different information included in the first sidelink information.

Manner 1: The first sidelink information of the terminal device includes sidelink communication capability information of the terminal device and sidelink authorization information of the terminal device. The source network device determines the target network device based on the sidelink scheduling capability information of the neighboring network devices, the sidelink communication capability information of the terminal device, the sidelink authorization information of the terminal device, and the air interface link signal information of the neighboring network devices.

For example, the source network device may first determine an available sidelink communication type of the terminal device based on the sidelink communication capability information of the terminal device and the sidelink authorization information of the terminal device, and determine, based on the sidelink scheduling capability information of the neighboring network devices, sidelink communication types supported by a plurality of neighboring network devices near the source network device for scheduling. Then, the source network device determines whether an intersection exists between the available sidelink communication type of the terminal device and the sidelink communication types supported by the neighboring network devices for scheduling, and determines at least one neighboring network device whose sidelink communication type has an intersection with the available sidelink communication type of the terminal device as at least one candidate network device. There may be only one candidate network device, or there may be a plurality of candidate network devices. Further, the source network device may determine a network device that is in the at least one candidate network device and that meets the first air interface link communication condition as the target network device based on air interface link signal information of the at least one candidate network device.

The first air interface link communication condition has been described in detail above. Details are not described again.

It should be noted that the step in which the source network device determines the available sidelink communication type of the terminal device and the step in which the source network device determines the sidelink communication types supported by the neighboring network devices for scheduling are not limited in a time sequence.

For ease of understanding, Manner 1 is described below with reference to FIG. 4A. Details are as follows.

Figure 4A:
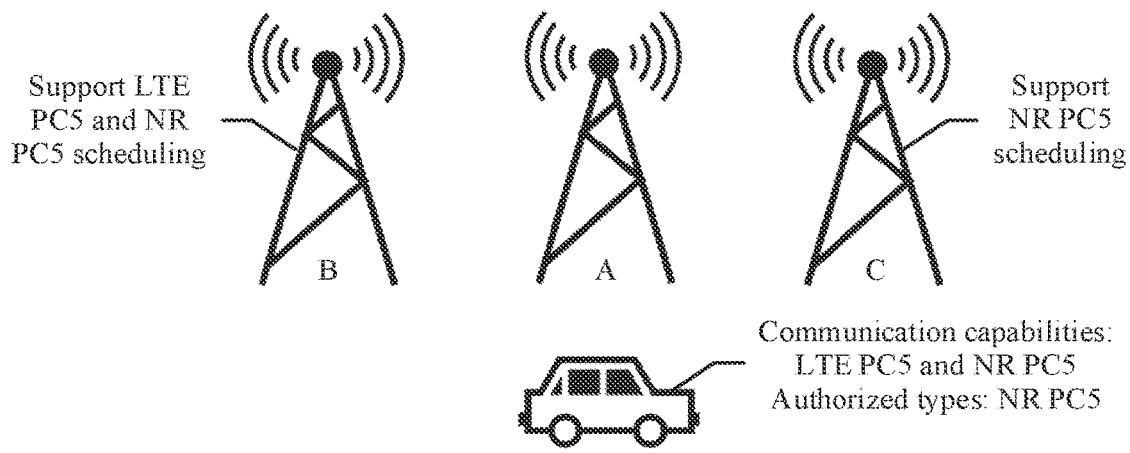
FIG. 4A is a schematic diagram of a V2X communication system according to an embodiment of this application.

As shown in FIG. 4A, a V2X communication system includes a network device A, a network device B, a network device C, and a terminal device (a vehicle in the figure). The network device A is a source network device, and the network device B and the network device C are neighboring network devices near the source network device.

It is assumed that the sidelink communication capability information of the terminal device indicates that sidelink communication capabilities of the terminal device are LTE PC5 and NR PC5, and the sidelink authorization information of the terminal device indicates that an authorized communication type of the terminal device is NR PC5. In this case, the available sidelink communication type of the terminal device is an intersection between the sidelink communication types that are supported by the terminal device and that are indicated by the sidelink communication capabilities of the terminal device and the authorized communication type of the terminal device. That is, the intersection is NR PC5 In addition, sidelink scheduling capability information of the network device B indicates that sidelink communication types supported by the network device B for scheduling are LTE PC5 and NR PC5. Sidelink scheduling capability information of the network device C indicates that a sidelink communication type supported by the network device C for scheduling is NR PC5.

In one case, because an intersection, namely, NR PC5, exists between the sidelink communication types supported by the network device B for scheduling and the available sidelink communication type of the terminal device, the network device B may be used as a candidate network device. Similarly, because an intersection, namely, NR PC5, also exists between the sidelink communication type supported by the network device C for scheduling and the available sidelink communication type of the terminal device, the network device C may also be used as a candidate network device. In this case, the source network device may determine a network device that is in the candidate network devices and that meets the first air interface link communication condition as the target network device based on air interface link signal information of the candidate network devices. For example, the air interface link signal information indicates an air interface link signal strength value. If an air interface link signal strength value of the network device B is greater than an air interface link signal strength value of the network device C, the source network device determines the network device B as the target network device.

It should be understood that, in actual application, there are far more than two neighboring network devices near the source network device. Therefore, the source network device may determine a plurality of candidate network devices, and a plurality of network devices in the plurality of candidate network devices meet the first air interface link communication condition. In this case, the source network device may select a candidate network device with a maximum air interface link signal strength value or a maximum air interface link signal quality value from these candidate network devices as the target network device, or may randomly select a candidate network device from these candidate network devices as the target network device. This is not limited.

In another case, the source network device determines at least one candidate network device that is in the neighboring network devices and that meets the first air interface link communication condition based on the air interface link signal information of the neighboring network devices. The source network device may determine the available sidelink communication type of the terminal device based on the sidelink communication capability information of the terminal device and the sidelink authorization information of the terminal device. Then, the source network device may determine whether an intersection exists between the available sidelink communication type of the terminal device and a sidelink communication type supported by the at least one candidate network device for scheduling, and determine, as the target network device, a candidate network device whose sidelink communication type has an intersection with the available sidelink communication type of the terminal device from the at least one candidate network device. Details are similar to the foregoing description, and an example is not described herein again.

In addition, in another example, the source network device may not determine the available sidelink communication type of the terminal device based on the sidelink communication capability information of the terminal device and the sidelink authorization information of the terminal device. Instead, the source network device directly obtains an intersection based on the sidelink communication types supported by the neighboring network devices for scheduling, the sidelink communication type supported by the terminal device, and an authorized sidelink communication type of the terminal device. Therefore, at least one candidate network device that can meet sidelink communication requirement of the terminal device are determined.

Similarly, there may be only one candidate network device, or there may be a plurality of candidate network devices. Further, the source network device may determine a network device that is in the at least one candidate network device and that meets the first air interface link communication condition as the target network device based on air interface link signal information of the at least one candidate network device.

It should be noted that, alternatively, the source network device may first determine the at least one candidate network device based on the air interface link signal information of the neighboring network devices, and then obtain an intersection of a sidelink communication type supported by the at least one candidate network device for scheduling, the sidelink communication type supported by the terminal device, and the authorized sidelink communication type of the terminal device, to determine the target network device that can meet the sidelink communication requirement of the terminal device and air interface link communication of the terminal device.

The step of determining the available sidelink communication type of the terminal device may alternatively be performed before the source network device determines the at least one candidate network device. This is not specifically limited herein.

Manner 2: The first sidelink information of the terminal device includes available sidelink communication type information of the terminal device. The source network device determines the target network device based on the sidelink scheduling capability information of the neighboring network devices, the available sidelink communication type information of the terminal device, and the air interface link signal information of the neighboring network devices.

For example, the source network device may directly determine an available sidelink communication type of the terminal device based on the available sidelink communication type information of the terminal device. The source network device determines whether an intersection exists between the available sidelink communication type of the terminal device and sidelink communication types supported by the neighboring network devices for scheduling, and determines at least neighboring network device having an intersection as at least one candidate network device. There may be only one candidate network device, or there may be a plurality of candidate network devices. Further, the source network device may determine a network device that is in the at least one candidate network device and that meets the first air interface link communication condition as the target network device based on air interface link signal information of the at least one candidate network device. The first air interface link communication condition has been described in detail above. Details are not described herein again.

For ease of understanding, Manner 2 is described below with reference to FIG. 4B. Details are as follows.

Figure 4B:
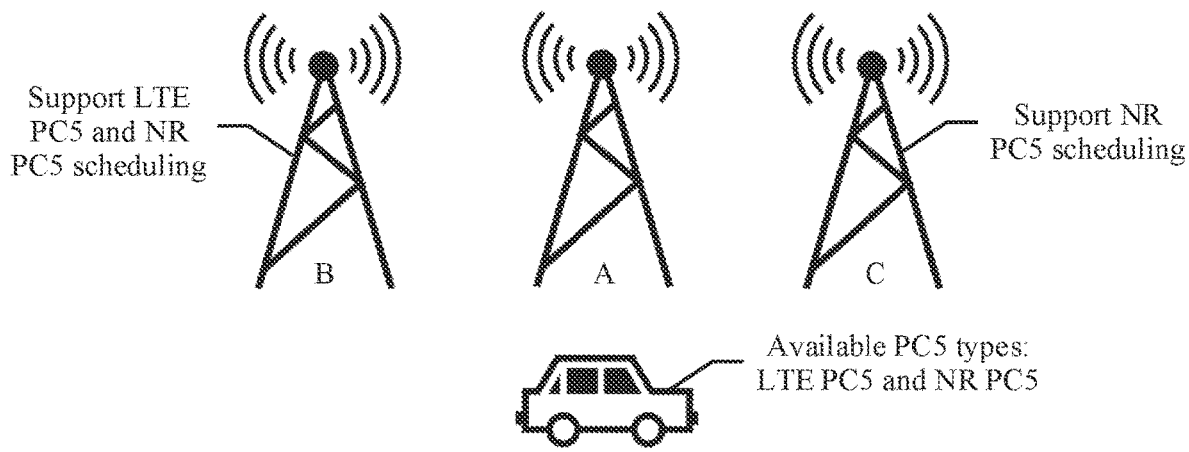
FIG. 4B is a schematic diagram of another V2X communication system according to an embodiment of this application.

As shown in FIG. 4B, a V2X communication system includes a network device A, a network device B, a network device C, and a terminal device (a vehicle in the figure). The network device A is a source network device, and the network device B and the network device C are neighboring network devices near the source network device.

It is assumed that the available sidelink communication type information of the terminal device indicates that available sidelink communication types of the terminal device are LTE PC5 and NR PC5. In addition, sidelink scheduling capability information of the network device B indicates that sidelink communication types supported by the network device B for scheduling are LTE PC5 and NR PC5. Sidelink scheduling capability information of the network device C indicates that a sidelink communication type supported by the network device C for scheduling is NR PC5.

In a possible implementation, because an intersection, namely, LTE PC5 and NR PC5, exists between the sidelink communication types supported by the network device B for scheduling and the available sidelink communication type of the terminal device, the network device B may be used as a candidate network device. Similarly, because an intersection, namely, NR PC5, also exists between the sidelink communication type supported by the network device C for scheduling and the available sidelink communication type of the terminal device, the network device C may also be used as a candidate network device. In this case, the source network device may determine a network device that is in the candidate network devices and that meets the first air interface link communication condition as the target network device based on air interface link signal information of the candidate network devices. For example, the air interface link signal information indicates an air interface link signal strength value. If an air interface link signal strength value of the network device B is greater than an air interface link signal strength value of the network device C, the source network device determines the network device B as the target network device.

In another possible implementation, the source network device may determine at least one candidate network device that is in the neighboring network device and that meets the first air interface link communication condition based on the air interface link signal information of the neighboring network devices. Then, the source network device may determine whether an intersection exists between the available sidelink communication type of the terminal device and a sidelink communication type supported by the at least one candidate network device for scheduling, and determine, as the target network device, a candidate network device whose sidelink communication type of the candidate network device has an intersection with the available sidelink communication type of the terminal device from the at least one candidate network device. Details are similar to the foregoing description, and an example is not described herein again.

In this embodiment, in addition to the first sidelink information of the terminal device and the air interface link signal information of the neighboring network devices, the sidelink scheduling capability information of the neighboring network devices is further introduced as a reference for the source network device to determine the target network device. This avoids a problem that the terminal device cannot perform normal communication because the target network device determined by the source network device cannot schedule the terminal device.

As shown in FIG. 5, an embodiment of this application provides another communication method. In the method, a description is provided by using an example in which a terminal device is UE, a source network device is an S-RAN, neighboring network devices are neighboring base stations, an access management device is an AMF network element, sidelink communication capability information of the terminal device is PC5 communication capability information of the UE, sidelink authorization information of the terminal device is PC5 authorization information of the UE, available sidelink communication type information of the terminal device is an available PC5 RAT of the UE, sidelink scheduling capability information of the neighboring network devices is PC5 scheduling capability information of the neighboring base stations, and air interface link signal information of the neighboring network devices is Uu signal information of the neighboring base stations.

The S-RAN and the neighboring base stations in this embodiment may be any type of the following base stations: gNBs, ng-eNBs, or eNBs. This is not limited.

501. The UE sends the PC5 communication capability information of the UE to the AMF network element.

The PC5 communication capability information of the UE may indicate that a PC5 communication capability of the UE is any one of the following: supporting only NR PC5 communication, supporting only LTE PC5 communication, or supporting both the LTE PC5 communication and the NR PC5 communication. For details, refer to the related descriptions of step 202. Details are not described again.

Optionally, the UE encapsulates the PC5 communication capability information of the UE into a registration request message in a registration procedure, and sends the registration request message to the AMF network element.

502. A UDM network element sends the PC5 authorization information of the UE to the AMF network element.

The PC5 authorization information of the UE may be used to indicate that the UE is authorized with the LITE PC5 communication, the UE is authorized with the NR PC5 communication the UE is authorized with the NR PC5 communication and the LTE PC5 communication, or the UE is not authorized with the PC5 communication. For details, refer to the related descriptions of step 202. Details are not described again.

Optionally, the UDM network element may directly send the PC5 authorization information of the UE to the AMF network element.

Optionally, in a registration procedure, the AMF network element sends a subscription data request message to the UDM network element, and after receiving the subscription data request message, the UDM network element sends a response message of the subscription data request message to the AMF network element, and includes the PC5 authorization information of the UE in the response message of the subscription data request message.

503. The AMF network element determines the available PC5 RAT of the UE based on the PC5 authorization information of the UE and the PC5 communication capability information of the UE.

The available PC5 RAT of the UE is an available sidelink communication type of the UE. For details, refer to the related descriptions of step 202. Details are not described again.

For example, the PC5 communication capability information of the UE is used to indicate a PC5 communication type supported by the UE, and the PC5 authorization information of the UE is used to indicate an authorized PC5 communication type of the UE. The AMF network element determines an intersection of the PC5 communication type supported by the UE and the authorized PC5 communication type of the UE. Assuming that the PC5 communication type supported by the UE is the LTE PC5 communication and the NR PC5 communication, and the authorized PC5 communication type of the UE is the LTE PC5 communication, the available PC5 RAT of the UE is the LITE PC5 communication.

504. The AMF network element sends the available PC5 RAT of the UE to the S-RAN.

Optionally, the AMF network element sends the available PC5 RAT of the UE to the S-RAN through an N2 interface between the AMF network element and the S-RAN.

505. The S-RAN obtains the PC5 scheduling capability information of the neighboring base stations from the neighboring base stations through interfaces between the S-RAN and the neighboring base stations.

Specifically, in a 4G network, an interface between the S-RAN and a neighboring base station is an X2 interface, and the X2 interface is a logical interface between two eNodeBs in an E-UTRAN. In a 5G network, an interface between the S-RAN and a neighboring base station is an Xn interface, and the Xn interface is a point-to-point logical interface between two NG-RAN nodes.

Optionally, step 505 is replaced with step 505a or step 505b.

505a. The S-RAN obtains the PC5 scheduling capability information of the neighboring base stations from an OAM network element, an NMS network element, or an EMS network element.

505b. The UE obtains the PC5 scheduling capability information of the neighboring base stations from a system information block (SIB) message, and sends the PC5 scheduling capability information of the neighboring base stations to the S-RAN.

506. The U E sends the Uu signal information of the neighboring base stations to the S-RAN.

The UE may send the Uu signal information of the neighboring base stations to the S-RAN by using a measurement report. For the Uu signal information of the neighboring base stations, refer to the related descriptions of the air interface link signal information in step 202. Details are not described again.

It should be noted that, when step 505b is performed, the measurement report may carry the PC5 scheduling capability information of the neighboring base stations.

507. The S-RAN determines a T-RAN based on the available PC5 RAT of the UE, the PC5 scheduling capability information of the neighboring base stations, and the Uu signal information of the neighboring base stations.

Specifically, for step 507, refer to the related descriptions of step 402. Details are not described again.

508. The S-RAN sends a handover request to the T-RAN.

The handover request is used to request to hand over the UE from the S-RAN to the T-RAN, so that the T-RAN allocates an air interface resource, a service bearer resource, and the like for access of the UE.

Optionally, the method further includes: The T-RAN sends a response message of the handover request to the S-RAN.

In this embodiment, the S-RAN determines the T-RAN based on the available PC5 RAT of the UE, the PC5 scheduling capability information of the neighboring base stations, and the Uu signal information of the neighboring base stations; or the S-RAN determines the T-RAN based on the PC5 communication capability information of the UE, the PC5 authorization information of the UE, the PC5 scheduling capability information of the neighboring base stations, and the Uu signal information of the neighboring base stations, so that the T-RAN can better meet an air interface link communication requirement and a sidelink communication requirement of the UE.

Figure 5A:
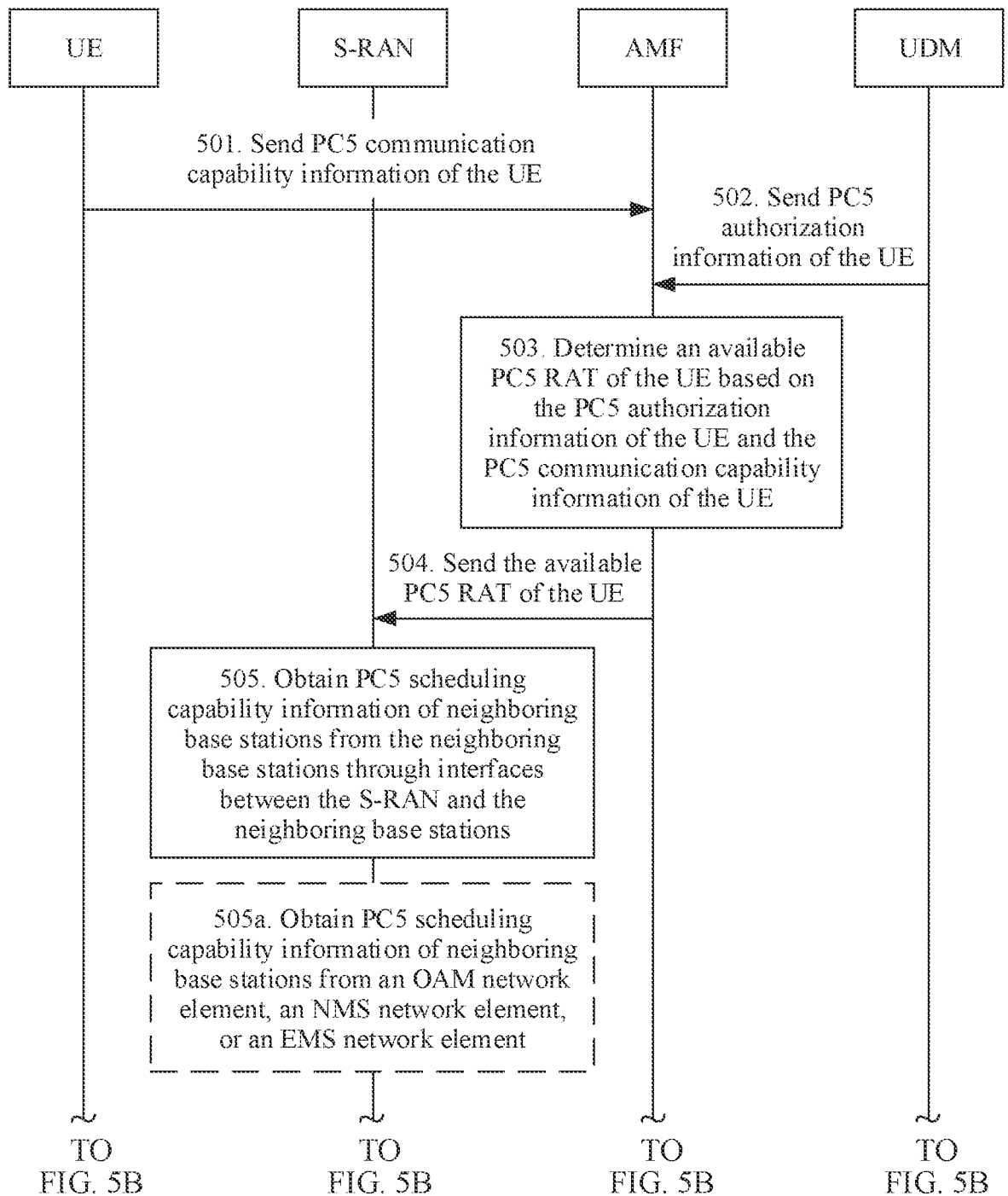
Figure 5B:
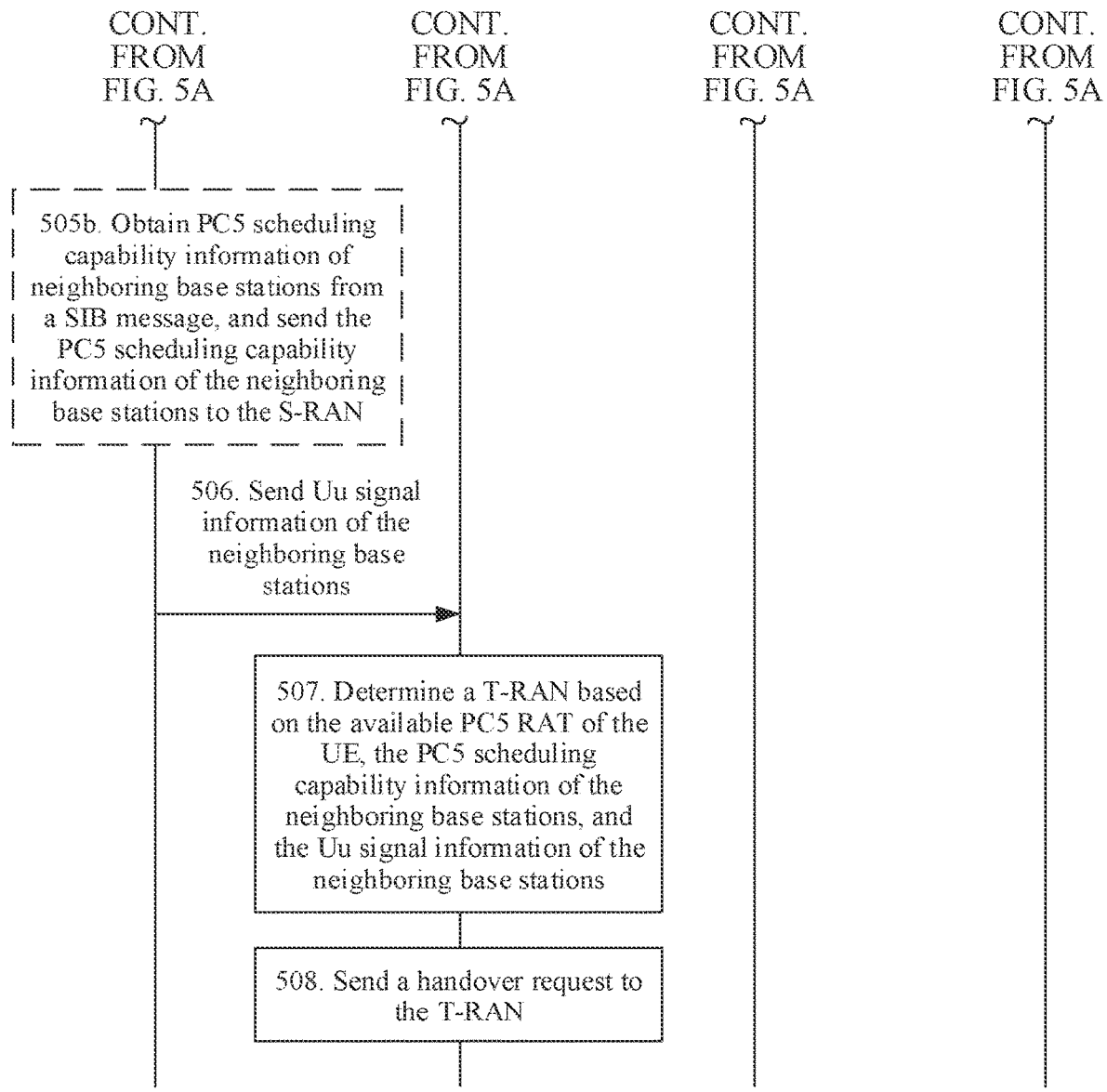

Based on the embodiment shown in FIG. 5A and FIG. 5B, an embodiment of this application further provides another communication method. In the method, step 503 and step 504 are replaced with: The AMF network element sends the PC5 communication capability information of the UE and the PC5 authorization information of the UE to the S-RAN. Step 507 is replaced with: The S-RAN determines the T-RAN based on the PC5 communication capability information of the UE, the PC5 authorization information of the UE, the PC5 scheduling capability information of the neighboring base stations, and the Uu signal information of the neighboring base stations. For a specific implementation, refer to the related descriptions of step 402. Details are not described again.

In this implementation, a specific implementation in which the S-RAN determines the T-RAN is described with reference to a specific application scenario by using an example in which the terminal device is the UE and the source network device is the S-RAN. In this implementation, if an intersection exists between PC5 communication types supported by the neighboring base stations for scheduling, the PC5 communication type supported by the UE, and the authorized PC5 communication type of the U, the T-RAN can meet a PC5 communication requirement of the UE. If Uu signal information of the T-RAN indicates that a Uu signal value of the T-RAN meets a first air interface link communication condition, the T-RAN can meet a Uu communication requirement of the UE. Therefore, the S-RAN may determine a T-RAN that can meet both the PC5 communication requirement and the Uu communication requirement of the UE. Therefore, when the IE is handed over to the T-RAN, the communication requirement of the UE can be ensured. Further, it is helpful to improve the communication efficiency of an entire communication system.

Figure 6:
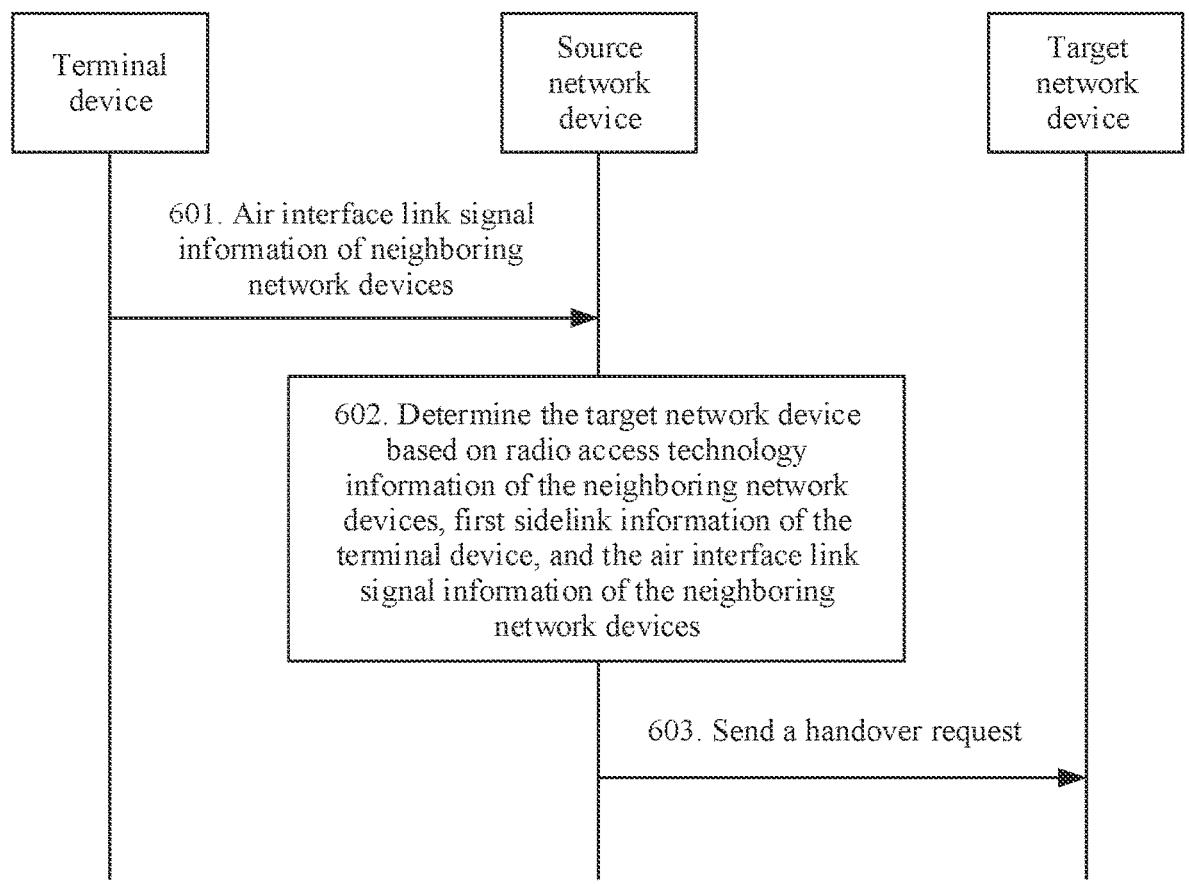
FIG. 6 is a flowchart of another communication method according to an embodiment of this application.

The following describes an implementation in which the capability information of the neighboring network devices includes the radio access technology information of the neighboring network devices. Referring to FIG. 6, an embodiment of this application provides another communication method. Details are as follows.

601. A source network device receives air interface link signal information of neighboring network devices from a terminal device.

Step 601 is similar to step 301. Details are not described again.

602. The source network device determines a target network device based on radio access technology information of the neighboring network devices, first sidelink information of the terminal device, and the air interface link signal information of the neighboring network devices.

The radio access technology information of the neighboring network devices is used to indicate radio access technologies, for example, NR Uu or LTE Uu, used by air interface links of the neighboring network devices.

603. The source network device sends a handover request to the target network device.

Step 603 is similar to step 203. Details are not described again.

For step 602, refer to another implementation of the second implementation scenario in the embodiment shown in FIG. 2. The following separately describes implementations of step 602 with reference to different information included in the first sidelink information.

Manner 1: The first sidelink information of the terminal device includes sidelink communication capability information of the terminal device, sidelink authorization information of the terminal device, and cross-radio access technology sidelink scheduling authorization information of the terminal device. The source network device determines the target network device based on the radio access technology information of the neighboring network devices, the sidelink communication capability information of the terminal device, the sidelink authorization information of the terminal device, the cross-radio access technology sidelink scheduling authorization information of the terminal device, and the air interface link signal information of the neighboring network devices.

For example, when the cross-radio access technology sidelink scheduling authorization information of the terminal device indicates that the terminal device supports cross-radio access technology sidelink scheduling, the source network device may determine the target network device by using the implementation in step 302. Details are not described herein again.

For example, when the cross-radio access technology sidelink scheduling authorization information of the terminal device indicates that the terminal device does not support cross-radio access technology sidelink scheduling, the source network device determines at least one candidate network device from the neighboring network devices based on the sidelink communication capability information of the terminal device, the radio access technology information of the neighboring network devices, and the sidelink authorization information of the terminal device. The source network device determines a network device that is in the at least one candidate network device and that meets a first air interface link communication condition as the target network device based on air interface link signal information of the at least one candidate network device.

An intersection exists between a radio access technology type of the at least one candidate network device, a sidelink communication type supported by the terminal device, and an authorized sidelink communication type of the terminal device. There may be only one candidate network device, or there may be a plurality of candidate network devices. The first air interface link communication condition has been described in detail above, and details are not described herein again.

For example, when the cross-radio access technology sidelink scheduling authorization information of the terminal device indicates that the terminal device does not support cross-radio access technology sidelink scheduling, the source network device determines an available sidelink communication type of the terminal device based on the sidelink communication capability information of the terminal device and the sidelink authorization information of the terminal device, and determines at least one candidate network device in the neighboring network devices based on the available sidelink communication type of the terminal device and the radio access technology information of the neighboring network devices. The source network device determines a network device that is in the at least one candidate network device and that meets a first air interface link communication condition as the target network device based on air interface link signal information of the at least one candidate network device.

For ease of understanding, Manner 1 is described below with reference to FIG. 6A. Details are as follows.

Figure 6A:
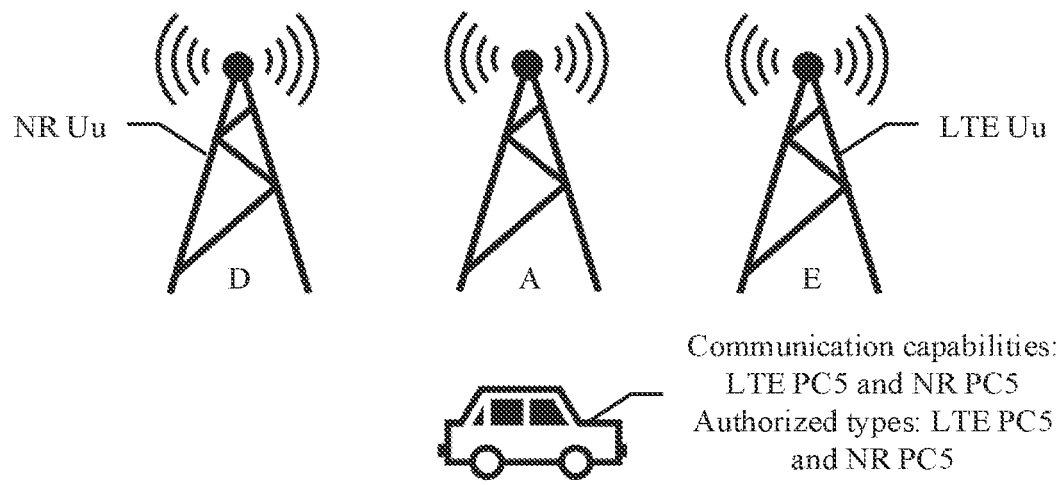
FIG. 6A is a schematic diagram of another V2X communication system according to an embodiment of this application.

As shown in FIG. 6A, a V2X communication system includes a network device A, a network device D, a network device E, and a terminal device (a vehicle in the figure). The network device A is a source network device, and the network device D and the network device E are neighboring network devices near the source network device.

It is assumed that the sidelink communication capability information of the terminal device indicates that the terminal device supports LTE PC5 and NR PC5, and the sidelink authorization information of the terminal device indicates that authorized communication types of the terminal device are LTE PC5 and NR PC5. In this case, the available sidelink communication type of the terminal device is an intersection of the sidelink communication capabilities of the terminal device and the authorized communication types of the terminal device, namely, LTE PC5 and NR PC5. In addition, it is assumed that radio access technology information of the network device D indicates that a radio access technology type of the network device D is NR Uu, and radio access technology information of the network device E indicates that a radio access technology type of the network device E is LTE Uu.

In a possible implementation, if the cross-radio access technology sidelink scheduling authorization information of the terminal device indicates that the terminal device does not support cross-radio access technology sidelink scheduling, but because available sidelink communication types of the terminal device are LTE PC5 and NR PC5, both the network device D and the network device E may be used as candidate network devices. In this case, the source network device may determine a network device that is in the candidate network devices and that meets the first air interface link communication condition as the target network device based on air interface link signal information of the candidate network devices. An implementation in which a network device that meets the first air interface link communication condition is filtered out from the candidate network devices is described in detail above. Details are not described herein again.

In another possible implementation, when the cross-radio access technology sidelink scheduling authorization information of the terminal device indicates that the terminal device does not support cross-radio access technology sidelink scheduling, the source network device may first determine at least one candidate network device that is in the neighboring network devices and that meets the first air interface link communication condition based on the air interface link signal information of the neighboring network devices. Then, the source network device determines the target network device from the plurality of candidate network devices based on radio access technology information of the at least one candidate network device, the sidelink communication capability information of the terminal device, and the sidelink authorization information of the terminal device. An intersection exists between a radio access technology type of the target network device and an available sidelink communication type of the terminal device. Specifically, the available sidelink communication type of the terminal device is similar to that described above. Details are not described herein again.

Manner 2: The first sidelink information of the terminal device includes available sidelink communication type information of the terminal device and cross-radio access technology sidelink scheduling authorization information of the terminal device. The source network device determines the target network device based on the radio access technology information of the neighboring network devices, the available sidelink communication type information of the terminal device, the cross-radio access technology sidelink scheduling authorization information of the terminal device, and the air interface link signal information of the neighboring network devices.

For example, the source network device may directly receive the available sidelink communication type information of the terminal device. Assuming that the cross-radio access technology sidelink scheduling authorization information of the terminal device indicates that the terminal device does not support cross-radio access technology sidelink scheduling, the source network device may determine at least one candidate network device from the neighboring network devices based on the radio access technology information of the neighboring network devices and the available sidelink communication type of the terminal device. An intersection exists between a radio access technology type of the at least one candidate network device and the available sidelink communication type of the terminal device. Then, the source network device determines a network device that is in the at least one candidate network device and that meets the first air interface link communication condition as the target network device based on air interface link signal information of the at least one candidate network device. Details are similar to the foregoing descriptions. Details are not described herein again.

For ease of understanding, Manner 2 is described below with reference to FIG. 6B. Details are as follows.

Figure 6B:
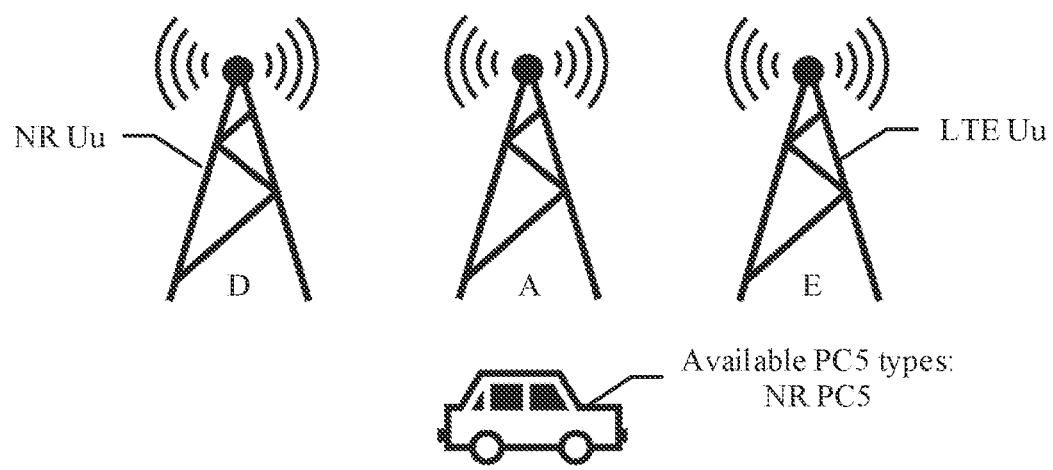

As shown in FIG. 6B, a V2X communication system includes a network device A, a network device ID, a network device E, and a terminal device (a vehicle in the figure). The network device A is a source network device, and the network device D and the network device E are neighboring network devices near the network device A.

It is assumed that the available sidelink communication type information of the terminal device indicates that an available sidelink communication type of the terminal device is NR PC5. In addition, radio access technology information of the network device D indicates that a radio access technology type of the network device D is NR Uu, and radio access technology information of the network device E indicates that a radio access technology type of the network device E is LTE Uu.

In a possible implementation, it is assumed that the cross-radio access technology sidelink scheduling authorization information of the terminal device indicates that the terminal device does not support cross-radio access technology sidelink scheduling, but because the available sidelink communication type of the terminal device is NR PC5, and the radio access technology type of the network device) is NR Uu, the network device) may be used as a candidate network device. In this case, if the network device D meets the first air interface link communication condition, it may be determined that the network device D is the target network device. An implementation in which a network device that meets the first air interface link communication condition is filtered out from the at least one candidate network device is described in detail above. Details are not described herein again.

In another possible implementation, assuming that the cross-radio access technology sidelink scheduling authorization information of the terminal device indicates that the terminal device does not support cross-radio access technology sidelink scheduling, the source network device may first determine at least one candidate network device that is in the neighboring network device and that meets the first air interface link communication condition based on the air interface link signal information of the neighboring network devices. Then, the source network device filters out the target network device from the at least one candidate network device. An intersection exists between a radio access technology type of the target network device and the available sidelink communication type of the terminal device. Details are similar to the foregoing descriptions. Details are not described herein again.

In this embodiment, when the cross-radio access technology sidelink scheduling authorization information of the terminal device indicates that the terminal device does not support cross-radio access technology sidelink scheduling, in addition to the first sidelink information of the terminal device and the air interface link signal information of the neighboring network devices, the radio access technologies of the neighboring network devices are further introduced as a reference for the source network device to determine the target network device. This avoids a problem that the terminal device cannot perform normal communication because the target network device determined by the source network device cannot schedule the terminal device.

As shown in FIG. 7, an embodiment of this application provides another communication method. In the method, a description is provided by using an example in which a terminal device is UE a source network device is an S-RAN, neighboring network devices are neighboring base stations, an access management device is an AIF network element, sidelink communication capability information of the terminal device is PC5 communication capability information of the UE, sidelink authorization information of the terminal device is PC5 authorization information of the UE, available sidelink communication type information of the terminal device is an available PC5 RAT of the UE, sidelink scheduling capability information of the neighboring network devices is PC5 scheduling capability information of the neighboring base stations, air interface link signal information of the neighboring network devices is Uu signal information of the neighboring base stations, cross-radio access technology sidelink scheduling authorization information of the terminal device is cross-RAT PC5 scheduling authorization information of the UE, and radio access technology information of the neighboring network devices is RE's of the neighboring base stations.

The S-RAN and the neighboring base stations in this embodiment may be any type of the following base stations: gNBs, ng-eNBs, or eNBs. This is not limited.

701. The UE sends the PC5 communication capability information of the UE to the AMF network element.

Specifically, step 701 is similar to step 501. Details are not described again.

702. A UDM network element sends the PC5 authorization information of the UE and the cross-RAT PC5 scheduling authorization information of the UE to the AMF network element.

The cross-RAT PC5 scheduling authorization information of the UE may be used to indicate that the UE is authorized with cross-RAT PC5 scheduling. For example, UE that performs communication by using NR PC5 may be scheduled by a base station using LTE Uu; or UE that performs communication by using LTE PC5 may be scheduled by a base station using NR Uu. Alternatively, the cross-RAT PC5 scheduling authorization information of the UE is used to indicate that the UE is not authorized with cross-RAT PC5 scheduling. For example, UE that performs communication by using NR PC5 may be scheduled only by a base station using NR U; or UE that performs communication by using LTE PC5 may be scheduled only by a base station using LTE Uu. For details, refer to the related descriptions of step 202. Details are not described again.

The PC5 authorization information of the UE is similar to the PC5 authorization information of the FE in step 502. Details are not described herein again.

Optionally, the UDM network element sends the PC5 authorization information of the UE and the cross-RAT PC5 scheduling authorization information of the UE to the AMF network element.

Optionally, in a registration procedure, the AMF network element sends a subscription data request message to the UDM network element, and after receiving the subscription data request message, the UDM network element sends a response message of the subscription data request message to the AMF network element, and includes the PC5 authorization information of the UE and the cross-RAT PC5 scheduling authorization information of the UE in the response message of the subscription data request message.

703. The AMF network element determines the available PC5 RAT of the UE based on the PC5 authorization information of the UE and the PC5 communication capability information of the UE.

Specifically, step 703 is similar to step 503. Details are not described again.

It should be understood that the AMF network element may determine the available PC5 RAT of the UP only based on the PC5 authorization information of the UE and the cross-RAT PC5 scheduling authorization information of the UE, without considering the cross-RAP PC5 scheduling authorization information of the UE.

704. The AMF network element sends the available PC5 RAT of the UE and the cross-RAT PC5 scheduling authorization information of the UE to the S-RAN.

Optionally, the AMF network element sends the available PC5 RAT of the UE and the cross-RAT PC5 scheduling authorization information of the UE to the S-RAN through an N2 interface between the AMF network element and the S-RAN.

705. The S-RAN obtains the RATs of the neighboring base stations from the neighboring base stations through interfaces between the S-RAN and the neighboring base stations.

For the RATs of the neighboring base stations, refer to the related descriptions of step 602. Details are not described herein again.

The interfaces between the S-RAN and the neighboring base stations are similar to the related content described in step 505. Details are not described again.

Optionally, step 705 is replaced with step 705a or step 705b.

705a. The S-RAN obtains the RATs of the neighboring base stations from an OAM network element, an NMS network element, or an EMS network element.

705b. The UE obtains the RATs of the neighboring base stations from a SIB message, and sends the RATs of the neighboring base stations to the S-RAN.

706. The UE sends the Uu signal information of the neighboring base stations to the S-RAN.

The UE may send the Uu signal information of the neighboring base stations to the S-RAN by using a measurement report. For the Uu signal information of the neighboring base stations, refer to the related descriptions of step 202. Details are not described again.

It should be noted that when step 705b is performed, the measurement report may carry the RATs of the neighboring base stations.

707. When the cross-RAT PC5 scheduling authorization information of the UE indicates that the UE does not support cross-RAT scheduling, the S-RAN determines a T-RAN based on the available PC5 RAT of the UE, the RATs of the neighboring base stations, and the Uu signal information of the neighboring base stations.

Specifically, for step 707, refer to the related descriptions of step 602. Details are not described again.

708. When the cross-RAT PC5 scheduling authorization information of the UE indicates that the UT supports cross-RAT scheduling, the S-RAN determines a T-RAN based on the Uu signal information of the neighboring base stations.

Specifically, for step 708, refer to the related descriptions of step 302. Details are not described again.

709. The S-RAN sends a handover request to the T-RAN.

Specifically, step 709 is similar to step 508. Details are not described again.

In this embodiment, the S-RAN determines the T-RAN based on the available PC5 RAT of the UE, the RATs of the neighboring base stations, and the Uu signal information of the neighboring base stations; or the S-RAN determines the T-RAN based on the PC5 communication capability information of the UE, the PC5 authorization information of the UE, the RAI's of the neighboring base stations, and the Uu signal information of the neighboring base stations, so that the T-RAN can better meet an air interface link communication requirement and a sidelink communication requirement of the UE.

Figure 7A:
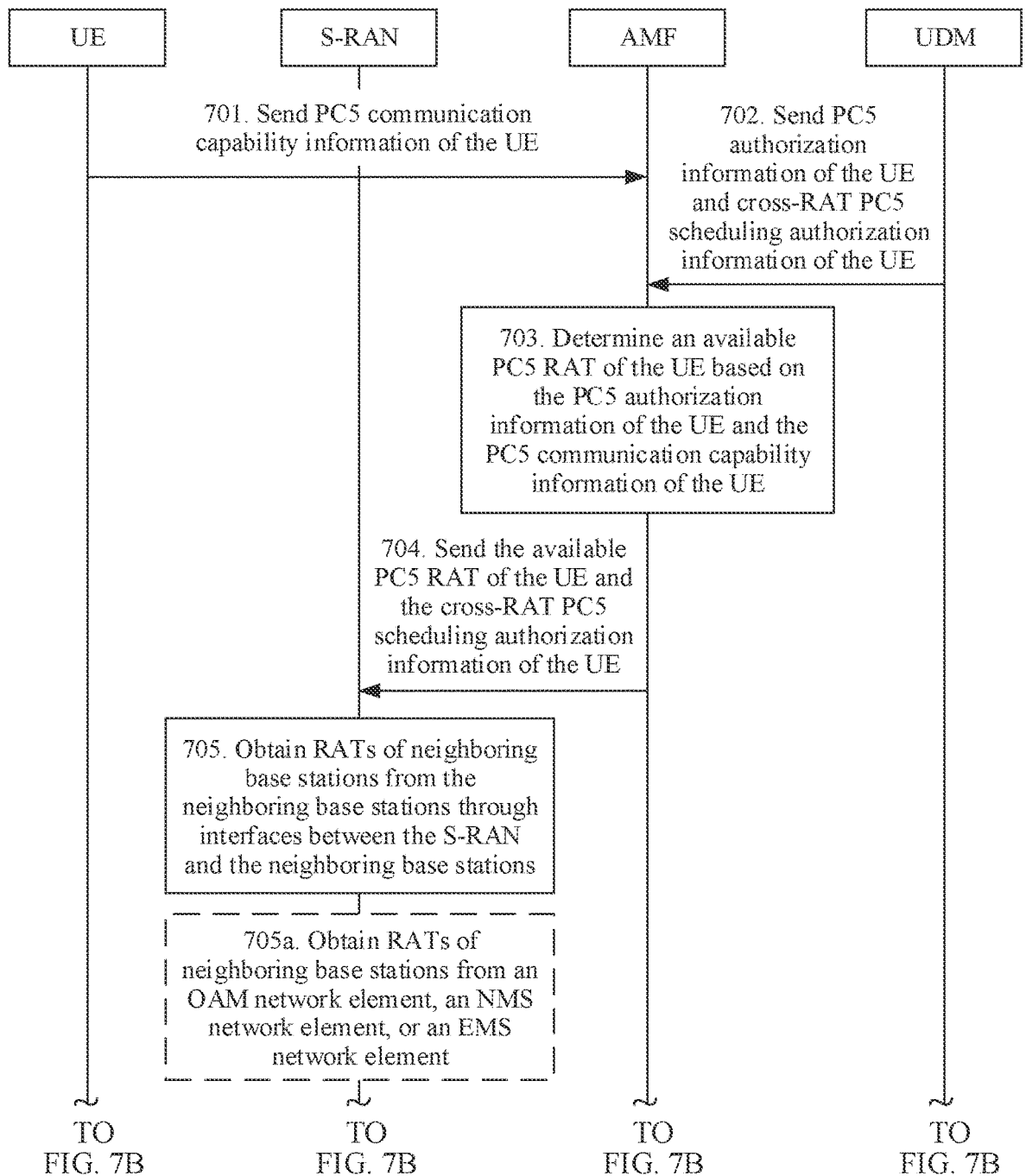
Figure 7B:
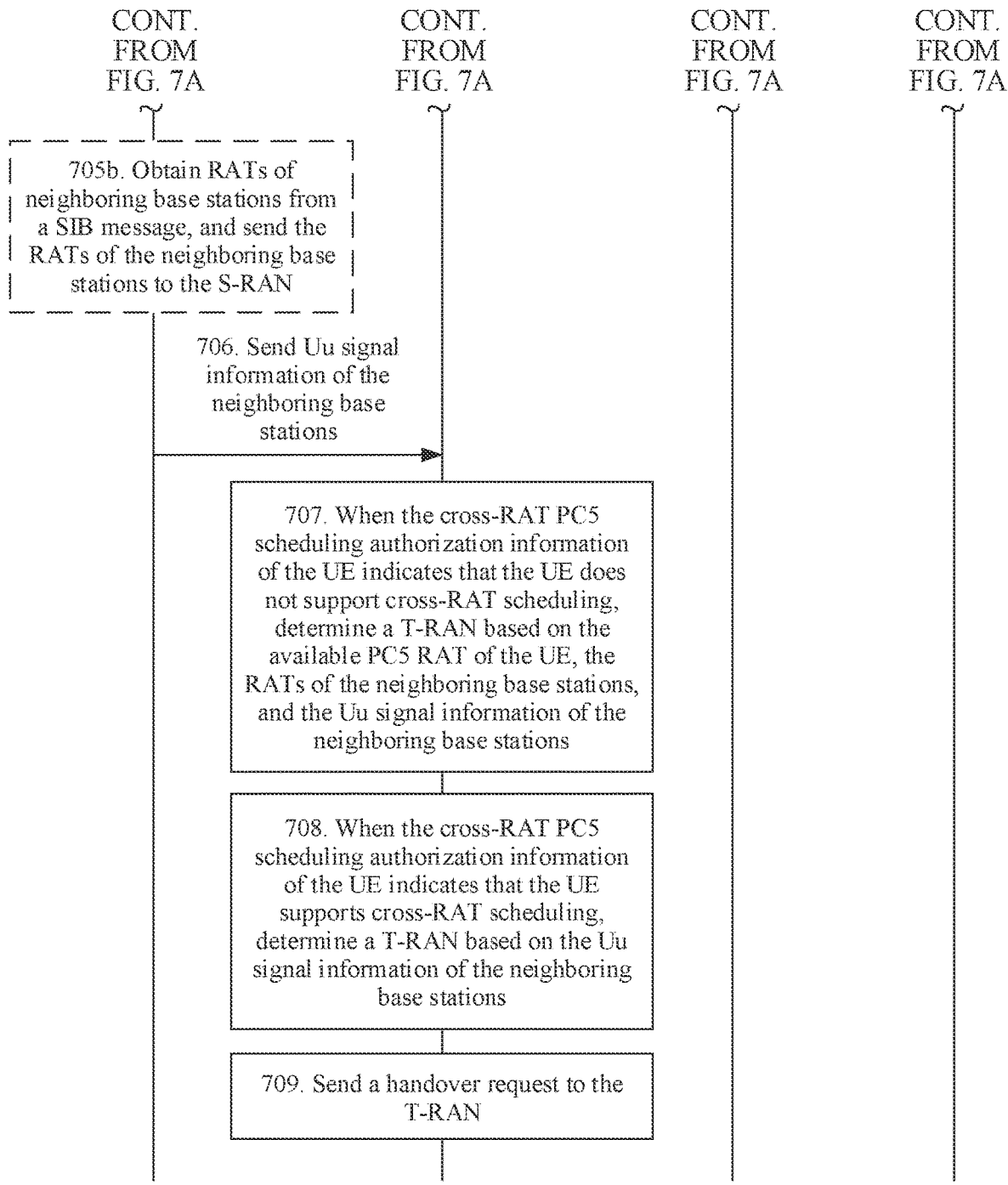

Based on the embodiment shown in FIG. 7A and FIG. 7B, an embodiment of this application further provides another communication method. In the method, step 703 and step 704 are replaced with: The AMF network element sends the PC5 communication capability information of the UE, the PC5 authorization information of the UE, and the cross-RAT PC5 scheduling authorization information of the UE to the S-RAN. Step 707 is replaced with: When the cross-RAT PC5 scheduling authorization information of the UE indicates that the UE does not support cross-RAT scheduling, the S-RAN determines the T-RAN based on the PC5 communication capability information of the UE, the PC5 authorization information of the UE, the RATs of the neighboring base stations, and the Uu signal information of the neighboring base stations. For details, refer to the related descriptions of step 602. Details are not described again.

In this implementation, a specific implementation in which the S-RAN determines the T-RAN is described with reference to a specific application scenario by using an example in which the terminal device is the UE and the source network device is the S-RAN. Compared with the implementation corresponding to FIG. 5A and FIG. 5B, this implementation further introduces the RATs of the neighboring base stations and the cross-RAT PC5 scheduling authorization information of the UE. Therefore, when the IE is handed over to the T-RAN, the communication requirement of the UE can be ensured. Further, it is helpful to improve the communication efficiency of an entire communication system.

The foregoing describes a case in which the source network device can determine, based on the first sidelink information, the capability information of the neighboring network devices, and the air interface link signal information of the neighboring network devices, a network device that meets the first air interface link communication condition and supports the sidelink communication scheduling of the terminal device. However, in actual application, when determining the target network device based on the foregoing information, the source network device may not filter out a network device that meets the first air interface link communication condition and supports the sidelink communication scheduling of the terminal device. In this case, second sidelink information of the terminal device may be introduced as a reference for the source network device to consider, that is, the source network device may determine the target network device based on the second sidelink information. For details, refer to an embodiment shown in FIG. 8.

Figure 8:
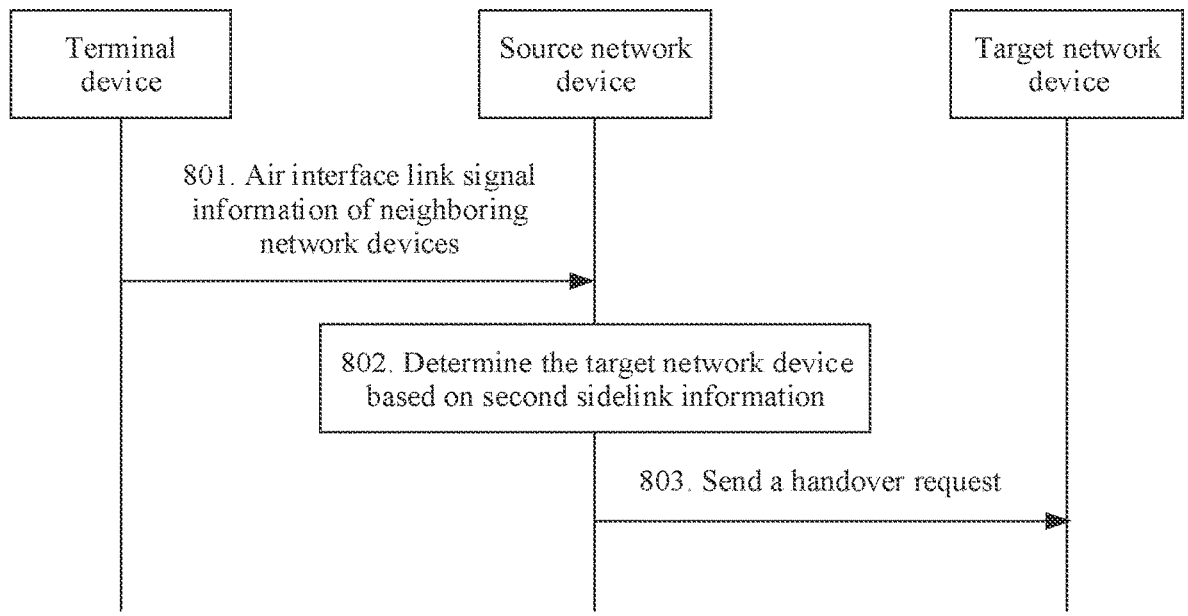
FIG. 8 is a flowchart of another communication method according to an embodiment of this application.

As shown in FIG. 8, an embodiment of this application provides another communication method, Details are as follows.

801. A source network device receives air interface link signal information of neighboring network devices from a terminal device.

Step 801 is similar to step 301 in the foregoing description. Details are not described herein again.

802. The source network device determines a target network device based on second sidelink information.

Optionally, step 802 is replaced with: When the source network device determines, based on first sidelink information, capability information of the neighboring network devices, and the air interface link signal information of the neighboring network devices, that no network device that meets a first air interface link communication condition and supports sidelink communication scheduling of the terminal device exists in the neighboring network devices, the source network device determines the target network device based on the second sidelink information.

The second sidelink information includes sidelink priority information of the terminal device.

803. The source network device sends a handover request to the target network device.

Step 803 is specifically similar to step 203 in the foregoing description. Details are not described herein again.

Optionally, the sidelink priority information of the terminal device in step 802 may be obtained or received by using a plurality of channels. The channels may be specifically classified into the following several types:

Channel 1: The source network device receives the sidelink priority information of the terminal device from the terminal device.

Channel 2: The source network device receives a correspondence from a policy control device, and determines the sidelink priority information of the terminal device based on air interface link service requirement identification information of the terminal device, sidelink service requirement identification information of the terminal device, and the correspondence.

The correspondence includes a correspondence between the air interface link service requirement identification information and a communication priority and a correspondence between the sidelink service requirement identification information and a communication priority. The manner described in Channel 2 above is described below by using an example.

In this case, the source network device may receive the sidelink service requirement identification information of the terminal device and the air interface link service requirement identification information of the terminal device. The sidelink service requirement identification information of the terminal device may be a PC5 QoS identifier (PQI) or a prose per-packet priority (PPPP) identifier. The air interface link service requirement identification information of the terminal device may be a 5G QoS identifier (5QI), or an allocation and retention priority (priority of allocation and retention, ARP) identifier. In addition, the source network device further receives the correspondences between the foregoing two types of identification information and the communication priorities. The correspondences may be shown in the following Table 1

TABLE 1

| Identification information | Character that indicates a priority | Priority in descending order |
|---|---|---|
| Air interface link service requirement identifier 2 | | 1 |
| Sidelink service requirement identifier 2 | | 2 |

TABLE 1-continued

| Identification information | Character that indicates a priority | Priority in descending order |
|---|---|---|
| Air interface link service requirement identifier 1 | 3 | |
| Sidelink service requirement identifier 3 | 4 | |
| Air interface link service requirement identifier 3 | 5 | |
| Sidelink service requirement identifier 1 | 6 | |
| Air interface link service requirement identifier 4 | 7 | |

As shown in Table 1, the correspondence includes the correspondence between the air interface link service requirement identification information and the communication priority and the correspondence between the sidelink service requirement identification information and the communication priority. There are four air interface link service requirement identifiers, and a requirement identifier corresponding to a communication service in a current air interface link is 3. In this case, a character indicating a priority corresponding to the identifier 3 is 5. There are three sidelink service requirement identifiers, and a requirement identifier corresponding to a communication service in a current sidelink is 2. In this case, a character indicating a priority corresponding to the identifier 2 is 2. Characters in ascending order indicate priorities in descending order. Therefore, according to the correspondence in the table, it can be learned that a sidelink priority is higher than an air interface link priority. Certainly, in actual application, Table 1 may further include only identification information of a corresponding communication service, and does not include identification information of another service. This is not specifically limited herein.

If the manner described in Channel 1 above is used, the source network device receives the sidelink priority information of the terminal device from the terminal device. Therefore, the terminal device may receive a correspondence from a policy control device, where the correspondence includes a correspondence between air interface link service requirement identification information and a communication priority and a correspondence between sidelink service requirement identification information and a communication priority, and determine the sidelink priority information of the terminal device based on the air interface link service requirement identification information of the terminal device, the sidelink service requirement identification information of the terminal device, and the correspondence. Then, the terminal device sends the sidelink priority information of the terminal device to the source network device. Specifically, this is similar to the manner described above in which the source network device determines the sidelink priority information. Details are not described herein again.

It should be understood that the source network device may obtain or receive the sidelink priority information of the terminal device by using any one or more of the foregoing channels. This is not specifically limited herein.

In addition, the sidelink priority information of the terminal device has two indication manners:

Manner 1: The sidelink priority information of the terminal device indicates that a sidelink communication priority of the terminal device is higher than an air interface link communication priority of the terminal device, or a sidelink communication priority of the terminal device is lower than an air interface link communication priority of the terminal device. Specifically, the sidelink priority information of the terminal device may be represented by using two bits. The former bit indicates the sidelink communication priority of the terminal device, and the latter bit indicates the air interface link communication priority of the terminal device. More specifically, 10 indicates that the sidelink communication priority of the terminal device is higher than the air interface link communication priority of the terminal device, and 01 indicates that the sidelink communication priority of the terminal device is lower than the air interface link communication priority of the terminal device. Certainly, the former bit may indicate the air interface link communication priority of the terminal device, and the latter bit may indicate the sidelink communication priority of the terminal device. Details are similar to those described above, and are not described herein again.

Manner 2: The sidelink priority information of the terminal device indicates that sidelink communication of the terminal device is preferential, or sidelink communication of the terminal device is not preferential. Specifically, the sidelink priority information of the terminal device may alternatively be represented by using one bit. 1 indicates that the sidelink communication priority of the terminal device is higher than the air interface link communication priority of the terminal device. 0 indicates that the sidelink communication priority of the terminal device is lower than the air interface link communication priority of the terminal device. Alternatively, 0 indicates that the sidelink communication priority of the terminal device is higher than the air interface link communication priority of the terminal device, and 1 indicates that the sidelink communication priority of the terminal device is lower than the air interface link communication priority of the terminal device. This is not specifically limited herein.

In actual application, another manner may be used to indicate the sidelink priority information of the terminal device. This is not specifically limited herein.

The sidelink priority information of the terminal device is used to indicate importance degrees of the sidelink communication priority of the terminal device and the air interface link communication priority of the terminal device. When the sidelink communication priority of the terminal device is higher than the air interface link communication priority of the terminal device, the target network device determined by the source network device needs to first meet the sidelink communication requirement of the terminal device. When the sidelink communication priority of the terminal device is lower than the air interface link communication priority of the terminal device, the target network device determined by the source network device needs to first meet air interface link communication requirement of the terminal device.

Specifically, when the sidelink priority information of the terminal device indicates that the sidelink communication priority of the terminal device is lower than the air interface link communication priority of the terminal device, or indicates that the sidelink communication of the terminal device is not preferential, the terminal device more needs to meet the air interface link communication requirement. In this case, the source network device may determine, based on the air interface link signal information of the neighboring network devices, a network device with an optimal air interface link signal in the neighboring network devices near the source network device as the target network device.

More specifically, the source network device may determine air interface link signal strength values of the neighboring network devices based on the air interface link signal information of the neighboring network devices, and then determine a neighboring network device with a maximum air interface link signal strength value in the neighboring network devices as the target network device. In addition, the source network device may determine air interface link signal quality values of the neighboring network devices based on the air interface link signal information of the neighboring network devices, and then determine a neighboring network device with a maximum air interface link signal quality value in the neighboring network devices as the target network device. This is not specifically limited herein.

In addition, when the sidelink priority information of the terminal device indicates that a sidelink communication priority of the terminal device is higher than an air interface link communication priority of the terminal device, or indicates that sidelink communication of the terminal device is preferential, the terminal device more needs to meet the sidelink communication requirement. In this case, the source network device may determine a network device that is in the neighboring network devices and that meets a second air interface link communication condition and supports sidelink communication scheduling of the terminal device as the target network device. The second air interface link communication condition is that an air interface link signal value is greater than a second air interface link signal threshold, and the second air interface link signal threshold is less than a first air interface link signal threshold.

More specifically, because the terminal device more needs to meet the sidelink communication requirement, a requirement for the air interface link communication may be relatively lowered. Therefore, the source network device may relax an air interface link condition for selecting the target network device, that is, reduce the first air interface link signal threshold to the second air interface link signal threshold. In this case, although the air interface link signal information of the neighboring network devices does not change, after changing the first air interface link communication condition to the second air interface link communication condition, the source network device may expand a range of neighboring network devices that meet the air interface link communication requirement of the terminal device. For ease of subsequent description, a neighboring network device that meets the second air interface link communication condition are referred to as a candidate network device. Then, the source network device selects, from at least one candidate network device, a network device that supports sidelink communication scheduling of the terminal device and determines the network device as the target network device.

For ease of understanding, the following describes, with reference to a specific example, how the source network device determines at least one candidate network device that meets the second air interface link communication condition.

Figure 8A:
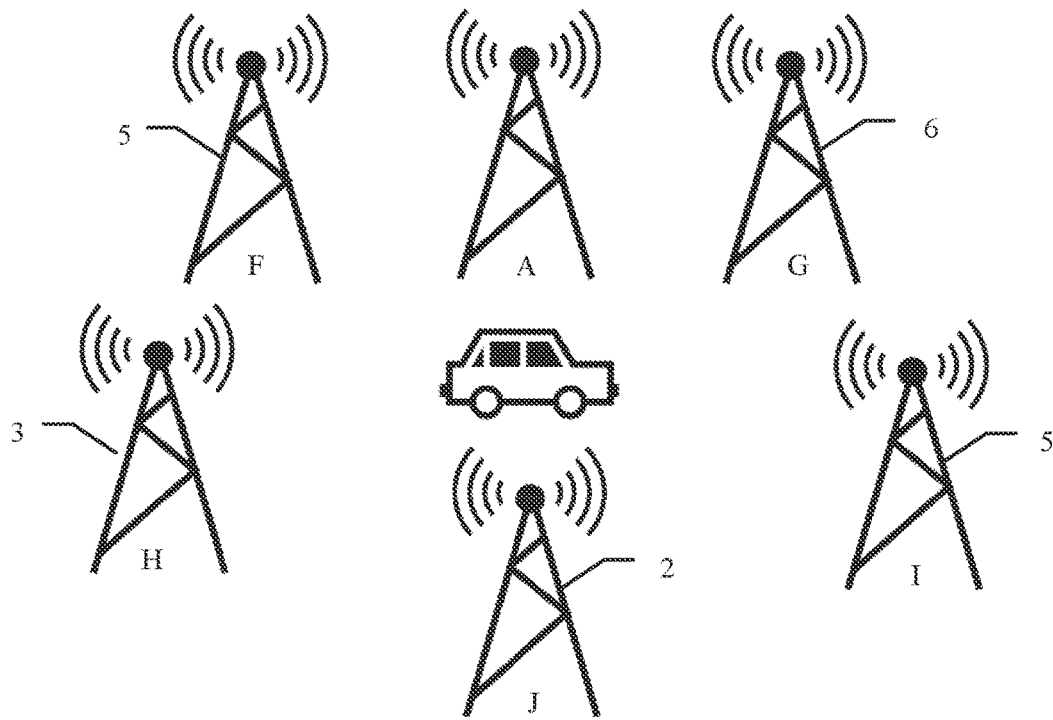
FIG. 8A is a schematic diagram of another V2X communication system according to an embodiment of this application.

As shown in FIG. 8A, a V2X communication system includes a network device A, a network device F, a network device G, a network device H, a network device I, a network device J, and a terminal device (a vehicle in the figure). The network device A is a source network device, and the remaining network devices are neighboring network devices. The source network device may determine each air interface link signal value based on air interface link signal information of each neighboring network device. For ease of description, an example in which the air interface link signal value is an air interface link signal strength value is used for description. Specifically, the source network device may determine that air interface link signal strength values of the network device F, the network device C, the network device H, the network device L, and the network device J are 5, 6, 3, 2, and 5. In this case, because a first air interface link signal strength threshold indicated by the first air interface link communication condition is 7, and the air interface link signal strength value of each neighboring network device is less than the first air interface link signal strength threshold, the source network device cannot filter out a neighboring network device that meets the first air interface link communication condition. In this case, because the source network device learns, based on the sidelink priority information of the terminal device, that the sidelink communication priority of the terminal device is higher than the air interface link communication priority of the terminal device or the sidelink communication of the terminal device is preferential, the source network device adjusts the first air interface link communication condition to the second air interface link communication condition, that is, decreases the first air interface link signal strength threshold to a second air interface link signal strength threshold. Assuming that the second air interface link signal strength threshold is 4, only the network device F, the network device G, and the network device f in the plurality of neighboring network devices in FIG. 8A meet the second air interface link signal threshold. Therefore, the source network device may determine the network device F, the network device G, and the network device I as candidate network devices. Then, the source network device selects, from the plurality of candidate network devices, a network device that supports sidelink communication scheduling of the terminal device as the target network device.

In the foregoing example, when the source network device selects, from the plurality of candidate network devices, a network device that supports the sidelink communication scheduling of the terminal device as the target network device, refer to the following implementations.

In an implementation, the source network device may determine an available sidelink communication type of the terminal device based on the sidelink communication capability information of the terminal device and the sidelink authorization information of the terminal device, and determine, based on sidelink scheduling capability information of the candidate network devices, sidelink communication types supported by the candidate network devices for scheduling. Then, the source network device may determine whether an intersection exists between the available sidelink communication type of the terminal device and the sidelink communication types supported by the candidate network devices for scheduling, and determine, as the target network device, a candidate network device selected from candidate network devices having an intersection. Details are similar to the foregoing description, and an example is not described herein again.

Alternatively, the source network device may directly determine an available sidelink communication type of the terminal device based on the available sidelink communication type information of the terminal device. In addition, the source network device further needs to determine, based on sidelink scheduling capability information of the candidate network devices, sidelink communication types supported by the candidate network devices for scheduling. Then, the source network device may determine whether an intersection exists between the available sidelink communication type of the terminal device and the sidelink communication types supported by the candidate network devices for scheduling, and determine, as the target network device, a candidate network device selected from candidate network devices having an intersection. Details are similar to the foregoing description, and an example is not described herein again.

In another implementation, because cross-radio access technology sidelink scheduling authorization information of the terminal device indicates that the terminal device supports cross-radio access technology sidelink scheduling, the source network device needs to separately determine an available sidelink communication type of the terminal device and radio access technology types of the candidate network devices. Specifically, the source network device may determine the available sidelink communication type of the terminal device based on the sidelink communication capability information of the terminal device and the sidelink authorization information of the terminal device. The source network device may determine the radio access technology types of the candidate network devices based on the radio access technology information of the candidate network devices. Then, the source network device may determine whether an intersection exists between the available sidelink communication type of the terminal device and the radio access technology types of the candidate network devices, and determine, as the target network device, a candidate network device having an intersection. Details are similar to the foregoing description, and an example is not described herein again.

Alternatively, the source network device may directly determine an available sidelink communication type of the terminal device based on the available sidelink communication type information of the terminal device. The source network device may determine the radio access technology types of the candidate network devices based on the radio access technology information of the candidate network devices. Then, the source network device may determine whether an intersection exists between the available sidelink communication type of the terminal device and the radio access technology types of the candidate network devices, and determine, as the target network device, a candidate network device having an intersection. Details are similar to the foregoing description, and an example is not described herein again.

In this embodiment, when the source network device does not filter out a network device that meets the first air interface link communication condition and supports the sidelink communication scheduling of the terminal device, the second sidelink information of the terminal device is introduced as a reference for the source network device to consider, that is, the source network device determines the target network device based on the second sidelink information. In this solution, the source network device may determine, based on the sidelink priority information of the terminal device, a communication requirement that the terminal device more needs to meet, and then allocate, to the terminal device, a communication resource that can meet a high communication priority of the terminal device. Therefore, it is helpful for the source network device to allocate resources more properly, so that more terminal devices are handed over to suitable target network devices. Therefore, a waste of resources can be effectively avoided, and the communication efficiency of an entire communication system can be improved.

Figure 9A:
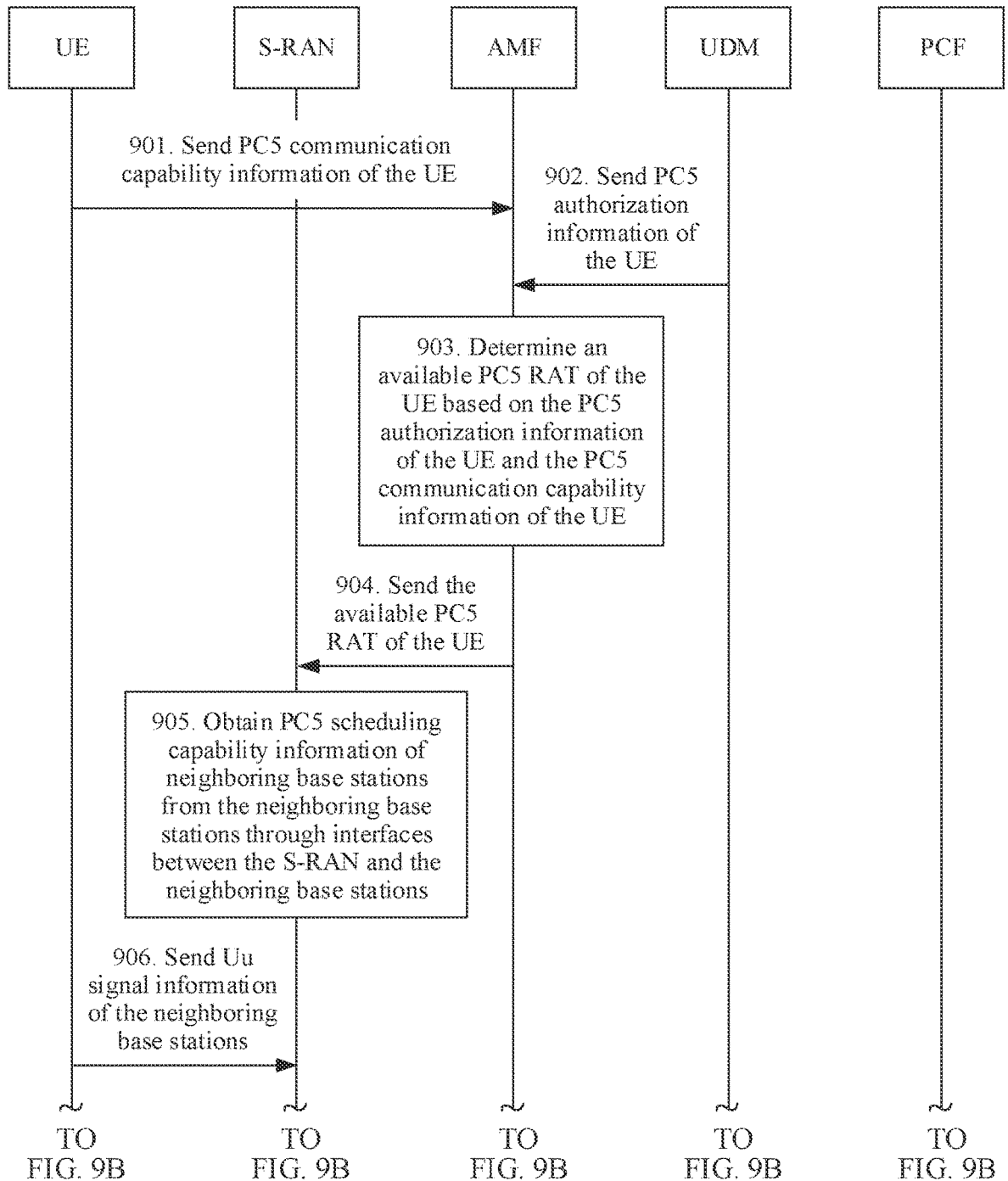
FIG. 9A and FIG. 9B are a flowchart of another communication method according to an embodiment of this application.
Figure 9B:
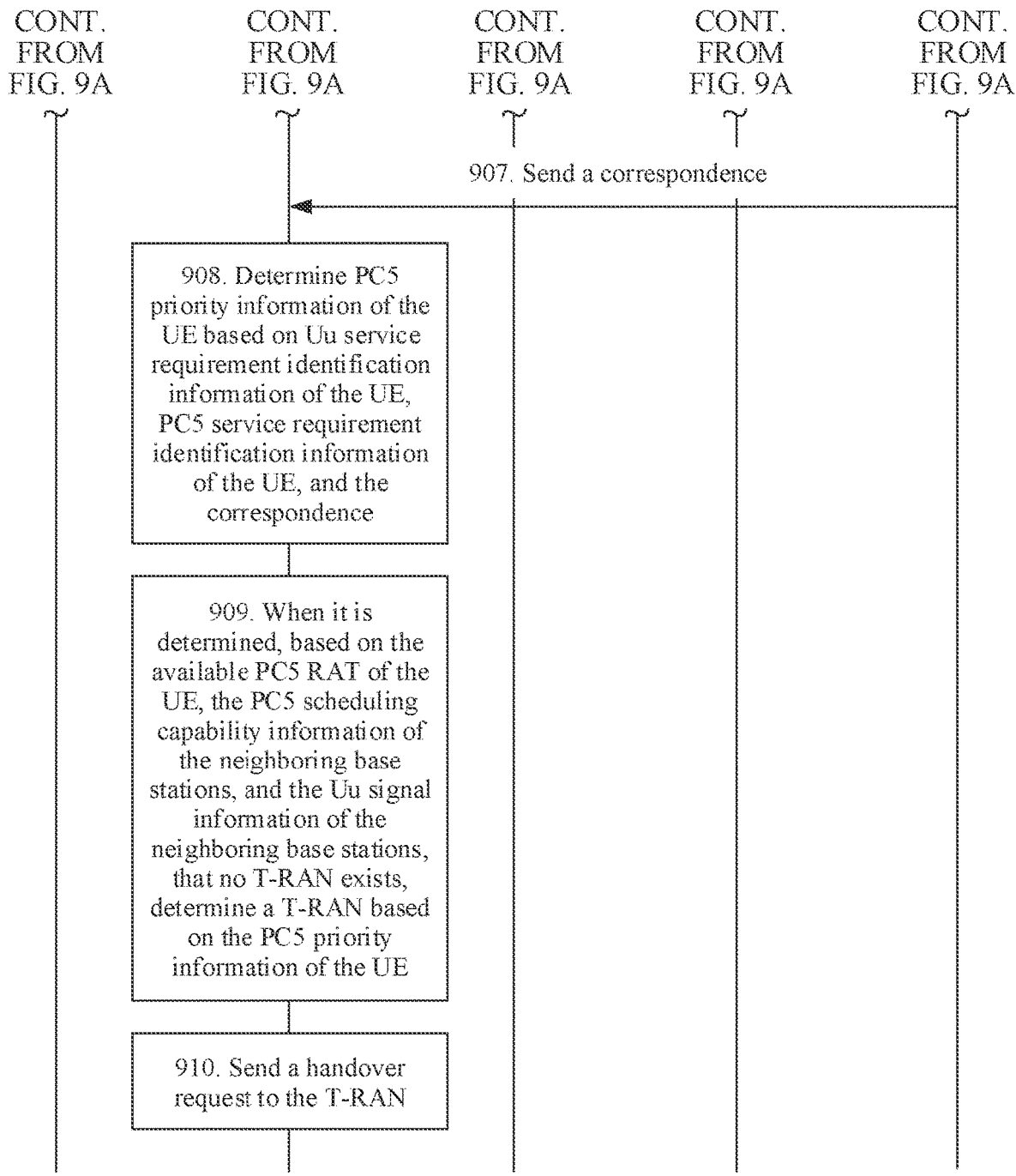

As shown in FIG. 9, an embodiment of this application provides another communication method. In the method, a description is provided by using an example in which a terminal device is UE, a source network device is an S-RAN, neighboring network devices are neighboring base stations, an access management device is an AMF network element, a policy control device is a PCF network element, sidelink communication capability information of the terminal device is PC5 communication capability information of the UE, sidelink authorization information of the terminal device is PC5 authorization information of the UE, available sidelink communication type information of the terminal device is an available PC5 RAT of the UE, sidelink scheduling capability information of the neighboring network devices is PC5 scheduling capability information of the neighboring base stations, and air interface link signal information of the neighboring network devices is Uu signal information of the neighboring base stations.

The S-RAN and the neighboring base stations in this embodiment may be any type of the following base stations: gNBs, ng-eNBs, or eNBs. This is not limited.

901. The UE sends the PC5 communication capability information of the UE to the AMF network element.

902. A UDM network element sends the PC5 authorization information of the UE to the AMF network element.

903. The MF network element determines the available PC5 RAT of the UE based on the PC5 authorization information of the UE and the PC5 communication capability information of the UE.

904. The AMF network element sends the available PC5 RAT of the UE to the S-RAN.

905. The S-RAN obtains the PC5 scheduling capability information of the neighboring base stations from the neighboring base stations through interfaces between the S-RAN and the neighboring base stations.

906. The UE sends the Uu signal information of the neighboring base stations to the S-RAN.

Step 901 to step 906 are similar to step 501 to step 506. Details are not described again.

907. The PCF network element sends a correspondence to the S-RAN.

The correspondence includes a correspondence between Uu service requirement identification information and a communication priority and a correspondence between PC5 service requirement identification information and a communication priority.

908. The S-RAN determines PC5 priority information of the UE based on the Uu service requirement identification information of the UE, the PC5 service requirement identification information of the UE, and the correspondence.

It should be noted that there is no time sequence between step 907 and step 908 and the foregoing steps.

Optionally, step 907 and step 908 are replaced with: The PCF network element sends a correspondence to the UE; the UE determines PC5 priority information of the UE based on Uu service requirement identification information of the UE, PC5 service requirement identification information of the UE, and the correspondence; and the UE sends the PC5 priority information of the UE to the S-RAN.

909. When the S-RAN determines, based on the available PC5 RAT of the UE, the PC5 scheduling capability information of the neighboring base stations, and the Uu signal information of the neighboring base stations, that no T-RAN exists, the S-RAN determines a T-RAN based on the PC5 priority information of the UE.

Specifically, for step 909, refer to the related descriptions of step 802. Details are not described again.

910. The S-RAN sends a handover request to the T-RAN.

Specifically, step 910 is similar to step 508. Details are not described again.

In this embodiment, the S-RAN determines the T-RAN based on the PC5 priority information, so that the T-RAN can better meet an air interface link communication requirement and a sidelink communication requirement of the UE.

Based on the embodiment shown in FIG. 9A and FIG. 913, an embodiment of this application further provides another communication method. In the method, step 903 and step 904 are replaced with: The AMF network element sends the PC5 communication capability information of the UE and the PC5 authorization information of the UE to the S-RAN. Step 909 is replaced with: When the S-RAN determines, based on the PC5 communication capability information of the UE, the PC5 authorization information of the UE, the PC5 scheduling capability information of the neighboring base stations, and the Uu signal information of the neighboring base stations, that no T-RAN exists, the S-RAN determines a T-RAN based on the PC5 priority information of the UE. For details, refer to the related descriptions of step 802. Details are not described again.

In this embodiment, an implementation in which the S-RAN determines the T-RAN is described with reference to a specific application scenario. In such an implementation, the S-RAN may determine, based on the PC5 priority information of the UE, a communication requirement that the LYE more needs to meet, and then allocate, to the UE, a communication resource that can meet a high communication priority of the UE. Therefore, it is helpful for the S-RAN to allocate resources more properly, so that more UEs are handed over to suitable T-RANs. Therefore, a waste of resources can be effectively avoided, and the communication efficiency of an entire communication system can be improved.

As shown in FIG. 10, an embodiment of this application provides another communication method. In the method, a description is provided by using an example in which a terminal device is UE, a source network device is an S-RAN, neighboring network devices are neighboring base stations, an access management device is an AMF network element, a policy control device is a PCF network element, sidelink communication capability information of the terminal device is PC5 communication capability information of the UE, sidelink authorization information of the terminal device is PC5 authorization information of the UE, available sidelink communication type information of the terminal device is an available PC5 RAT of the UE, sidelink scheduling capability information of the neighboring network devices is PC5 scheduling capability information of the neighboring base stations, air interface link signal information of the neighboring network devices is Uu signal information of the neighboring base stations, cross-radio access technology sidelink scheduling authorization information of the terminal device is cross-RAT PC5 scheduling authorization information of the UE, and radio access technology information of the neighboring network devices is RATs of the neighboring base stations.

The S-RAN and the neighboring base stations in this embodiment may be any type of the following base stations: gNBs, ng-eNBs, or eNBs. This is not limited.

1001. The UE sends the PC5 communication capability information of the UE to the AMF network element.

1002. A UDM network element sends the PC5 authorization information of the UE and the cross-RAT PC5 scheduling authorization information of the UE to the AMF network element.

1003. The AMF network element determines the available PC5 RAT of the UE based on the PC authorization information of the UE and the PC5 communication capability information of the UE.

1004. The AMF network element sends the available PC5 RAT of the UE and the cross-RAT PC5 scheduling authorization information of the UE to the S-RAN.

1005. The S-RAN obtains the RATs of the neighboring base stations from the neighboring base stations through interfaces between the S-RAN and the neighboring base stations.

1006. The UE sends the Uu signal information of the neighboring base stations to the S-RAN.

Step 1001 to step 1006 are similar to step 701 to step 706. Details are not described again.

1007. The PCF network element sends a correspondence to the S-RAN.

1008. The S-RAN determines PC5 priority information of the UE based on the Uu service requirement identification information of the UE, the PC5 service requirement identification information of the UE, and the correspondence.

Step 1007 and step 1008 are similar to step 907 and step 908. Details are not described again.

1009. When the cross-RAT PC5 scheduling authorization information of the UE indicates that the UE does not support cross-RAT scheduling, and the S-RAN determines, based on the available PC5 RAT of the UE, the RATs of the neighboring base stations, and the Uu signal information of the neighboring base stations, that no T-RAN exists, the S-RAN determines a T-RAN based on the PC5 priority information of the UE.

Specifically, for step 1009, refer to the related descriptions of step 802. Details are not described again.

1010. The S-RAN sends a handover request to the T-RAN.

Specifically, step 1010 is similar to step 709. Details are not described again.

In this embodiment, the S-RAN determines the T-RAN based on the PC5 priority information, so that the V-RAN can better meet an air interface link communication requirement and a sidelink communication requirement of the UE.

Figure 10A:
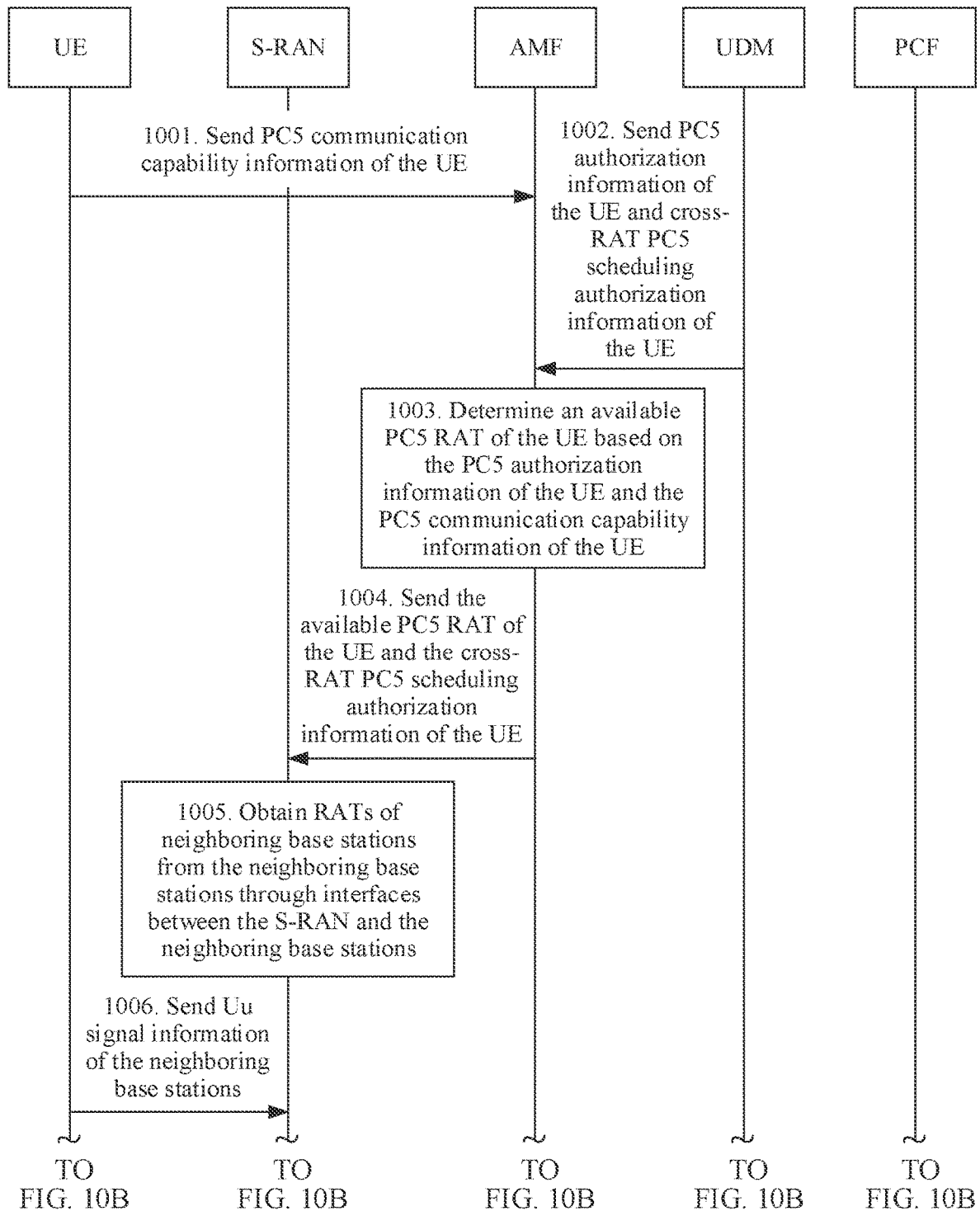
Figure 10B:
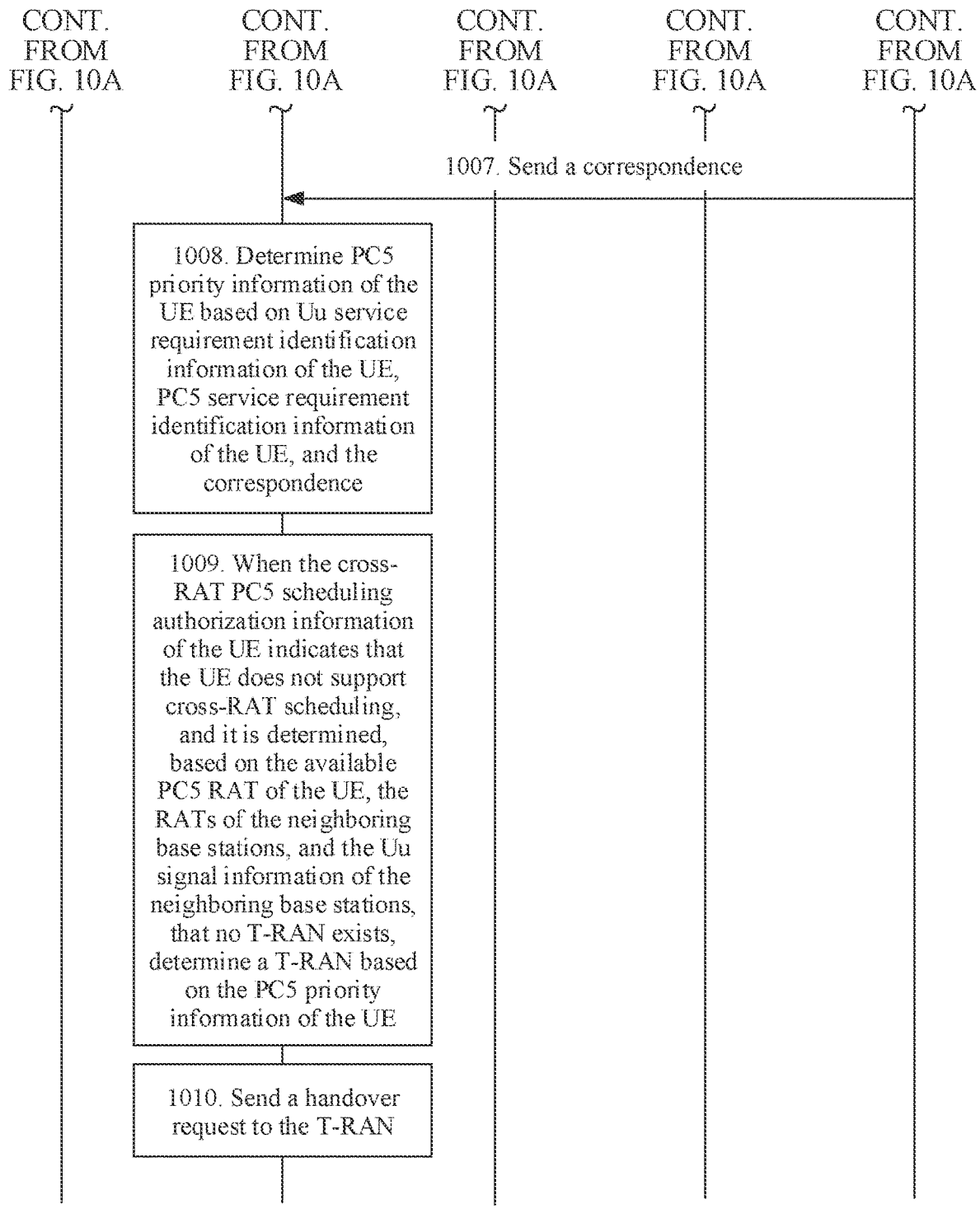

Based on the embodiment shown in FIG. 10A and FIG. 10B, an embodiment of this application further provides another communication method. In the method, step 1003 and step 1004 are replaced with: The AMF network element sends the PC5 communication capability information of the UE, the PC5 authorization information of the UE, and the cross-RAT PC5 scheduling authorization information of the UE to the S-RAN. Step 1009 is replaced with: When the cross-RAT PC5 scheduling authorization information of the UE indicates that the UE does not support cross-RAT scheduling, and the S-RAN determines, based on the PC5 communication capability information of the UE, the PC5 authorization information of the UE, the RATs of the neighboring base stations, and the Uu signal information of the neighboring base stations, that no T-RAN exists, the S-RAN determines a T-RAN based on the PC5 priority information of the UE. For details, refer to the related descriptions of step 802. Details are not described again.

In this embodiment, an implementation in which the S-RAN determines the T-RAN is described with reference to a specific application scenario. In such an implementation, the S-RAN may determine, based on the PC5 priority information of the UE, a communication requirement that the UE more needs to meet, and then allocate, to the UE, a communication resource that can meet a high communication priority of the UE. Therefore, it is helpful for the S-RAN to allocate resources more properly, so that more UEs are handed over to suitable T-RANs. Therefore, a waste of resources can be effectively avoided, and the communication efficiency of an entire communication system can be improved.

Figure 11:
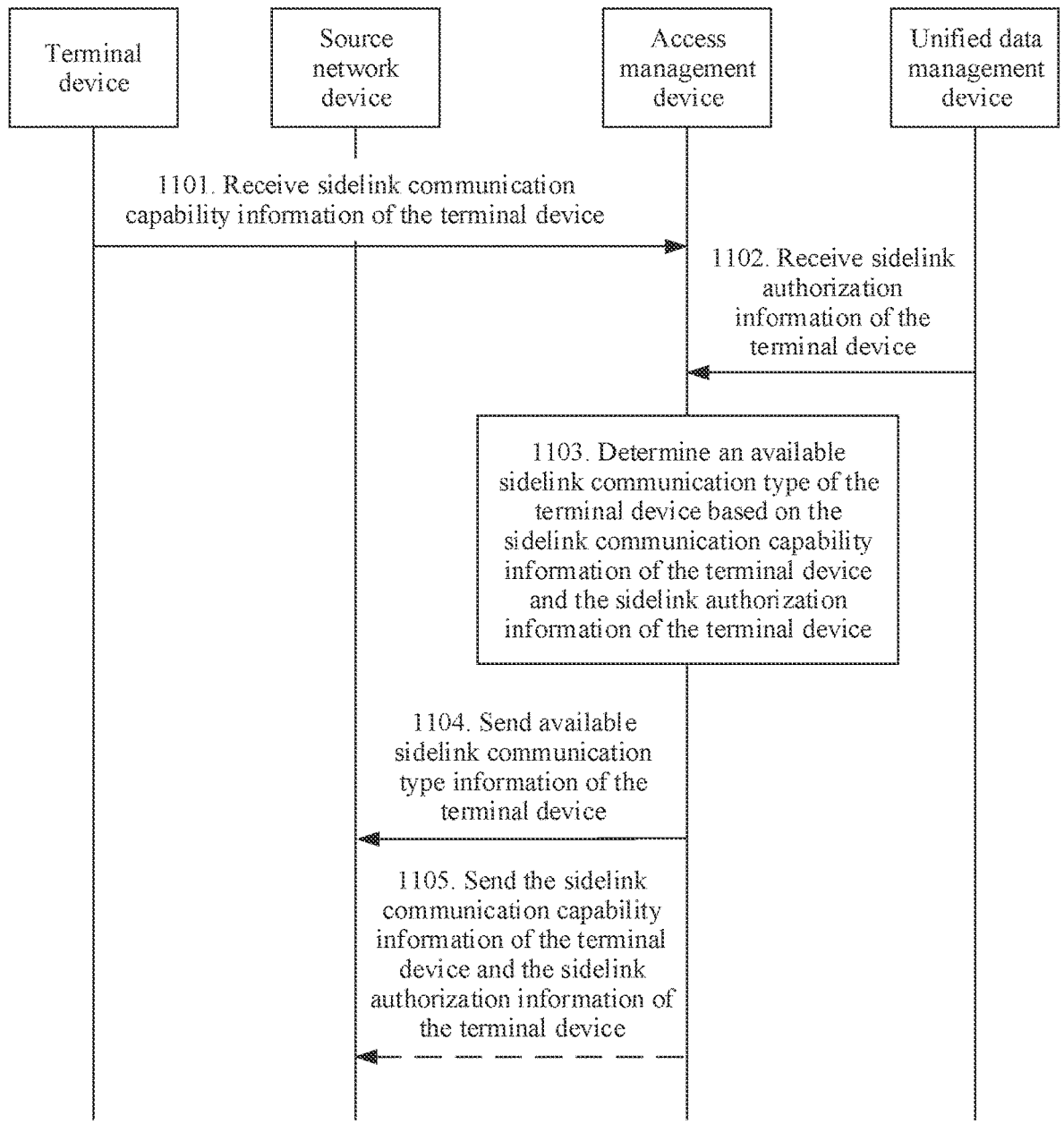

As shown in FIG. 11, an embodiment of this application provides another communication method.

1101. An access management device receives sidelink communication capability information of a terminal device from the terminal device.

Optionally, the access management device is the foregoing AMF network element.

Specifically, step 1101 is similar to step 501 or step 701. Details are not described herein again.

1102. The access management device receives sidelink authorization information of the terminal device from a unified data management device.

Optionally, the unified data management device is the foregoing UDM network element.

Specifically, step 1102 is similar to step 502 or step 702. Details are not described herein again.

1103. The access management device determines an available sidelink communication type of the terminal device based on the sidelink communication capability information of the terminal device and the sidelink authorization information of the terminal device.

For example, the access management device determines, based on the sidelink communication capability information of the terminal device, a sidelink communication type supported by the terminal device, and the access management device determines an authorized sidelink communication type of the terminal device based on the sidelink authorization information of the terminal device. The access management device obtains an intersection of the sidelink communication type supported by the terminal device and the authorized sidelink communication type of the terminal device. The intersection is the available sidelink communication type of the terminal device.

1104. The access management device sends available sidelink communication type information of the terminal device to a source network device.

The available sidelink communication type information of the terminal device is used to indicate the available sidelink communication type of the terminal device.

Based on the embodiment shown in FIG. 11, an embodiment of this application further provides another communication method. In this method, step 1103 and step 1104 are replaced with step 1105.

1105. The access management device sends the sidelink communication capability information and the sidelink authorization information to the source network device.

In this implementation, an approach for the source network device to obtain the sidelink communication capability information and the sidelink authorization information is specified, so that the source network device can determine the target network device based on the sidelink communication capability information, the sidelink authorization information, and other information.

Figure 12:
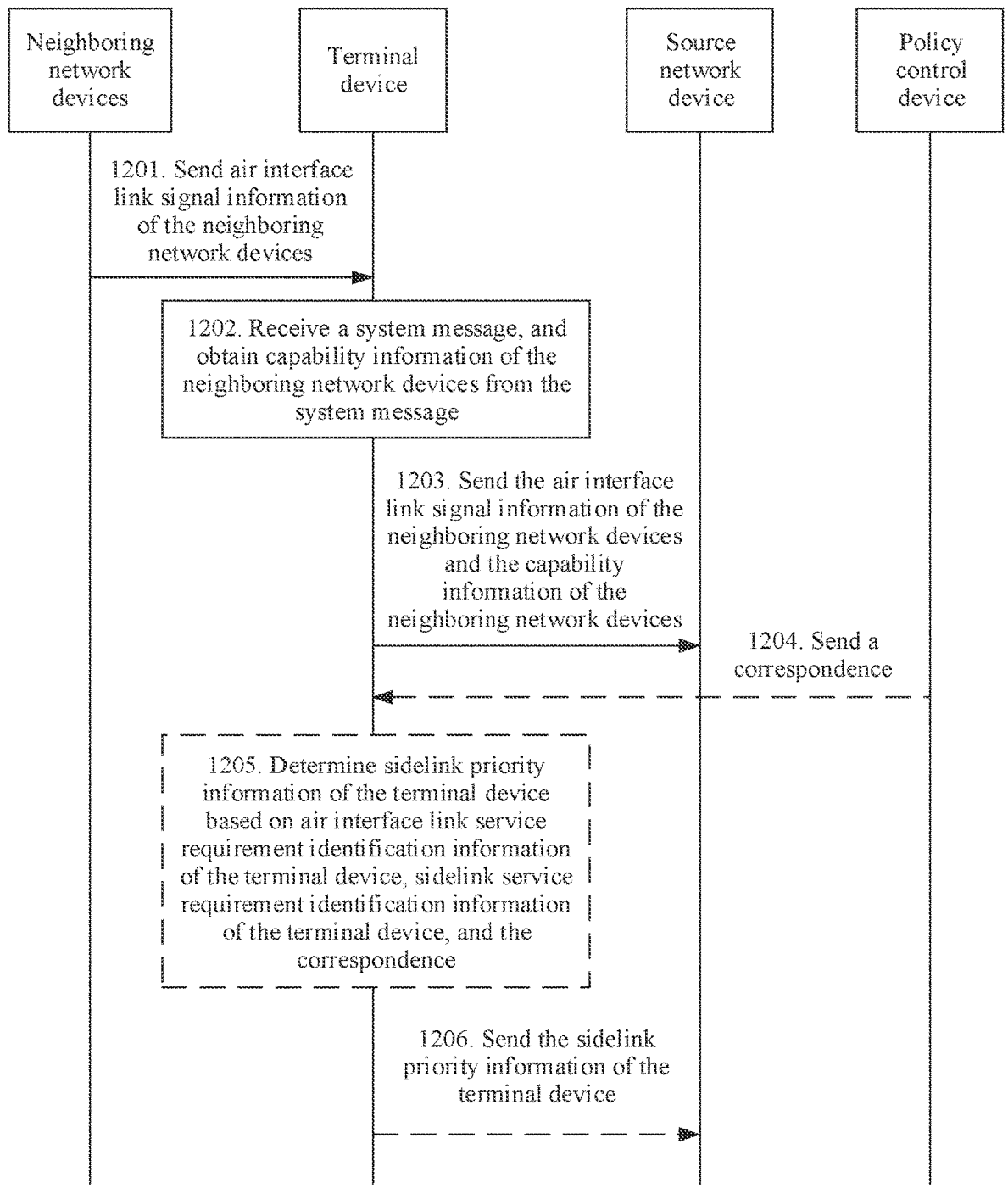
FIG. 12 is a flowchart of another communication method according to an embodiment of this application.

As shown in FIG. 12, an embodiment of this application provides another communication method.

1201. A terminal device obtains air interface link signal information of neighboring network devices.

For the air interface link signal information of the neighboring network devices, refer to the related descriptions of step 202. Details are not described again.

1202. The terminal device receives a system message, and obtains capability information of the neighboring network devices from the system message.

Optionally, the capability information of the neighboring network devices includes at least one of sidelink scheduling capability information of the neighboring network devices or radio access technology information of the neighboring network devices.

Specifically, for the capability information of the neighboring network devices, refer to the related descriptions of step 202. Details are not described again.

1203. The terminal device sends the air interface link signal information of the neighboring network devices and the capability information of the neighboring network devices to a source network device.

Optionally, the air interface link signal information of the neighboring network devices is used to indicate quality of air interface link signals of the neighboring network devices.

Specifically, the air interface link signal information of the neighboring network devices may include air interface link signal values of the neighboring network devices.

More specifically, the air interface link signal values of the neighboring network devices include any type of air interface link signal quality values of the neighboring network devices or air interface link signal strength values of the neighboring network devices. For details, refer to the related descriptions of step 202. Details are not described again.

In some feasible implementations, the communication method further includes step 1204, step 1025, and step 1206.

1204. The terminal device receives a correspondence from a policy control device.

The correspondence includes a correspondence between air interface link service requirement identification information and a communication priority and a correspondence between sidelink service requirement identification information and a communication priority.

1205. The terminal device determines sidelink priority information of the terminal device based on the air interface link service requirement identification information of the terminal device, the sidelink service requirement identification information of the terminal device, and the correspondence.

The sidelink priority information of the terminal device is used to indicate priorities of sidelink communication of the terminal device and air interface link communication of the terminal device. For details, refer to the related descriptions of step 202. Details are not described again.

1206. The terminal device sends the sidelink priority information of the terminal device to the source network device.

In this implementation, the terminal device sends the air interface link signal information of the neighboring network devices and the capability information of the neighboring network devices to the source network device, so that the source network device determines a target network device based on the air interface link signal information of the neighboring network devices and the capability information of the neighboring network devices. Therefore, the target network device determined by the source network device can better meet an air interface link communication requirement and a sidelink communication requirement of the terminal device. Therefore, if the terminal device is handed over to the target network device, a communication effect of the terminal device may not be reduced.

The foregoing describes the communication methods in the embodiments, and the following describes the communication devices in the embodiments.

Figure 13:
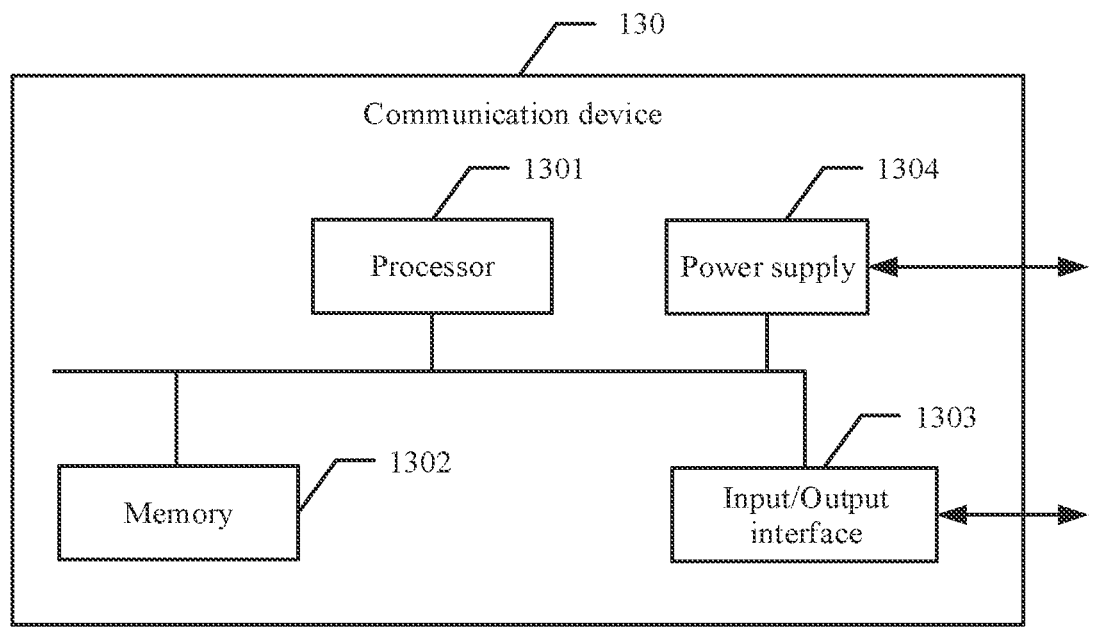
FIG. 13 is a schematic diagram of a structure of a communication device according to an embodiment of this application.

As shown in FIG. 13, an embodiment provides a schematic diagram of a structure of a communication device 130.

The communication device 130 may be a source network device or an S-RAN, or may be a chip or a system-on-a-chip located on the source network device or the S-RAN.

The communication device 130 includes a processor 1301 and a memory 1302. The memory 1302 is configured to store a program. The processor 1301 is configured to execute the program in the memory 1302, to implement functions of the source network device or the S-RAN in the method embodiments of this application, for example, to determine a target network device based on sidelink information of a terminal device and air interface link signal information of neighboring network devices.

The processor 1301 may include one or more processors, and the memory 1302 may include one or more storage media (for example, one or more mass storage devices).

Optionally, the communication device 130 further includes an input/output interface 1303, and the input/output interface 1303 may be used by the communication device 130 to communicate with another device.

Optionally, the source network device may further include one or more power supplies 1304, and/or one or more operating systems, such as Windows Server™, Mac OS X™, Unix™, Linux™, and FreeBSD™.

It should be further understood that, in the method embodiments corresponding to FIG. 2 to FIG. 11, steps performed by the source network device or the S-RAN may be based on the structure of the communication device 130 shown in FIG. 13.

In this embodiment, when determining the target network device, the communication device considers not only the air interface link signal information of the neighboring network devices, but also the sidelink information of the terminal device. Therefore, the target network device determined by the communication device has a greater probability of meeting an air interface link communication requirement and a sidelink communication requirement of the terminal device. Therefore, if the terminal device is handed over to the target network device, a communication effect of the terminal device may not be reduced.

Figure 14:
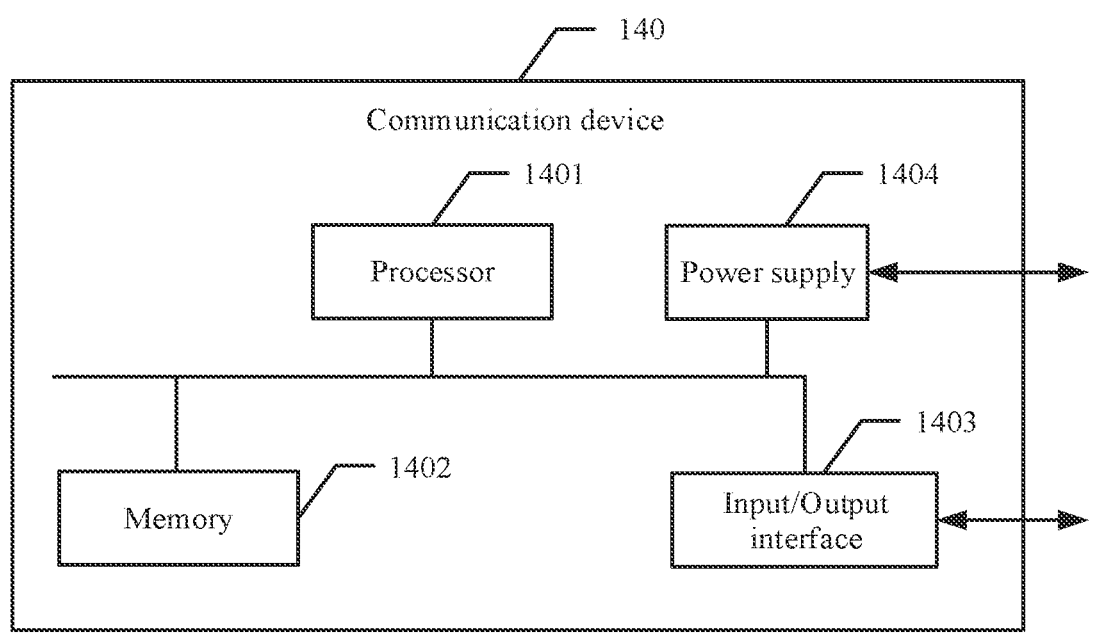
FIG. 14 is a schematic diagram of a structure of another communication device according to an embodiment of this application.

As shown in FIG. 14, an embodiment provides a schematic diagram of a structure of another communication device 140. The communication device 140 may be a terminal device or UE, or may be a chip or a system-on-a-chip located on the terminal device or the UE.

The communication device 140 includes a processor 1401 and a memory 1402. The memory 1402 is configured to store a program, and the processor 1401 is configured to execute the program in the memory 1402, to implement functions of the terminal device or the UE in the method embodiments of this application.

The processor 1401 may include one or more processors, and the memory 1402 may include one or more storage media (for example, one or more mass storage devices).

Optionally, the communication device 140 further includes an input/output interface 1403, and the input/output interface 1403 may be used by the communication device 140 to communicate with another device.

It should be further understood that, in the method embodiments corresponding to FIG. 2 to FIG. 11, steps performed by the terminal device or the UE may be based on the structure of the communication device 140 shown in FIG. 14.

In this implementation, the terminal device sends air interface link signal information of neighboring network devices and capability information of the neighboring network devices to a source network device, so that the source network device determines a target network device based on the air interface link signal information of the neighboring network devices and the capability information of the neighboring network devices. Therefore, the target network device determined by the source network device can better meet an air interface link communication requirement and a sidelink communication requirement of the terminal device. Therefore, if the terminal device is handed over to the target network device, a communication effect of the terminal device may not be reduced.

Figure 15:
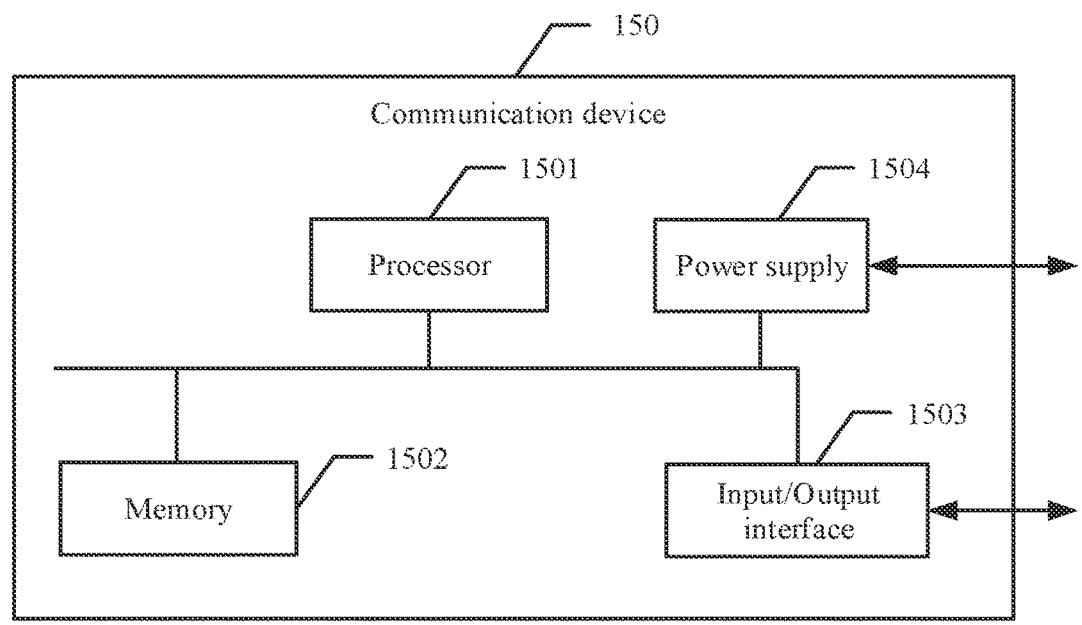
FIG. 15 is a schematic diagram of a structure of another communication device according to an embodiment of this application.

As shown in FIG. 15, an embodiment provides a schematic diagram of a structure of another communication device 150. The communication device 150 may be an access management device or an AMF network element, or may be a chip or a system-on-a-chip located on the access management device or the AMF network element.

The communication device 150 includes a processor 1501 and a memory 1502. The memory 1502 is configured to store a program, and the processor 1501 is configured to execute the program in the memory 1502, to implement functions of the access management device or the AMF network element in the method embodiments of this application.

The processor 1501 may include one or more processors, and the memory 1502 may include one or more storage media (for example, one or more mass storage devices).

Optionally, the communication device 150 further includes an input/output interface 1503, and the input/output interface 1503 may be used by the communication device 150 to communicate with another device. For example, sidelink communication capability information of a terminal device is received from the terminal device through the input/output interface 1503; sidelink authorization information of the terminal device is received from a unified data management device; or the sidelink communication capability information and the sidelink authorization information are sent to a source network device.

It should be further understood that, in the method embodiments corresponding to FIG. 2 to FIG. 11, steps performed by the access management device or the AIF network element may be based on the structure of the communication device 150 shown in FIG. 15.

Figure 16:
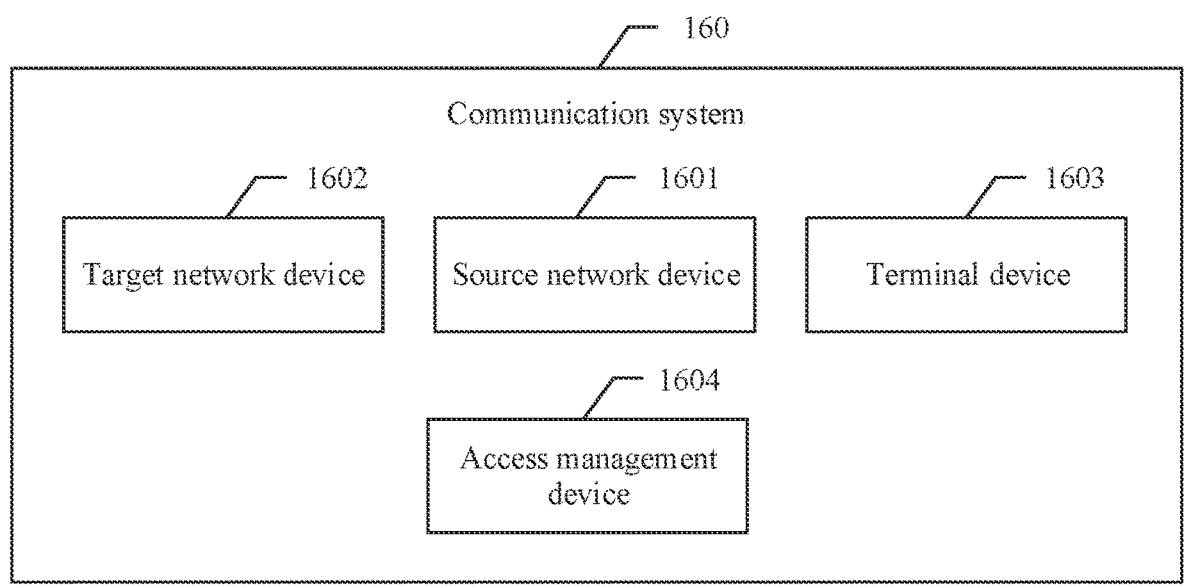
FIG. 16 is a schematic diagram of a communication system according to an embodiment of this application.

As shown in FIG. 16, an embodiment provides a schematic diagram of a structure of a communication system 160. The communication system includes a source network device 1601 and a target network device 1602.

The source network device 1601 is configured to: receive air interface link signal information of neighboring network devices from a terminal device, determine the target network device 1602 based on sidelink information of the terminal device and the air interface link signal information of the neighboring network devices, and send a handover request to the target network device 1602.

The handover request is used to request to hand over the terminal device from the source network device 1601 to the target network device 1602.

The target network device 1602 is configured to: allocate an air interface resource and a service bearer resource to the terminal device based on the handover request, and send a response message of the handover request to the source network device 1601.

Optionally, the communication system 160 further includes the terminal device 1603. The terminal device 1603 is configured to: obtain the air interface link signal information of the neighboring network devices, receive a system message, obtain capability information of the neighboring network devices from the system message, and send the air interface link signal information of the neighboring network devices and the capability information of the neighboring network devices to the source network device.

Optionally, the communication system 160 further includes an access management device 1604, and the access management device 1604 is configured to:

receive sidelink communication capability information of the terminal device from the terminal device, and receive sidelink authorization information of the terminal device from a unified data management device; and send the sidelink communication capability information of the terminal device and the sidelink authorization information of the terminal device to the source network device 1601, or determine an available sidelink communication type of the terminal device based on the sidelink communication capability information of the terminal device and the sidelink authorization information of the terminal device, and send available sidelink communication type information of the terminal device to the source network device 1601.

The available sidelink communication type information of the terminal device may be used to indicate the available sidelink communication type of the terminal device.

It should be noted that the source network device 1601 may be configured to perform functions of the source network device or the S-RAN in the method embodiments of this application. The target network device 1602 may be configured to perform functions of the target network device or the T-RAN in the method embodiments of this application. The terminal device 1603 may be configured to perform functions of the terminal device or the UE in the method embodiments of this application. The access management device 1604 may be configured to perform functions of the access management device or the AMF network element in the method embodiments of this application. No limitation is imposed.

Optionally, the source network device 1601 may alternatively perform all or some of the steps performed by the source network device 1601 in the method embodiments corresponding to FIG. 2 to FIG. 11. Specifically, for the source network device 1601 or the target network device 1602, refer to the specific structure of the embodiment corresponding to FIG. 13. Details are not described again.

Optionally, the terminal device 1603 may further perform all or some of the steps performed by the terminal device 1603 in the method embodiments corresponding to FIG. 2 to FIG. 1I. Specifically, for the terminal device 1603, refer to the specific structure of the embodiment corresponding to FIG. 14. Details are not described again.

Optionally, the access management device 1604 may further perform all or some of the steps performed by the access management device 1604 in the method embodiments corresponding to FIG. 2 to FIG. 11. Specifically, for the access management device 1604, refer to the specific structure of the embodiment corresponding to FIG. 15. Details are not described again.

In this implementation, when determining the target network device, the source network device in the communication system considers not only the air interface link signal information of the neighboring network devices, but also the sidelink information of the terminal device. Therefore, the target network device determined by the source network device can better meet an air interface link communication requirement and a sidelink communication requirement of the terminal device. This helps improve the communication efficiency of the communication system.

Figure 17:
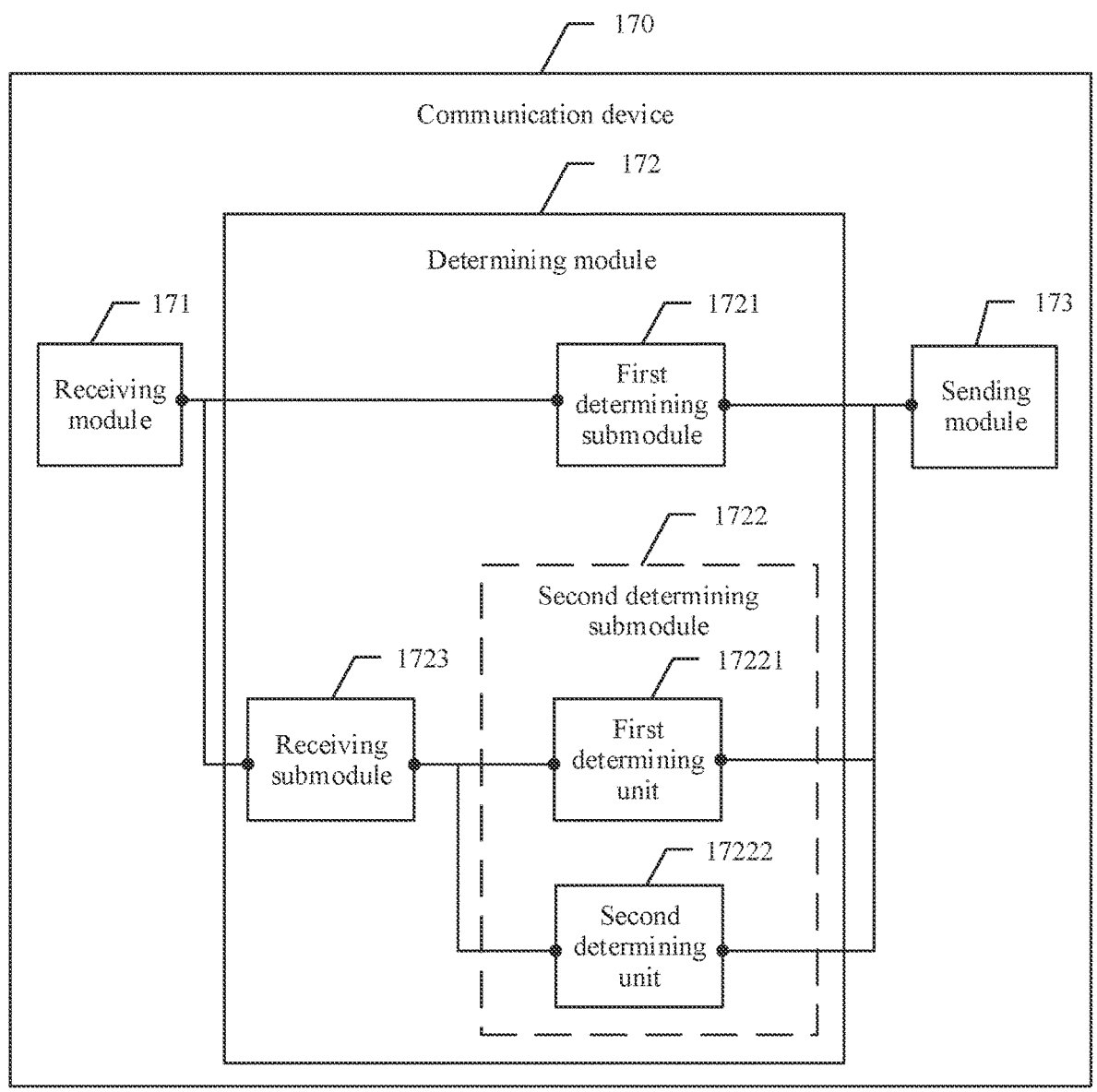
FIG. 17 is a schematic diagram of a structure of a communication device according to an embodiment of this application.

As shown in FIG. 17, an embodiment provides a schematic diagram of a structure of another communication device 170. The communication device 170 may be a source network device or an S-RAN, or may be a chip or a system-on-a-chip located on the source network device or the S-RAN. The communication device 170 may be configured to perform the actions of the source network device or the S-RAN in the method embodiments of this application. No limitation is imposed.

The communication device 170 includes:

a receiving module 171, configured to receive air interface link signal information of neighboring network devices from a terminal device;

a determining module 172, configured to determine a target network device based on sidelink information of the terminal device and the air interface link signal information of the neighboring network devices; and a sending module 173, configured to send a handover request to the target network device, where the handover request is used to request to hand over the terminal device from the source network device to the target network device.

Optionally, the determining module 172 includes:

a first determining submodule 1721, configured to: when cross-radio access technology sidelink scheduling authorization information of the terminal device indicates that the terminal device supports cross-radio access technology sidelink scheduling, determine a network device that is in the neighboring network devices and that meets a first air interface link communication condition of the terminal device as the target network device based on the air interface link signal information of the neighboring network devices, where the air interface link signal information of the neighboring network devices includes air interface link signal values of the neighboring network devices, and the first air interface link communication condition includes that an air interface link signal value is greater than a first air interface link signal threshold.

Optionally, the determining module 172 further includes:

a second determining submodule 1722, configured to determine the target network device based on the sidelink information of the terminal device, capability information of the neighboring network devices, and the air interface link signal information of the neighboring network devices.

Optionally, the second determining submodule 1722 includes:

a first determining unit 17221, configured to: determine a network device that is in the neighboring network devices and that meets a first air interface link communication condition and supports sidelink communication scheduling of the terminal device as the target network device based on the first sidelink information, the capability information of the neighboring network devices, and the air interface link signal information of the neighboring network devices;

or a second determining unit 17222, configured to: when the source network device determines, based on the first sidelink information, the capability information of the neighboring network devices, and the air interface link signal information of the neighboring network devices, that no network device that meets a first air interface link communication condition and supports sidelink communication scheduling of the terminal device exists in the neighboring network devices, determine the target network device based on the second sidelink information, where the air interface link signal information of the neighboring network devices includes air interface link signal values of the neighboring network devices, and the first air interface link communication condition includes that an air interface link signal value is greater than a first air interface link signal threshold.

Optionally, the receiving module 171 is further configured to receive sidelink priority information of the terminal device from the terminal device; or the receiving module 171 is further configured to receive a correspondence from a policy control device, where the correspondence includes a correspondence between air interface link service requirement identification information and a communication priority and a correspondence between sidelink service requirement identification information and a communication priority, and determine the sidelink priority information of the terminal device based on the air interface link service requirement identification information of the terminal device, the sidelink service requirement identification information of the terminal device, and the correspondence.

Optionally, the determining module 172 further includes:
a receiving submodule 1723, configured to receive the capability information of the neighboring network devices from the neighboring network devices through interfaces between the source network device and the neighboring network devices;
a receiving submodule 1723, configured to receive the capability information of the neighboring network devices from a network management device; or
a receiving submodule 1723, configured to receive the capability information of the neighboring network devices from the terminal device.

In some feasible implementations, the first determining unit 17221 is specifically configured to: determine at least one candidate network device based on the sidelink communication capability information of the terminal device, the sidelink authorization information of the terminal device, and the sidelink scheduling capability information of the neighboring network devices, where an intersection exists between a sidelink communication type supported by the at least one candidate network device for scheduling, a sidelink communication type supported by the terminal device, and an authorized sidelink communication type of the terminal device, and determine a network device that is in the at least one candidate network device and that meets the first air interface link communication condition as the target network device based on air interface link signal information of the at least one candidate network device.

Alternatively, the first determining unit 17221 is specifically configured to: determine at least one candidate network device that is in the neighboring network devices and that meets the first air interface link communication condition based on the air interface link signal information of the neighboring network devices, and determine the target network device based on sidelink scheduling capability information of the at least one candidate network device, the sidelink communication capability information of the terminal device, and the sidelink authorization information of the terminal device, where an intersection exists between a sidelink communication type supported by the target network device for scheduling, a sidelink communication type supported by the terminal device, and an authorized sidelink communication type of the terminal device.

In some other feasible implementations, the first determining unit 17221 is specifically configured to: determine at least one candidate network device based on the available sidelink communication type information of the terminal device and the sidelink scheduling capability information of the neighboring network devices, where an intersection exists between a sidelink communication type supported by the at least one candidate network device for scheduling and an available sidelink communication type of the terminal device, and determine a network device that is in the at least one candidate network device and that meets the first air interface link communication condition as the target network device based on air interface link signal information of the at least one candidate network device.

Alternatively, the first determining unit 17221 is specifically configured to: determine at least one candidate network device that is in the neighboring network devices and that meets the first air interface link communication condition based on the air interface link signal information of the neighboring network devices, and determine the target network device based on sidelink scheduling capability information of the at least one candidate network device and the available sidelink communication type information of the terminal device, where an intersection exists between a sidelink communication type supported by the target network device for scheduling and an available sidelink communication type of the terminal device.

In some other feasible implementations, the first determining unit 17221 is specifically configured to: when the cross-radio access technology sidelink scheduling authorization information of the terminal device indicates that the terminal device does not support cross-radio access technology sidelink scheduling, determine at least one candidate network device based on the radio access technology information of the neighboring network devices, the sidelink communication capability information of the terminal device, and the sidelink authorization information of the terminal device, where an intersection exists between a radio access technology type of the at least one candidate network device, a sidelink communication type supported by the terminal device, and an authorized sidelink communication type of the terminal device, and determine a network device that is in the at least one candidate network device and that meets the first air interface link communication condition as the target network device based on air interface link signal information of the at least one candidate network device.

Alternatively, the first determining unit 17221 is specifically configured to: when the cross-radio access technology sidelink scheduling authorization information of the terminal device indicates that the terminal device does not support cross-radio access technology sidelink scheduling, determine at least one candidate network device that is in the neighboring network devices and that meets the first air interface link communication condition based on the air interface link signal information of the neighboring network devices, and determine the target network device based on radio access technology information of the at least one candidate network device, the sidelink communication capability information of the terminal device, and the sidelink authorization information of the terminal device, where an intersection exists between a radio access technology type of the target network device, a sidelink communication type supported by the terminal device, and an authorized sidelink communication type of the terminal device.

In some other feasible implementations, the first determining unit 17221 is specifically configured to: when the cross-radio access technology sidelink scheduling authorization information of the terminal device indicates that the terminal device does not support cross-radio access technology sidelink scheduling, determine at least one candidate network device based on the radio access technology information of the neighboring network devices and the available sidelink communication type information of the terminal device, where an intersection exists between a radio access technology type of the at least one candidate network device and an available sidelink communication type of the terminal device, and determine a network device that is in the at least one candidate network device and that meets the first air interface link communication condition as the target network device based on air interface link signal information of the at least one candidate network device.

Alternatively, the first determining unit 17221 is specifically configured to: when the cross-radio access technology sidelink scheduling authorization information of the terminal device indicates that the terminal device does not support cross-radio access technology sidelink scheduling, determine at least one candidate network device that is in the neighboring network devices and that meets the first air interface link communication condition based on the air interface link signal information of the neighboring network devices, and determine the target network device based on radio access technology information of the at least one candidate network device and the available sidelink communication type information of the terminal device, where an intersection exists between a radio access technology type of the target network device and an available sidelink communication type of the terminal device.

In some other feasible implementations, the second determining unit 17222 is specifically configured to: when the sidelink priority information of the terminal device indicates that a sidelink communication priority of the terminal device is lower than an air interface link communication priority of the terminal device, or indicates that sidelink communication of the terminal device is not preferential, determine the target network device based on the air interface link signal information of the neighboring network devices.

Alternatively, the second determining unit 17222 is specifically configured to: when the sidelink priority information of the terminal device indicates that a sidelink communication priority of the terminal device is higher than an air interface link communication priority of the terminal device, or indicates that sidelink communication of the terminal device is preferential, determine a network device that is in the neighboring network devices and that meets a second air interface link communication condition and supports the sidelink communication scheduling of the terminal device as the target network device, where the second air interface link communication condition includes that an air interface link signal value is greater than a second air interface link signal threshold, and the second air interface link signal threshold is less than the first air interface link signal threshold.

In this embodiment, when determining the target network device, the source network device considers not only the air interface link signal information of the neighboring network devices, but also the sidelink information of the terminal device. Therefore, the target network device determined by the source network device has a greater probability of meeting an air interface link communication requirement and a sidelink communication requirement of the terminal device. Therefore, if the terminal device is handed over to the target network device, a communication effect of the terminal device may not be reduced.

Figure 18:
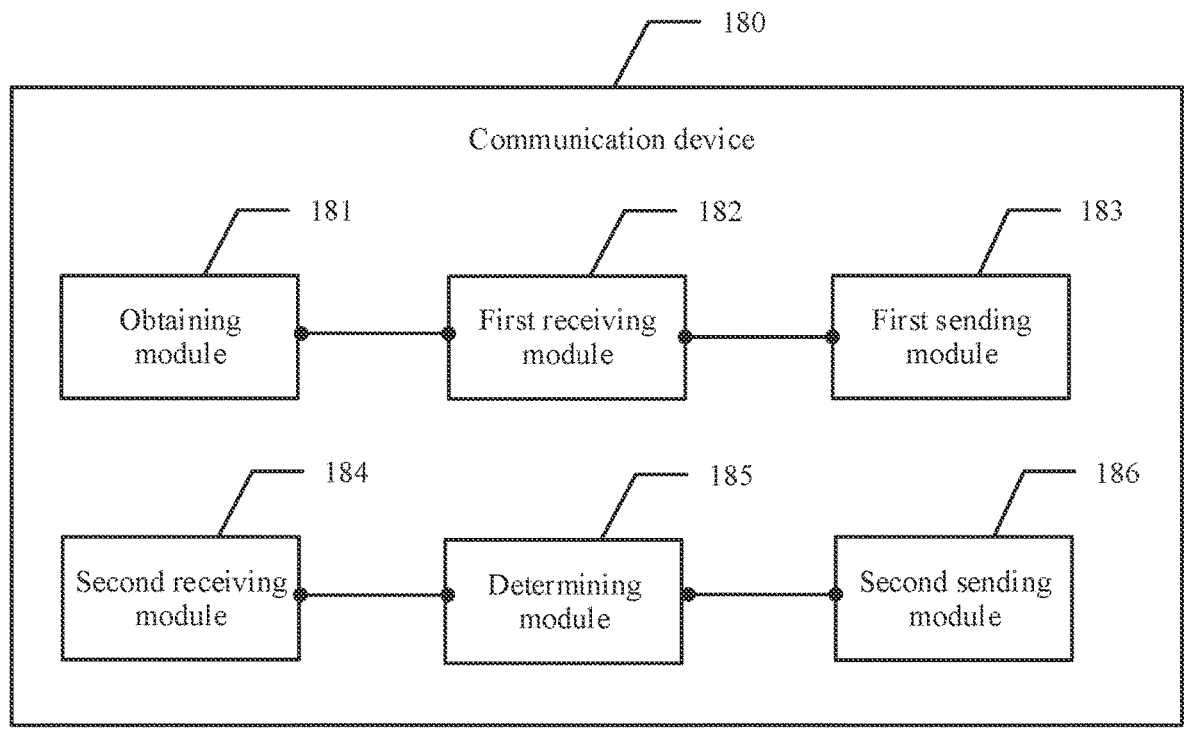
FIG. 18 is a schematic diagram of a structure of another communication device according to an embodiment of this application.

As shown in FIG. 18, an embodiment provides a schematic diagram of a structure of another communication device 180. The communication device 180 may be a terminal device or UE, or may be a chip or a system-on-a-chip located on the terminal device or the UE. The communication device 180 may be configured to perform the actions of the terminal device or the UE in the method embodiments of this application. No limitation is imposed.

The communication device 180 includes:
  an obtaining module 181, configured to obtain air interface link signal information of neighboring network devices;
  a first receiving module 182, configured to: receive a system message, and obtain capability information of the neighboring network devices from the system message; and
  a first sending module 183, configured to send the air interface link signal information of the neighboring network devices and the capability information of the neighboring network devices to a source network device.

Optionally, the communication device 180 further includes:
  a second receiving module 184, configured to receive a correspondence from a policy control device, where the correspondence includes a correspondence between air interface link service requirement identification information and a communication priority and a correspondence between sidelink service requirement identification information and a communication priority;
  a determining module 185, configured to determine sidelink priority information of the terminal device based on the air interface link service requirement identification information of the terminal device, the sidelink service requirement identification information of the terminal device, and the correspondence; and
  a second sending module 186, configured to send the sidelink priority information of the terminal device to the source network device.

In this implementation, the terminal device sends the air interface link signal information of the neighboring network devices and the capability information of the neighboring network devices to the source network device, so that the source network device determines a target network device based on the air interface link signal information of the neighboring network devices and the capability information of the neighboring network devices. Therefore, the target network device determined by the source network device can better meet an air interface link communication requirement and a sidelink communication requirement of the terminal device. Therefore, if the terminal device is handed over to the target network device, a communication effect of the terminal device may not be reduced.

Figure 19:
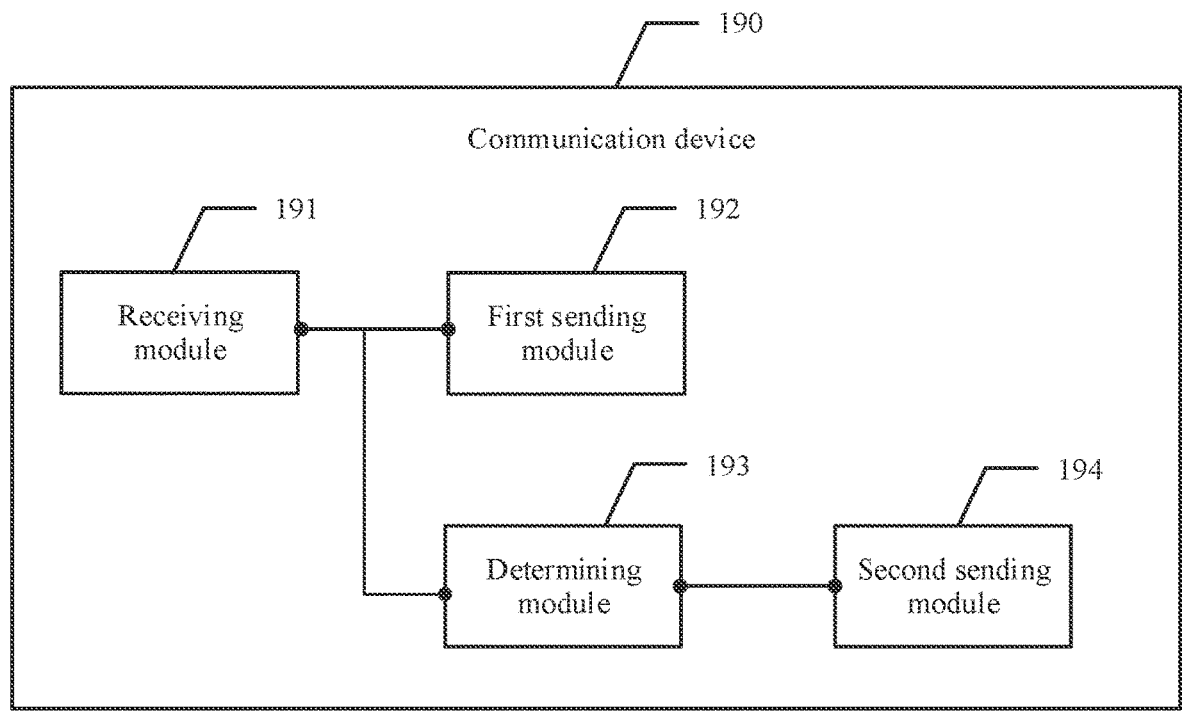
FIG. 19 is a schematic diagram of a structure of another communication device according to an embodiment of this application.

As shown in FIG. 19, an embodiment provides a schematic diagram of a structure of another communication device 190. The communication device 190 may be an access management device or an AMF network element, or may be a chip or a system-on-a-chip located on the access management device or the AMF network element. The communication device 190 may be configured to perform the actions of the access management device or the AMP network element in the method embodiments of this application. No limitation is imposed.

The communication device 190 includes:
  a receiving module 191, configured to receive sidelink communication capability information of a terminal device from the terminal device, where the receiving module 191 is further configured to receive sidelink authorization information of the terminal device from a unified data management device; and a first sending module 192, configured to send the sidelink communication capability information and the sidelink authorization information to the source network device.

Optionally, the first sending module 192 may be replaced with a determining module 193 and a second sending module 194.

The determining module 193 is configured to determine an available sidelink communication type of the terminal device based on the sidelink communication capability information of the terminal device and the sidelink authorization information of the terminal device.

The second sending module 194 is configured to send available sidelink communication type information of the terminal device to the source network device, where the available sidelink communication type information of the terminal device is used to indicate the available sidelink communication type of the terminal device.

In this implementation, an approach for the source network device to obtain the sidelink communication capability information and the sidelink authorization information is specified, so that the source network device can determine a target network device based on the sidelink communication capability information, the sidelink authorization information, and other information.

An embodiment of this application further provides a computer program product including instructions. When the instructions are nm on a computer, the computer is enabled to perform functions of the foregoing communication devices.

All or some of the foregoing embodiments may be implemented by using software, hardware, firmware, or any combination thereof. When software is used to implement the embodiments, all or some of the embodiments may be implemented in a form of a computer program product.

An embodiment of this application provides a computer-readable storage medium. The computer-readable storage medium is configured to store the foregoing instructions, to enable a computer to run the instructions to implement functions of the foregoing communication devices.

It can be clearly understood by persons skilled in the art that, for the purpose of convenient and brief description, for a detailed working process of the foregoing systems, devices, modules, or units, refer to the corresponding process in the method embodiments, and the details are not be described herein again.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A communication method, comprising:
   receiving, by a source network device, air interface link signal information of neighboring network devices from a terminal device;
   determining, by the source network device, a target network device based on sidelink information of the terminal device and the air interface link signal information of the neighboring network devices, wherein:
   the sidelink information of the terminal device comprises at least one of first sidelink information of the terminal device or second sidelink information of the terminal device;
   the first sidelink information comprises:
     at least one of sidelink communication capability information of the terminal device, sidelink authorization information of the terminal device, or cross-radio access technology sidelink scheduling authorization information of the terminal device; or
     at least one of available sidelink communication type information of the terminal device or the cross-radio access technology sidelink scheduling authorization information of the terminal device; and
   the second sidelink information comprises sidelink priority information of the terminal device; and
   sending, by the source network device, a handover request to the target network device, wherein the handover request requests to hand over the terminal device from the source network device to the target network device.

2. The communication method according to claim 1, wherein:
   the sidelink information of the terminal device comprises cross-radio access technology sidelink scheduling authorization information of the terminal device; and
   the determining, by the source network device, a target network device based on sidelink information of the terminal device and the air interface link signal information of the neighboring network devices comprises:
     in case that the cross-radio access technology sidelink scheduling authorization information of the terminal device indicates that the terminal device supports cross-radio access technology sidelink scheduling, determining, by the source network device, a network device as the target network device based on the air interface link signal information of the neighboring network devices, wherein the network device is in the neighboring network devices and meets a first air interface link communication condition of the terminal device, and wherein:
     the air interface link signal information of the neighboring network devices comprises air interface link signal values of the neighboring network devices; and
     the first air interface link communication condition comprises that an air interface link signal value is greater than a first air interface link signal threshold.

3. The communication method according to claim 1, wherein the determining, by the source network device, a target network device based on sidelink information of the terminal device and the air interface link signal information of the neighboring network devices comprises:
   determining, by the source network device, the target network device based on the sidelink information of the terminal device, capability information of the neighboring network devices, and the air interface link signal information of the neighboring network devices.

4. The communication method according to claim 3, wherein the capability information of the neighboring network devices comprises at least one of sidelink scheduling capability information of the neighboring network devices or radio access technology information of the neighboring network devices.

5. The communication method according to claim 3, wherein the determining, by the source network device, the target network device based on the sidelink information of the terminal device, capability information of the neighboring network devices, and the air interface link signal information of the neighboring network devices comprises:
  determining, by the source network device, a network device as the target network device based on first sidelink information, the capability information of the neighboring network devices, and the air interface link signal information of the neighboring network devices, wherein the network device is in the neighboring network devices and meets a first air interface link communication condition and supports sidelink communication scheduling of the terminal device; or
  in case that the source network device determines, based on the first sidelink information, the capability information of the neighboring network devices, and the air interface link signal information of the neighboring network devices, that no network device in the neighboring network devices meets a first air interface link communication condition and supports sidelink communication scheduling of the terminal device, determining, by the source network device, the target network device based on second sidelink information, wherein:
    the air interface link signal information of the neighboring network devices comprises air interface link signal values of the neighboring network devices; and
    the first air interface link communication condition comprises that an air interface link signal value is greater than a first air interface link signal threshold.

6. The communication method according to claim 5, wherein the determining, by the source network device, the target network device based on the second sidelink information comprises:
  in case that sidelink priority information of the terminal device indicates that a sidelink communication priority of the terminal device is lower than an air interface link communication priority of the terminal device, or indicates that sidelink communication of the terminal device is not preferential, determining, by the source network device, the target network device based on the air interface link signal information of the neighboring network devices; or
  in case that the sidelink priority information of the terminal device indicates that a sidelink communication priority of the terminal device is higher than an air interface link communication priority of the terminal device, or indicates that sidelink communication of the terminal device is preferential, determining, by the source network device, a network device as the target network device, wherein the network device is in the neighboring network devices and meets a second air interface link communication condition and supports the sidelink communication scheduling of the terminal device, and wherein:
    the second air interface link communication condition comprises that an air interface link signal value is greater than a second air interface link signal threshold; and
    the second air interface link signal threshold is less than the first air interface link signal threshold.

7. The communication method according to claim 5, wherein:
  the capability information of the neighboring network devices comprises sidelink scheduling capability information of the neighboring network devices;
  the first sidelink information comprises sidelink communication capability information of the terminal device and sidelink authorization information of the terminal device; and
  the determining, by the source network device, a network device as the target network device based on the first sidelink information, the capability information of the neighboring network devices, and the air interface link signal information of the neighboring network devices comprises:
    determining, by the source network device, at least one candidate network device based on the sidelink communication capability information of the terminal device, the sidelink authorization information of the terminal device, and the sidelink scheduling capability information of the neighboring network devices, wherein an intersection exists between a sidelink communication type supported by the at least one candidate network device for scheduling, a sidelink communication type supported by the terminal device, and an authorized sidelink communication type of the terminal device, and determining, by the source network device, a network device as the target network device based on air interface link signal information of the at least one candidate network device, wherein the network device is in the at least one candidate network device and meets the first air interface link communication condition; or
    determining, by the source network device based on the air interface link signal information of the neighboring network devices, at least one candidate network device that is in the neighboring network devices and that meets the first air interface link communication condition, and determining, by the source network device, the target network device based on sidelink scheduling capability information of the at least one candidate network device, the sidelink communication capability information of the terminal device, and the sidelink authorization information of the terminal device, wherein an intersection exists between a sidelink communication type supported by the target network device for scheduling, a sidelink communication type supported by the terminal device, and an authorized sidelink communication type of the terminal device.

8. The communication method according to claim 5, wherein:
  the capability information of the neighboring network devices comprises sidelink scheduling capability information of the neighboring network devices;
  the first sidelink information comprises available sidelink communication type information of the terminal device; and
  the determining, by the source network device, a network device as the target network device based on the first sidelink information, the capability information of the neighboring network devices, and the air interface link signal information of the neighboring network devices comprises:
    determining, by the source network device, at least one candidate network device based on the available sidelink communication type information of the terminal device and the sidelink scheduling capability information of the neighboring network devices, wherein an intersection exists between a sidelink communication type supported by the at least one candidate network device for scheduling and an available sidelink communication type of the terminal device, and determining, by the source network device, a network device as the target network device based on air interface link signal information of the at least one candidate network device, wherein the network device is in the at least one candidate network device and meets the first air interface link communication condition; or determining, by the source network device based on the air interface link signal information of the neighboring network devices, at least one candidate network device that is in the neighboring network devices and that meets the first air interface link communication condition, and determining, by the source network device, the target network device based on sidelink scheduling capability information of the at least one candidate network device and the available sidelink communication type information of the terminal device, wherein an intersection exists between a sidelink communication type supported by the target network device for scheduling and an available sidelink communication type of the terminal device.

9. The communication method according to claim 5, wherein:

the first sidelink information comprises cross-radio access technology sidelink scheduling authorization information of the terminal device, sidelink communication capability information of the terminal device, and sidelink authorization information of the terminal device;

the capability information of the neighboring network devices comprises radio access technology information of the neighboring network devices; and the determining, by the source network device, a network device as the target network device based on the first sidelink information, the capability information of the neighboring network devices, and the air interface link signal information of the neighboring network devices comprises:

in case that the cross-radio access technology sidelink scheduling authorization information of the terminal device indicates that the terminal device does not support cross-radio access technology sidelink scheduling, determining, by the source network device, at least one candidate network device based on the radio access technology information of the neighboring network devices, the sidelink communication capability information of the terminal device, and the sidelink authorization information of the terminal device, wherein an intersection exists between a radio access technology type of the at least one candidate network device, a sidelink communication type supported by the terminal device, and an authorized sidelink communication type of the terminal device; and determining, by the source network device, a network device that is in the at least one candidate network device and that meets the first air interface link communication condition as the target network device based on air interface link signal information of the at least one candidate network device; or in case that the cross-radio access technology sidelink scheduling authorization information of the terminal device indicates that the terminal device does not support cross-radio access technology sidelink scheduling, determining, by the source network device based on the air interface link signal information of the neighboring network devices, at least one candidate network device that is in the neighboring network devices and that meets the first air interface link communication condition; and determining, by the source network device, the target network device based on radio access technology information of the at least one candidate network device, the sidelink communication capability information of the terminal device, and the sidelink authorization information of the terminal device, wherein an intersection exists between a radio access technology type of the target network device, a sidelink communication type supported by the terminal device, and an authorized sidelink communication type of the terminal device.

10. The communication method according to claim 5, wherein:

the first sidelink information comprises cross-radio access technology sidelink scheduling authorization information of the terminal device and available sidelink communication type information of the terminal device;

the capability information of the neighboring network devices comprises radio access technology information of the neighboring network devices; and the determining, by the source network device, a network device as the target network device based on the first sidelink information, the capability information of the neighboring network devices, and the air interface link signal information of the neighboring network devices comprises:

in case that the cross-radio access technology sidelink scheduling authorization information of the terminal device indicates that the terminal device does not support cross-radio access technology sidelink scheduling, determining, by the source network device, at least one candidate network device based on the radio access technology information of the neighboring network devices and the available sidelink communication type information of the terminal device, wherein an intersection exists between a radio access technology type of the at least one candidate network device and an available sidelink communication type of the terminal device; and determining, by the source network device, a network device as the target network device based on air interface link signal information of the at least one candidate network device, wherein the network device is in the at least one candidate network device and meets the first air interface link communication condition; or in case that the cross-radio access technology sidelink scheduling authorization information of the terminal device indicates that the terminal device does not support cross-radio access technology sidelink scheduling, determining, by the source network device based on the air interface link signal information of the neighboring network devices, at least one candidate network device that is in the neighboring network devices and that meets the first air interface link communication condition; and determining, by the source network device, the target network device based on radio access technology information of the at least one candidate network device and the available sidelink communication type information of the terminal device, wherein an intersection exists between a radio access technology type of the target network device and an available sidelink communication type of the terminal device.

11. A communication device, comprising:
at least one processor; and
one or more memories coupled to the at least one processor and storing programming instructions for execution by the at least one processor to:
receive air interface link signal information of neighboring network devices from a terminal device;
determine a target network device based on sidelink information of the terminal device and the air interface link signal information of the neighboring network devices, wherein:
the sidelink information of the terminal device comprises at least one of first sidelink information of the terminal device or second sidelink information of the terminal device;
the first sidelink information comprises:
at least one of sidelink communication capability information of the terminal device, sidelink authorization information of the terminal device, or cross-radio access technology sidelink scheduling authorization information of the terminal device; or
at least one of available sidelink communication type information of the terminal device or the cross-radio access technology sidelink scheduling authorization information of the terminal device; and
the second sidelink information comprises sidelink priority information of the terminal device; and
send a handover request to the target network device, wherein the handover request requests to hand over the terminal device from a source network device to the target network device.

12. The communication device according to claim 11, wherein:
the sidelink information of the terminal device comprises cross-radio access technology sidelink scheduling authorization information of the terminal device; and
the one or more memories store the programming instructions for execution by the at least one processor to:
in case that the cross-radio access technology sidelink scheduling authorization information of the terminal device indicates that the terminal device supports cross-radio access technology sidelink scheduling, determine a network device as the target network device based on the air interface link signal information of the neighboring network devices, wherein the network device is in the neighboring network devices and that meets a first air interface link communication condition of the terminal device, and wherein:
the air interface link signal information of the neighboring network devices comprises air interface link signal values of the neighboring network devices; and the first air interface link communication condition comprises that an air interface link signal value is greater than a first air interface link signal threshold.

13. The communication device according to claim 11, wherein the one or more memories store the programming instructions for execution by the at least one processor to:
determine the target network device based on the sidelink information of the terminal device, capability information of the neighboring network devices, and the air interface link signal information of the neighboring network devices.

14. The communication device according to claim 13, wherein the capability information of the neighboring network devices comprises at least one of sidelink scheduling capability information of the neighboring network devices or radio access technology information of the neighboring network devices.

15. The communication device according to claim 13, wherein the one or more memories store the programming instructions for execution by the at least one processor to:
determine a network device as the target network device based on first sidelink information, the capability information of the neighboring network devices, and the air interface link signal information of the neighboring network devices, wherein the network device is in the neighboring network devices and meets a first air interface link communication condition and supports sidelink communication scheduling of the terminal device; or
in case that the communication device determines, based on the first sidelink information, the capability information of the neighboring network devices, and the air interface link signal information of the neighboring network devices, that no network device in the neighboring network devices meets a first air interface link communication condition and supports sidelink communication scheduling of the terminal device, determine the target network device based on second sidelink information, wherein:
the air interface link signal information of the neighboring network devices comprises air interface link signal values of the neighboring network devices; and
the first air interface link communication condition comprises that an air interface link signal value is greater than a first air interface link signal threshold.

16. A communication device, comprising:
at least one processor; and
one or more memories coupled to the at least one processor and storing programming instructions for execution by the at least one processor to:
obtain air interface link signal information of neighboring network devices;
receive a system message, and obtaining capability information of the neighboring network devices from the system message, wherein the capability information of the neighboring network devices comprises at least one of sidelink scheduling capability information of the neighboring network devices or radio access technology information of the neighboring network devices; and
send the air interface link signal information of the neighboring network devices and the capability information of the neighboring network devices to a source network device.

17. The communication device according to claim 16, wherein the one or more memories store the programming instructions for execution by the at least one processor to:
- receive a correspondence from a policy control device, wherein the correspondence comprises a correspondence between air interface link service requirement identification information and a communication priority and a correspondence between sidelink service requirement identification information and a communication priority;
- determine sidelink priority information of a terminal device based on the air interface link service requirement identification information of the terminal device, the sidelink service requirement identification information of the terminal device, and the correspondence; and
- send the sidelink priority information of the terminal device to the source network device.

* * * * *